(12) United States Patent
Hirao et al.

(10) Patent No.: US 8,000,037 B2
(45) Date of Patent: Aug. 16, 2011

(54) IMAGING LENS, IMAGING DEVICE, AND MOBILE TERMINAL

(75) Inventors: Yusuke Hirao, Sakai (JP); Keiji Matsusaka, Osaka (JP); Yasunari Fukuta, Hachioji (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/667,262

(22) PCT Filed: Jun. 25, 2008

(86) PCT No.: PCT/JP2008/061558
§ 371 (c)(1),
(2), (4) Date: Dec. 30, 2009

(87) PCT Pub. No.: WO2009/004966
PCT Pub. Date: Jan. 8, 2009

(65) Prior Publication Data
US 2010/0188556 A1 Jul. 29, 2010

(30) Foreign Application Priority Data
Jul. 4, 2007 (JP) .................. 2007-176624

(51) Int. Cl.
*G02B 9/12* (2006.01)
*G02B 3/02* (2006.01)
*G02B 9/14* (2006.01)

(52) U.S. Cl. ........ 359/784; 359/716; 359/786; 359/787; 359/788

(58) Field of Classification Search .................. 359/784, 359/786, 787, 788, 716, 754
See application file for complete search history.

(56) References Cited

U.S. PATENT DOCUMENTS

| | | | | |
|---|---|---|---|---|
| 6,985,306 | B2 | 1/2006 | Abe | 359/716 |
| 7,177,098 | B2 | 2/2007 | Arai | 359/715 |
| 7,295,383 | B2 | 11/2007 | Saito | 359/716 |
| 7,342,731 | B2 | 3/2008 | Lee et al. | 359/772 |
| 2004/0141242 | A1 | 7/2004 | Abe | 359/792 |
| 2006/0092528 | A1 | 5/2006 | Arai | 359/771 |
| 2006/0262416 | A1 | 11/2006 | Lee et al. | 359/645 |
| 2007/0091470 | A1 | 4/2007 | Saito | 359/791 |

FOREIGN PATENT DOCUMENTS

| | | |
|---|---|---|
| JP | 2004-212481 A | 7/2004 |
| JP | 2006-126494 A | 5/2006 |
| JP | 2006-301230 A | 11/2006 |
| JP | 2006-323365 A | 11/2006 |
| JP | 2007-47513 A | 2/2007 |
| JP | 2006-114473 A | 5/2007 |
| JP | 3976782 B1 | 6/2007 |
| JP | 3946245 B1 | 7/2007 |
| WO | WO 2009/004966 A1 | 1/2009 |

*Primary Examiner* — Jack Dinh
(74) *Attorney, Agent, or Firm* — Sidley Austin LLP

(57) ABSTRACT

Provided is an imaging lens, including, in order from an object side: a positive first lens; a second lens having a concave shape toward the object side; and (i−2) number of lens, wherein the i-th lens, which is the most image-side lens, includes: an i-th lens flat plate; and a positive or negative lens element on at least one of the opposite surfaces of the i-th lens flat plate, wherein the following conditional relationship is satisfied: $0.9 > Y_{max}/Y > 0.61$, where: $Y_{max}$ is a height of the most off-axial ray on an image-side surface of the (i−1)th lens; and Y is a maximum image height.

17 Claims, 32 Drawing Sheets

IMAGING LENS, IMAGING DEVICE, AND MOBILE TERMINAL

RELATED APPLICATIONS

This application is a U.S. National Phase Application under 35 USC 371 of International Application PCT/JP2008/061558 filed Jun. 25, 2008, which claims priority from Japanese Patent Application No. 2007-176624 filed Jul. 4, 2007.

TECHNICAL FIELD

The present invention relates to an imaging lens for photographing a subject, and an imaging lens of an imaging device using solid-state image sensing devices such as a CCD image sensor and a CMOS image sensor. In detail, the present invention relates to an image imaging lens in an optical system using a wafer-scale lens that is suitable for mass production and an imaging device using the imaging lens.

BACKGROUND ART

Small and thin imaging devices have come to be installed in personal digital assistants, which are small-sized and thin electronic equipment, such as a portable telephone and a PDA (Personal Digital Assistant). Whereby, it is possible to mutually transmit not only voice information but also image information to a remote place.

With respect to an image sensor used for such an imaging device, solid-state image sensing devices, such as a CCD (Charge Coupled Device) image sensor and a CMOS (Complementary Metal-Oxide Semiconductor) image sensor, are used. In order to reduce the cost, resin that can be mass-produced inexpensively has come to be used to manufacture a lens, which forms a subject image on these image sensors.

A type of optical system structured with three plastic lenses or with one glass lens and two plastic lenses is generally well known as an imaging lens used in the imaging device which is used in such a personal digital assistant. However, there is a technical limitation to achieving both of further microminiaturization of these optical systems and a mass-production capability required for use in a personal digital assistant.

In order to solve such a problem, a method of forming a lens and an optical system utilizing a replica method that simultaneously forms many lenses on one lens flat plate has been proposed (for example, refer to patent reference No. 1). Patent reference No. 1 discloses an imaging lens, in which a diffracting plane and a refracting interface are simultaneously produced on a lens flat plate and aberration is corrected.

However, it is not easy to form a diffracting surface and a refracting interface simultaneously on a lens flat plate. There are problems, in use of diffracting surface, that the diffraction efficiency decreases in wavelengths other than a design wavelength and that there is a large restriction to the angle of the incident light entering into the diffracting surface due to the poor angle characteristic of the incident light to the diffracting surface. Thus, there is a problem of difficulty in securing a wide field angle. In an optical system given in a patent reference No. 1, although the thickness of a lens element is not thick, there is a problem of a large astigmatism.

In the replica method, in order to easily give an aspheric surface shape, there is a technique in which UV hardening type resin is fixed by a metallic mold on a lens flat plate and UV hardening type resin is hardened by irradiation of a ultraviolet light. In this technique, in the case where the thickness of UV hardening type resin section is approximately greater than 0.25 (mm), there is a problem that a penetration of ultraviolet rays is poor and UV hardening type resin cannot be hardened sufficiently.

Patent reference No. 1: Laid-Open Japanese Patent Application Publication No. 2006-323365

DISCLOSURE OF INVENTION

Object of the Invention

The present invention has been made in view of such circumstances. An object of the present invention is to provide an optical system in which the most image-side lens element is thin, and in which optical system a lens structure is constituted of at least three lenses without using a diffracting surface, an optical overall length is short with respect to a image height, an astigmatism and other aberrations are well corrected, and a wafer-scale lens is included.

Here, the optical overall length is the distance from the most object-side lens surface to the most solid-state image-sensor-side lens. In a case of a bonded lens, the term of lens refers to all of the positive lens section (lens having a positive refractive power) and the negative lens section (lens having a negative refractive power). In the case where a lens flat plate (lens which does not have a convex or concave surface but has a flat surface) is included, the term lens refers all of the lens flat plate and a lens section formed on the surface of the lens flat plate. In each case, an individual lens section is called a lens element.

Means for Solving the Object

An above-mentioned object is attained by an invention described in any one of the following Items 1-17.

Item 1. An imaging lens, comprising:
a first lens which is provided on the most object side and has a positive refractive power; and
a second lens which is provided on an image side of the first lens and has a concave shape toward the object side,
wherein, when a lens located on the most image side in lenses provided on the image side of the second lens is supposed as an i-th lens and i is equal to or greater than 3, the i-th lens includes:
an i-th lens flat plate; and
a lens element which is provided on at least one of an object-side surface and an image-side surface of the i-th lens flat plate, has a refractive index different than the i-th lens flat plate, and has a positive refracting power or a negative refracting power,
wherein the following conditional relationship is satisfied:
[Mathematical Expression 1]

$$0.9 > Y_{max}/Y > 0.61 \qquad (1)$$

where:
$Y_{max}$ is a distance from an optical axis to a point, which is on an image-side surface of an (i−1)th lens provided on the object side of the i-th lens, and at which a principal ray of the most outer light beam passes through; and
Y is a maximum image height depending on an optical system and a size of an imaging device.

Item 2. The imaging lens of item 1, wherein an image side surface of the (i−1)th lens has a convex shape toward the image side at the point where the principle ray of the maximum image height passes through.

Item 3. The imaging lens of item 1 or 2, wherein the following conditional relationship is satisfied:

[Mathematical Expression 2]

$$0.6 \le \frac{f_{s1}}{f} \le 1.3 \qquad (2)$$

where:

$f_{s1}$ is a focal length of an object-side lens surface of an object-side lens element of the first lens; and f is a focal length of a lens system.

Item 4. The imaging lens of any one of items 1 to 3, wherein an image-side surface of an ib-th lens element formed on an image-side surface of the i-th lens satisfies, at a position which is a distance h apart from the optical axis and at which the principal ray of the maximum image height passes through, the following relationship is satisfied:

[Mathematical Expression 3]

$$\frac{|X - X_0|}{Y} < 0.16 \qquad (3)$$

where:

X is an aspherical deviation given by the following Equation (a);

$X_0$ is an aspherical deviation of a rotational quadric surface given by the following Equation (b); and Y is a maximum image height in an optical system,

[Mathematical Expression 4]

$$X = \frac{h^2/R_{ib}}{1 + \sqrt{1 - (1 + K_{ib})h^2/R_{ib}^2}} + \sum A_m h^m \qquad \text{Equation (a)}$$

[Mathematical Expression 5]

$$X_0 = \frac{h^2/R_{ib}}{1 + \sqrt{1 - (1 + K_{ib})h^2/R_{ib}^2}} \qquad \text{Equation (b)}$$

where:

$A_{im}$ is an m-order aspherical coefficient of an image-side lens surface of the ib-th lens element;

$R_{ib}$ is a radius of curvature of the image-side lens surface of the ib-th lens element; and $K_{ib}$ is a conical coefficient of the image-side lens surface of the ib-th lens element.

Item 5. The imaging lens of any one of items 1 to 4, wherein the first lens is a cemented lens configured of a lens element having a positive refracting power and a lens element having a negative refracting power, and the following relationship is satisfied:

[Mathematical expression 6]

$$5 < |v2 - v1| < 70 \qquad (4)$$

where:

$v_1$ is an Abbe's number of the lens element, of the first lens, having a positive refracting power; and $v_2$ is an Abbe's number of the lens element, of the first lens, having a negative refracting power.

Item 6. The imaging lens of any one of items 1 to 4, wherein the first lens includes:

a first lens flat plane;

a 1f-th lens element formed on an object-side surface of the first lens flat plate and having a positive refracting power; and a 1b-th lens element formed on an image-side surface of the first lens flat plate and having a negative refracting power, wherein the following relationship is satisfied:

[Mathematical Expression 7]

$$5 < |v_2 - v_1| < 70 \qquad (4')$$

where:

$v_1$ is an Abbe's number of the lens element, of the first lens, having a positive refracting power; and $v_2$ is an Abbe's number of the lens element, of the first lens, having a negative refracting power.

Item 7. The imaging lens of any one of items 1 to 6, wherein the second lens is a meniscus lens which has a convex surface toward the image side.

Item 8. The imaging lens of any one of items 1 to 6, wherein the second lens includes:

a second lens flat plane;

a 2f-th lens element which is formed on an object-side surface of the second lens flat plane and has a negative refracting power; and a 2b-th lens element which is formed on an image-side surface of the second lens flat plane and has a positive refracting power.

Item 9. The imaging lens of any one of items 1 to 8, wherein an object-side surface of the lens element formed on an object-side surface of the i-th lens flat plate is aspheric surface having a concave shape toward the object side in the vicinity of the optical axis.

Item 10. The imaging lens of any one of items 1 to 9, comprising:

at least a lens or a lens element which are made of resin material.

Item 11. The imaging lens of any one of items 1 to 10, wherein each of the first lens to the i-th lens has a lens flat plate having a refractive index different than each lens element.

Item 12. The imaging lens of any one of items 1 to 11, wherein lens elements included in the respective lenses are made of UV hardening resin material, and the following relationship is satisfied:

$$5 < |v_1 - v_2| < 40 \qquad \text{Equation (5)}$$

where:

$v_1$ is an Abbe's number of the lens element having a positive refracting power in the first lens, or is an Abbe's number of a if-th lens element if the first lens includes an lens flat plane; and $v_2$ is an Abbe's number of the lens element having a negative refracting power in the first lens, or is an Abbe's number of a 1b-th lens element if the first lens includes a lens flat plate.

Item 13. The imaging lens of any one of items 1 to 12, wherein i=3 for the i-th lens.

Item 14. The imaging lens of any one of items 1 to 13, wherein any one of the lens flat plates included in the lenses has an optical functional thin film on the surface thereof.

Item 15. The imaging lens of any one of items 1 to 14, wherein the lens elements have an aspherical shape on a lens surface other than a surface which is in touch with the lens flat plate.

Item 16. An imaging device, comprising:

the imaging lens of any one of items 1 to 16; and a solid-state image sensor.

Item 17. A mobile terminal, comprising:

the imaging device of item 16.

ADVANTAGE OF THE INVENTION

According to the present invention, in order to satisfy the conditional relationship, the object-side surface of the (i−1) the lens disposed on the object side of the i-th lens has a greater curvature in the vicinity of a point where the most off-axial ray passes through than in the vicinity of the optical axis. By selecting an appropriate surface shape for this curved surface, an incidence angle of the off-axial ray into the solid-state image sensor is controlled even when the aspheric surface sag amount of the ib-th lens element.

It is more preferable that a lens element is formed on both of the object side and the image side of the i-th lens flat plate, and in that case, the incidence angle of the peripheral light into the solid-state image sensor is more precisely controlled. For example, it is possible to vary the incidence angle between the vicinity of a 60% image height and higher than 90% image height, as shown in the embodiments.

NUMERALS

10 First Lens flat plate
10a Aperture diaphragm
11 1f-th lens Element
12 1b-th lens Element
20 Second Lens flat plate
21 2f-th lens Element
22 2b-th lens Element
101, S104, S105, S108, S109 and S112 Lens surfaces

BEST MODE FOR CARRYING OUT THE INVENTION

Hereinafter, a lens portion formed on a surface of a lens flat plate will be referred to as a lens element in each case. In the case where an L-th lens from the object side includes a lens flat plate, which is referred to as an L-th lens flat plate. A lens element disposed on an object side of the above mentioned L-th lens flat plate is referred to as an Lf-th lens element. A lens element arranged on an image side of the above mentioned L-th lens flat plate is referred to as Lb-th lens element. Here, L (L=1, 2, 3, 4 - - - ) represents the number of a lens in order from the object side. Hereinafter, a lens at the most image-side may be referred to as an i-th lens. The image side refers to a side on which an image formation is performed after a light passes through an imaging lens. Hereinafter, in the case where a solid-state image pick-up device (CCD) is used, the maximum image height refers to the highest (most distant from an optical axis) image height defined by a size of the sensor. Further, in the case where only lens system is taken into consideration, the maximum image height refers to the highest position of the image formed through the lens. A principal ray is a light ray that passes through the center of an aperture diaphragm (or an incidence pupil in object space) in an optical system. The term "most object side" means the side mutually facing the object.

First Embodiment of the Present Invention

Figure 1:
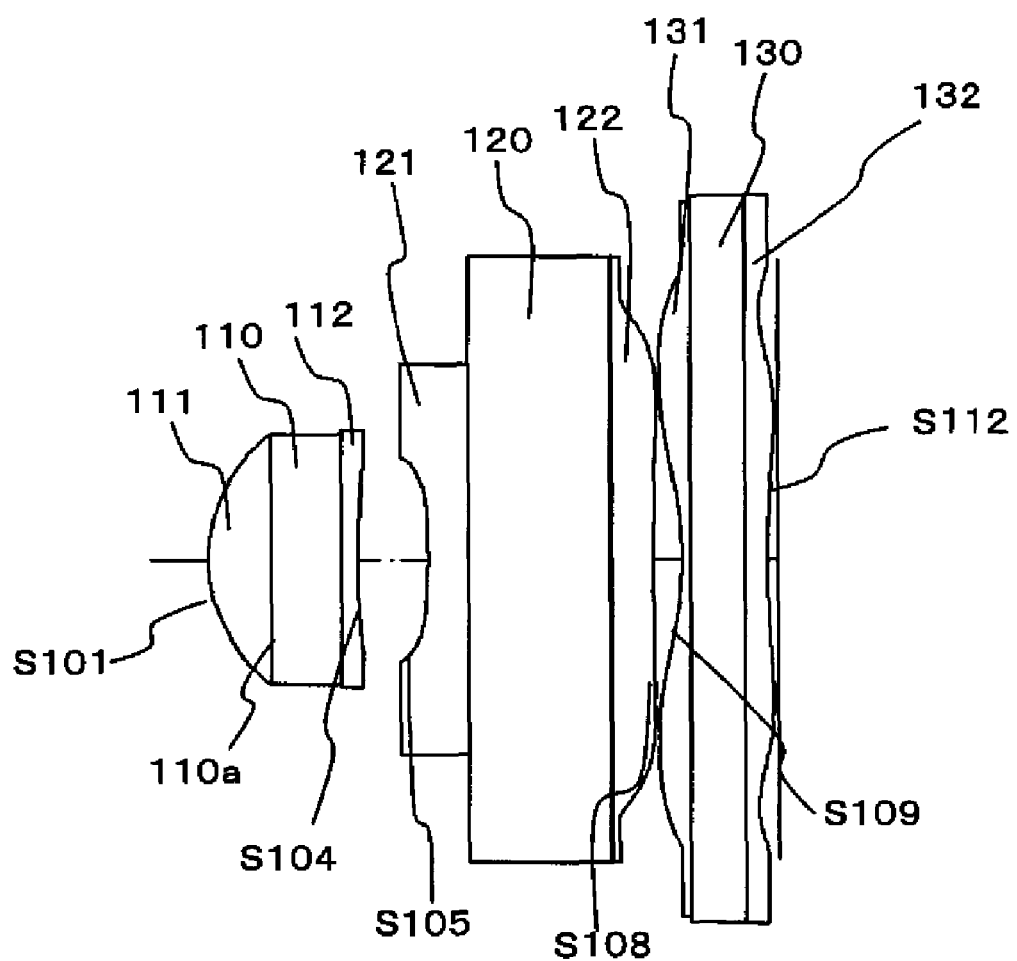
FIG. 1 is a diagram showing a sectional view of an imaging lens according to a first embodiment.

Hereinafter, an imaging lens according to a first embodiment of the present invention will be described. FIG. 1 illustrates a sectional view of the imaging lens according to this embodiment of the present invention.

As illustrated in FIG. 1, the imaging lens according to this embodiment of the present invention is configured of a lens system including a 1f-th lens element 111, an aperture diaphragm 110a, a first lens flat plate 110, a 1b-th lens element 112, a 2f-th lens element 121, a second lens flat plate 120, a 2b-th lens element 122, a 3f-th lens element 131, a third lens flat plate 130 and a 3b-th lens element 132 in the order from the object side. Here, the imaging lens configured of three lenses is described in this embodiment. However, the imaging lens may be configured of more lenses. For example, in the case where "i" (i>=4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 111 has a convex surface directed toward the object side and has a positive refractive power. The image side surface of the 1b-th lens element 112 has a concave surface directed toward the image side and has a negative refractive power. The object side surface of the 2f-th lens element 121 has a concave surface directed toward the object side and has a negative refractive power. The image side surface of the 2b-th lens element 122 has a concave surface directed toward the image side and has a negative refractive power. An 3f-th lens element 131 has a concave surface directed toward the object side and has a negative refractive power near the optical axis of the object side surface. The 3f-th lens element has a convex surface directed toward the object side in the periphery of the object side surface. It should be noted that Ymax/Y=0.8 is satisfied in this embodiment, which is satisfies the conditional relationship (1). In this embodiment of the present invention, the 1f-th lens element 111, the 1b-th lens element 112, the 2f-th lens element 121, the 2b-th lens element 122, the 3f-th lens element 131, the third lens flat plate 130 and the 3b-th lens element 132 are made of a UV hardening type resin. The Abbe's number ν1 of the 1f-th lens element 111 is set to 54. The Abbe's number ν2 of the 1b-th lens element 112 is set to 29. Lens surfaces S101, S104, S105, S108, S109 and S112 have aspheric surface form.

In the embodiment having the above mentioned configuration, each parameter value of the imaging lens is as illustrated in Table 1 below. Here, "Sm" represents the m-th surface number sequentially from the object side. "Sm" also represents each surface of a lens element and a lens flat plate. The mutually bonded two surfaces are counted as one as a whole.

TABLE 1

| Sm | Curvature Radius (mm) | Surface Distance on Axis (mm) | Refractive Index | Abbe's Number | FIG. 1 |
|---|---|---|---|---|---|
| 1* | 0.926 | 0.350 | 1.507 | 54 | S101 |
| 2 (ape) | ∞ | 0.385 | 1.587 | 50.919 | |
| 3 | ∞ | 0.092 | 1.574 | 29 | |
| 4* | 5.000 | 0.400 | | | S104 |
| 5* | −4.704 | 0.224 | 1.574 | 29 | S105 |
| 6 | ∞ | 0.797 | 1.587 | 50.919 | |
| 7 | ∞ | 0.231 | 1.574 | 29 | |
| 8* | −215.669 | 0.160 | | | S108 |
| 9* | −1.863 | 0.050 | 1.574 | 29 | S109 |
| 10 | ∞ | 0.300 | 1.587 | 50.919 | |
| 11 | ∞ | 0.130 | 1.574 | 29 | |
| 12* | 6.849 | 0.058 | | | S112 |

In this embodiment of the present invention, a difference in the Abbe's numbers of the 1f-th lens element 111 and the 1b-th lens element 112 is represented by $|\nu_1-\nu_2|=25$. Thus, the difference in the Abbe's number satisfies the conditional relationship (5). A ratio of fsl/f=1.04 where "fsl" represents a focal length of the object side surface of the 1f-th lens element 111 and "f" represents a focal length of the overall optical system. Thus, the ratio of fsl/f satisfies the conditional relationship (2).

Figure 2A:
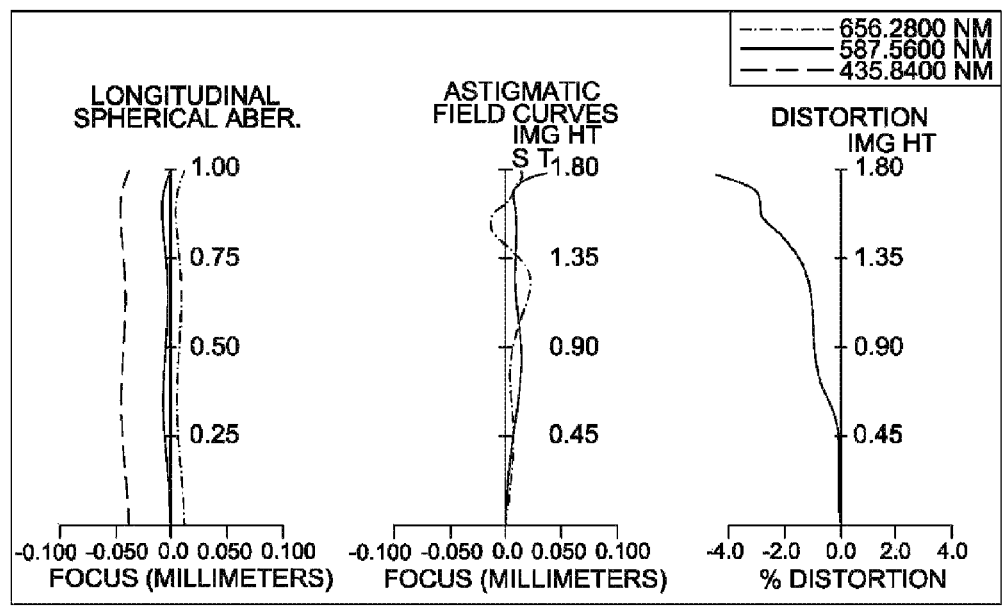
FIG. 2A is a graph showing aberrations of the imaging lens according to the first embodiment.
Figure 2B:
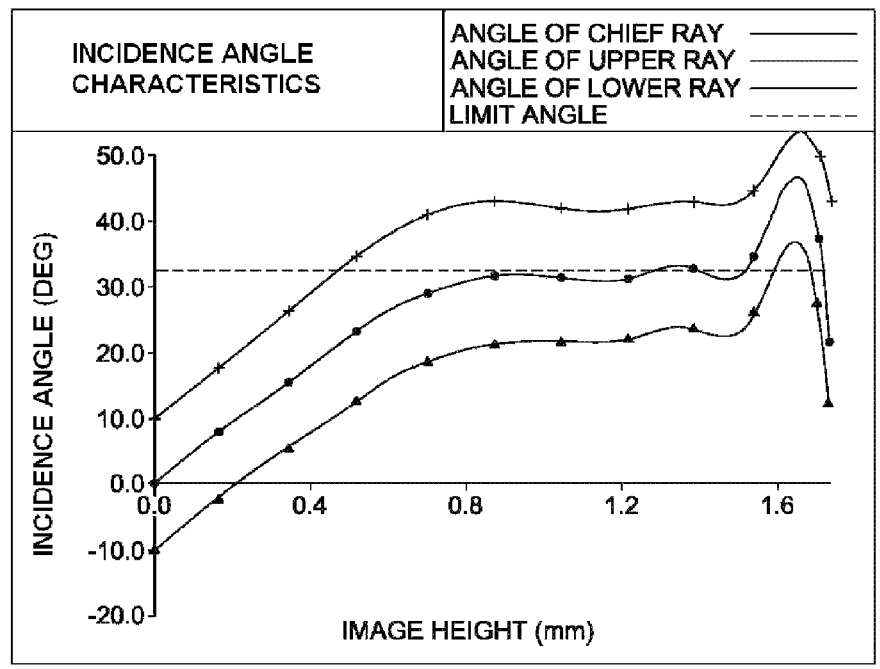
FIG. 2B is a graph showing characteristics of incidence angle, of the imaging lens according to the first embodiment, into a solid-state image sensor.

FIG. 2A is a graph showing aberrations of the imaging lens of FIG. 1, and FIG. 2B is a graph showing characteristics of an incidence angle, of the imaging lens of FIG. 1, into a solid-state image sensor. FIG. 2A illustrates spherical aberration, astigmatism and distortion from the left. The spherical aberration graph illustrates how much the deviation of a focal position depends on the height of the incident light. In one spherical lens, the focal position shifts in the negative direction as the height of the incident light becomes higher. The spherical aberration graph in FIG. 2A illustrates deviation amounts for the lights of three waves. Here, the maximum height of the incident light is assumed to be 1 on the vertical axis. The astigmatism graph illustrates the focal point (the deviation amount from the paraxial focal point that is assumed to be zero) on a sagittal surface and a meridional surface. Here, a solid line represents a sagittal. The astigmatism graph in FIG. 2A indicates the amount at an image height "IMG HT". A distortion graph displays the shift amount, of the actual image height from the ideal image height, normalized by an image height. The paraxial value is assumed to be 0%. Similar aberration graphs to the above are used for all of the following embodiments. It should be noted that the curves in FIG. 2B are drawn by automatically interpolating the sample points using a computer in order to clearly show a trend, and it is quite apart from actual data value. The sample points (dots) are correct as data value. This discussion can be applied to all the following embodiments. Although the lens system is simply configured, the lens system satisfies the conditional relationships (1), (2) and (5), so that the overall optical length is short. Further, as illustrated in FIGS. 2A, 2B the lens system obtains satisfactory aberration properties, allows the most image-side resin layer to be thin, and controls the incidence light, of the peripheral light, into the surface of the solid-state image sensor. By using the resin material, the cost can be maintained low, the production can be performed easily, a large quantity of lenses can be made at one time by irradiating UV light after a lens element has been formed on a glass plate. Also, the compatibility with the replica method is good.

Not only in this embodiment but other embodiments of the present invention, the aspheric surface is defined by the following mathematical expression. That is, where "X" represents a distance (sag amount), in the optical axis direction, from the tangent plane of a surface apex to the aspheric surface, "$\rho$" represents the height of the aspheric surface above the optical axis, "R" represents a paraxial curvature radius, "K" represents a conic constant and "$A_q$" (q=4, 6, 8, - - - , 20) represents q-th aspheric surface coefficient.

$$X = \frac{\rho^2/R}{1+\sqrt{1-(1+K)\rho^2/R^2}} + \sum A_q \rho^q \quad \text{[Mathematical Expression 8]}$$

Therefore, the following Table 2 illustrates the value of "$A_q$" at the above-mentioned "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_0|/Y=0.07. \quad \text{[Mathematical Expression 9]}$$

Thus, the conditional relationship (3) is satisfied.

Second Embodiment

Figure 3:
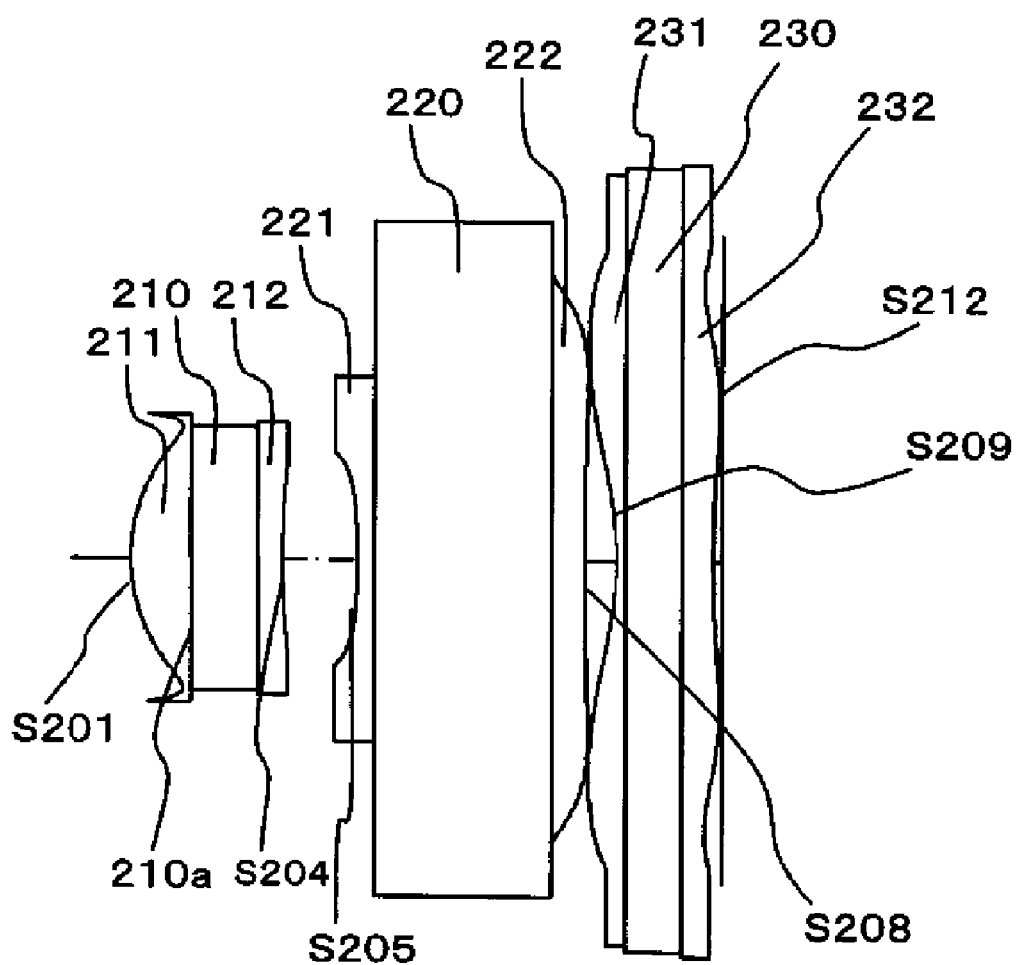
FIG. 3 is a diagram showing a sectional view of an imaging lens according to a second embodiment.

FIG. 3 illustrates a sectional view of the imaging lens according to an second embodiment of the present invention.

As illustrated in FIG. 3, the imaging lens according to this embodiment of the present invention is configured of a lens system including a 1f-th lens element 211, an aperture diaphragm 210a, a first lens flat plate 210, a 1b-th lens element 212, a 2f-th lens element 221, a second lens flat plate 220, a 2b-th lens element 222, a 3f-th lens element 231, a third lens flat plate 230 and a 3b-th lens element 232 in the order from the object side. Here, the imaging lens configured of three lenses is described in this embodiment. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 211 has a convex surface directed toward the object side and has a positive refractive power. The image side surface of the 1b-th lens element 212 has a concave surface directed toward the image side and has a negative refractive power. The object side surface of the 2f-th lens element 221 has a concave surface directed toward the object side and has a negative refractive power. The image side surface of the 2b-th lens element 222 has a concave surface directed toward the image side and has a negative refractive power. An 3f-th lens element 231 has a concave surface directed toward the object side and has a negative refractive power near the optical axis of the object side surface. The 3f-th lens element 231 has a convex surface directed toward the object side in the periphery of the object side surface. An equation Ymax/Y=0.82 is held in the embodiment, and the conditional relationship (1) is satisfied. In this embodiment of the present invention, the 1f-th lens element 211, the 1b-th lens element 212, the 2f-th lens element 221, the 2b-th lens element 222, the 3f-th lens element 231, the third lens flat plate 230 and the 3b-th lens element 232 are made of a UV hardening type resin. The Abbe's number v1 of the 1f-th lens element 211 is set to 54. The Abbe's number v2 of the 1b-th lens element 212 is set to 29. Lens surfaces S201, S204, S205, S208, S209 and S212 have aspheric surface form. The material used for each of the lens flat plate is different.

In the embodiment having the above mentioned configuration, each parameter value of the imaging lens is as illustrated in Table 3 below. Here, "Sm" represents the m-th surface number sequentially from the object side. "Sm" also represents each surface of a lens element and a lens flat plate. The mutually bonded two surfaces are counted as one as a whole.

TABLE 2

| S | K | A | B | C | D |
|---|---|---|---|---|---|
| 1 | 2.626E−01 | −3.537E−02 | −4.638E−01 | 2.010E+00 | −3.185E+00 |
| 4 | 6.205E+00 | 9.448E−03 | −2.448E−01 | 2.828E+00 | −1.171E+01 |
| 5 | −3.595E+01 | −4.986E−01 | 4.747E−01 | −6.496E+00 | 8.956E+00 |
| 8 | −1.000E+03 | 7.714E−02 | −1.096E−01 | 4.982E−02 | 1.557E−04 |
| 9 | −2.494E+00 | 1.430E−01 | −2.416E−02 | −4.832E−03 | 8.509E−04 |
| 12 | −1.000E+03 | 1.857E−01 | −3.212E−01 | 1.556E−01 | −1.705E−02 |

| S | E | F | G | H | J |
|---|---|---|---|---|---|
| 1 | −9.518E+00 | 3.442E+01 | −3.561E+01 | 9.604E+01 | 2.944E+00 |
| 4 | 1.334E+00 | 5.492E+01 | 1.366E+01 | −3.019E+01 | −3.271E+02 |
| 5 | 1.709E+01 | −5.982E+01 | −2.928E+01 | −7.829E+01 | −2.395E+02 |
| 8 | −8.714E−03 | −1.259E−03 | 1.202E−03 | 2.678E−04 | −8.898E−05 |
| 9 | 6.818E−04 | −1.263E−04 | 0.000E+00 | 0.000E+00 | 0.000E+00 |
| 12 | −5.055E−03 | 4.659E−04 | 2.479E−04 | 2.593E−05 | −1.654E−05 |

TABLE 3

| Sm | Curvature Radius (mm) | Surface Distance on Axis (mm) | Refractive Index | Abbe's Number | FIG. 3 |
|---|---|---|---|---|---|
| 1* | 0.929 | 0.320 | 1.507 | 54 | S201 |
| 2 (ape) | ∞ | 0.367 | 1.565 | 61.701 | |
| 3 | ∞ | 0.129 | 1.574 | 29 | |
| 4* | 5 | 0.400 | | | S204 |
| 5* | −5.074 | 0.094 | 1.574 | 29 | S205 |
| 6 | ∞ | 0.952 | 1.487 | 70.44 | |
| 7 | ∞ | 0.177 | 1.574 | 29 | |
| 8* | −162.583 | 0.170 | | | S208 |
| 9* | −1.727 | 0.050 | 1.574 | 29 | S209 |
| 10 | ∞ | 0.300 | 1.820 | 29.004 | |
| 11 | ∞ | 0.170 | 1.574 | 29 | |
| 12* | 5.722 | 0.049 | | | S212 |

In this embodiment of the present invention, a difference in the Abbe's numbers of the 1f-th lens element 211 and the 1b-th lens element 212 is represented by $|v_1-v_2|=25$. Thus, the difference in the Abbe's number satisfies the conditional relationship (5). A ratio of fsl/f=1.04 where "fsl" represents a focal length of the object side surface of the 1f-th lens element 111 and "f" represents a focal length of the overall optical system. Thus, the ratio of fsl/f satisfies the conditional relationship (2).

Figure 4A:
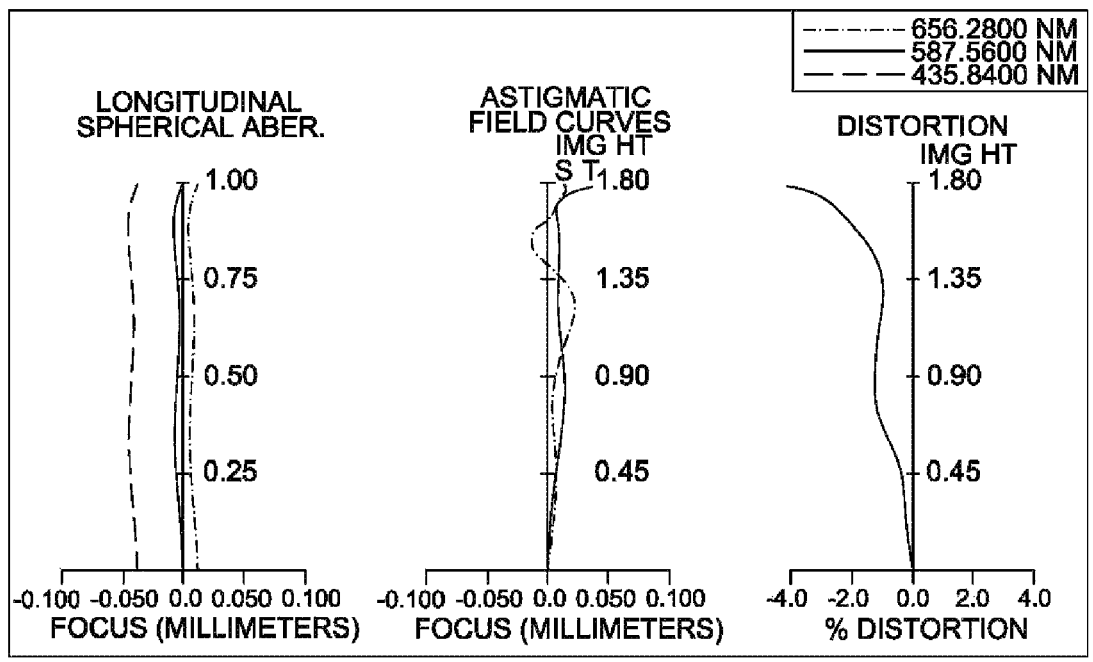
FIG. 4A is a graph showing aberrations of the imaging lens according to the second embodiment.
Figure 4B:
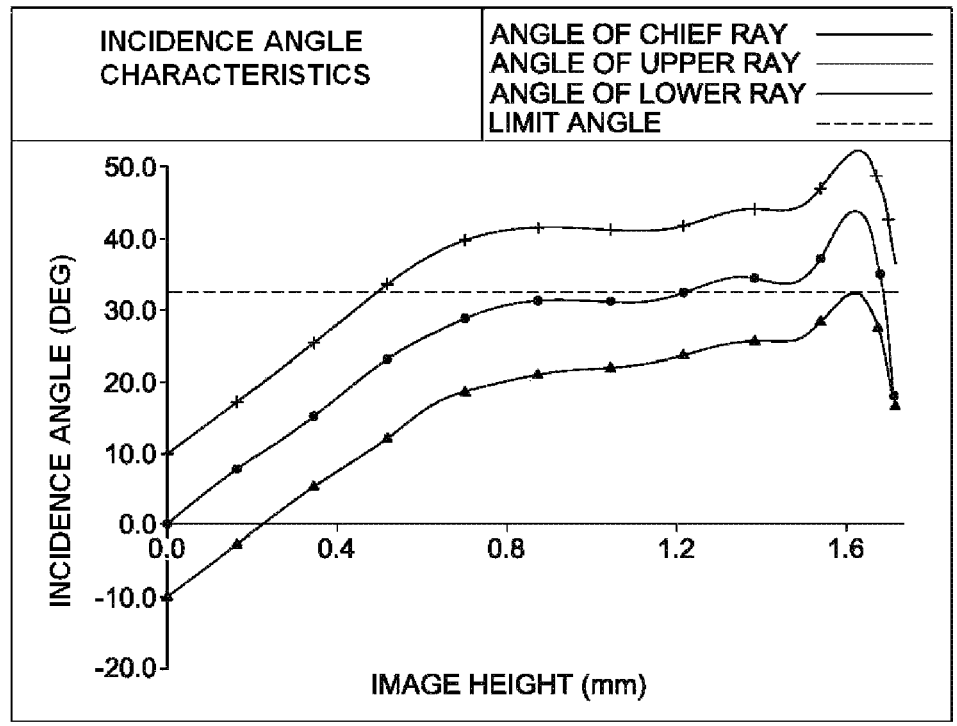
FIG. 4B is a graph showing characteristics of incidence angle, of the imaging lens according to the second embodiment, into a solid-state image sensor.

FIG. 4A is a graph showing aberrations of the imaging lens of FIG. 3, and FIG. 4B is a graph showing characteristics of an incidence angle, of the imaging lens of FIG. 2, into a solid-state image sensor. Although the lens system is simply configured, the lens system satisfies the conditional relationships (1), (2), and (5), so that the overall optical length is short. Further, as illustrated in FIGS. 4A, 4B the lens system obtains satisfactory aberration properties and allows the most image-side resin layer to be thin, and controls the incidence light, of the peripheral light, into the surface of the solid-state image sensor. By using resin material, the cost can be maintained low, the production can be performed easily.

The following Table 4 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_0|/Y=0.10. \qquad \text{[Mathematical Expression 10]}$$

Thus, the conditional relationship (3) is satisfied.

Third Embodiment

Figure 5:
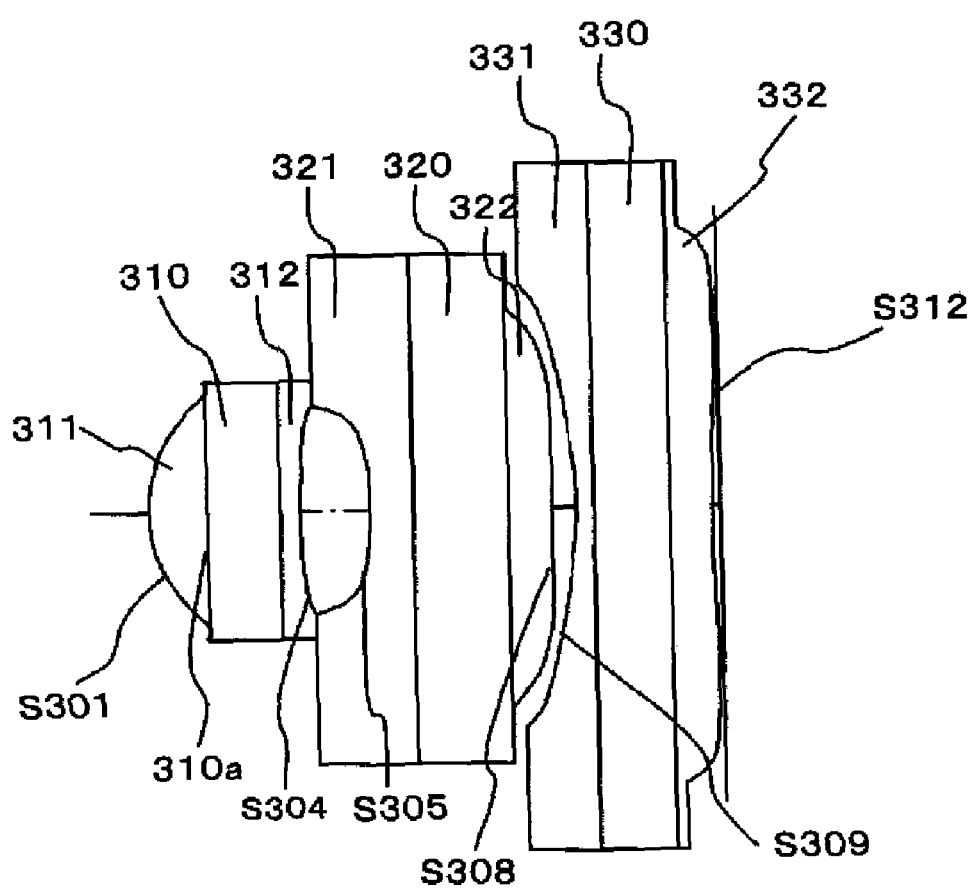
FIG. 5 is a diagram showing a sectional view of an imaging lens according to a third embodiment.

FIG. 5 illustrates a sectional view of the imaging lens according to a third embodiment of the present invention.

As illustrated in FIG. 5, the imaging lens according to this embodiment of the present invention is configured of a lens system including a 1f-th lens element 311, an aperture diaphragm 310a, a first lens flat plate 310, a 1b-th lens element 312, a 2f-th lens element 321, a second lens flat plate 320, a 2b-th lens element 322, a 3f-th lens element 331, a third lens flat plate 330 and a 3b-th lens element 332 in the order from the object side. Here, the imaging lens configured of three lenses is described in this embodiment. However, the imaging lens may be configured of more lenses. For example, in the case where "i" (i>=4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 311 has a convex surface directed toward the object side and has a positive refractive power. The image side surface of the 1b-th lens element 312 has a concave surface directed toward the image side and has a negative refractive power. The object side surface of the 2f-th lens element 321 has a concave surface directed toward the object side and has a negative refractive power. The image side surface of the 2b-th lens element 322 has a convex surface directed toward the image side and has a positive refractive power. An 3f-th lens element 331 has a concave surface directed toward the object side and has a negative refractive power near the optical axis of the object side surface. The 3f-th lens element 331 has a convex surface directed toward the object side in the periphery of the object side surface. An equation Ymax/Y=0.82 is held in the embodiment, and the conditional relationship (1) is satisfied. In this embodiment of the present invention, the 1f-th lens element 311, the 1b-th lens element 312, the 2f-th lens element 321, the 2b-th lens element 322, the 3f-th lens element 331, and the 3b-th lens element 332 are made of a UV hardening type resin. The Abbe's number v1 of the 1f-th lens element 311 is set to 54. The Abbe's number v2 of the 1b-th lens element 312 is set to 29. Lens surfaces S301, S304, S305, S308, S309 and S312 have aspheric surface form.

TABLE 4

| S | K | A | B | C | D |
|---|---|---|---|---|---|
| 1 | 2.688E−01 | −3.546E−02 | −4.430E−01 | 1.980E+00 | −3.605E+00 |
| 4 | 5.340E+00 | 6.522E−03 | −1.058E−01 | 1.046E+00 | −2.184E+00 |
| 5 | −1.422E+01 | −4.543E−01 | 4.281E−01 | −5.903E+00 | 6.893E+00 |
| 8 | −1.000E+03 | 7.941E−02 | −9.730E−02 | 3.848E−02 | 2.471E−03 |
| 9 | −3.343E+00 | 1.334E−01 | −2.671E−02 | −4.747E−03 | 1.237E−03 |
| 12 | −1.000E+03 | 1.775E−01 | −3.192E−01 | 1.618E−01 | −1.871E−02 |

| S | E | F | G | H | J |
|---|---|---|---|---|---|
| 1 | −9.849E+00 | 4.106E+01 | −3.183E+01 | −7.537E+00 | −5.419E+01 |
| 4 | −1.723E+01 | 5.747E+01 | 1.366E+01 | −3.019E+01 | −3.271E+02 |
| 5 | 1.780E+01 | −5.061E+01 | −3.040E+01 | −8.285E+01 | −2.395E+02 |
| 8 | −8.244E−03 | −1.068E−03 | 1.246E−03 | 2.664E−04 | −1.220E−04 |
| 9 | 8.670E−04 | −1.959E−04 | 0.000E+00 | 0.000E+00 | 0.000E+00 |
| 12 | −6.078E−03 | 6.973E−04 | 2.866E−04 | 2.898E−05 | −1.947E−05 |

In the embodiment having the above mentioned configuration, each parameter value of the imaging lens is as illustrated in Table 5 below. Here, "Sm" represents the m-th surface number sequentially from the object side. "Sm" also represents each surface of a lens element and a lens flat plate. The mutually bonded two surfaces are counted as one as a whole.

TABLE 5

| Sm | Curvature Radius (mm) | Surface Distance on Axis (mm) | Refractive Index | Abbe's Number | FIG. 5 |
|---|---|---|---|---|---|
| 1* | 0.875 | 0.330 | 1.507 | 54 | S301 |
| 2(ape) | ∞ | 0.425 | 1.565 | 61.701 | |
| 3 | ∞ | 0.116 | 1.574 | 29 | |

TABLE 5-continued

| Sm | Curvature Radius (mm) | Surface Distance on Axis (mm) | Refractive Index | Abbe's Number | FIG. 5 |
|---|---|---|---|---|---|
| 4* | 5.000 | 0.400 | | | S304 |
| 5* | −3.488 | 0.250 | 1.574 | 29 | S305 |
| 6 | ∞ | 0.548 | 1.487 | 70.440 | |
| 7 | ∞ | 0.250 | 1.574 | 29 | |
| 8* | 15.064 | 0.140 | | | S308 |
| 9* | −2.044 | 0.101 | 1.574 | 29 | S309 |
| 10 | ∞ | 0.435 | 1.820 | 29.004 | |
| 11 | ∞ | 0.243 | 1.574 | 29 | |
| 12* | 3.170 | 0.047 | | | S312 |

In this embodiment of the present invention, a difference in the Abbe's numbers of the 1f-th lens element 311 and the 1b-th lens element 312 is represented by $|v_1 - v_2| = 25$. Thus, the difference in the Abbe's number satisfies the conditional relationship (5). A ratio of fsl/f=1.14 where "fsl" represents a focal length of the object side surface of the 1f-th lens element 311 and "f" represents a focal length of the overall optical system. Thus, the ratio of fsl/f satisfies the conditional relationship (2).

Figure 6A:
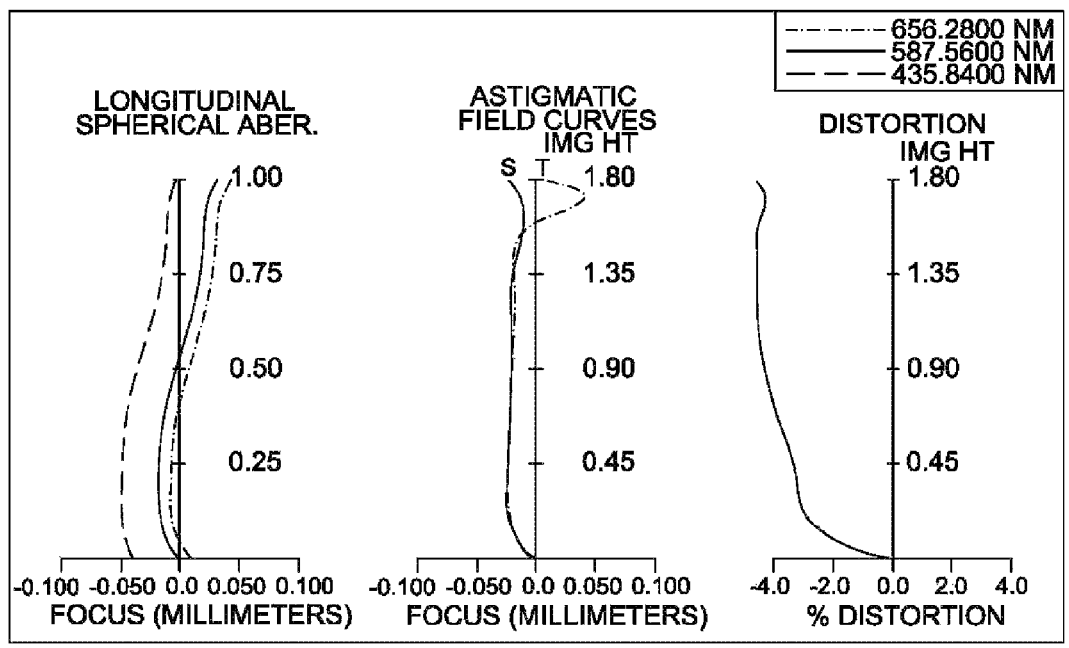
FIG. 6A is a graph showing aberrations of the imaging lens according to the third embodiment.
Figure 6B:
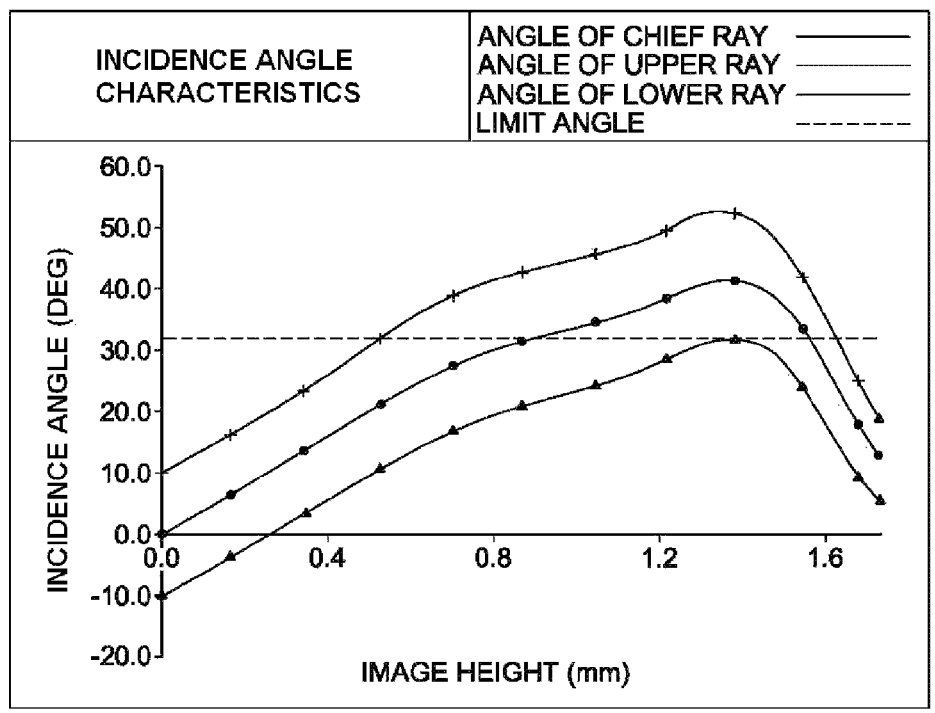
FIG. 6B is a graph showing characteristics of incidence angle, of the imaging lens according to the third embodiment, into a solid-state image sensor.

FIG. 6A is a graph showing aberrations of the imaging lens of FIG. 5, and FIG. 6B is a graph showing characteristics of an incidence angle, of the imaging lens of FIG. 5, into a solid-state image sensor. Although the lens system is simply configured, the lens system satisfies the conditional relationships (1), (2), and (4), so that the overall optical length is short. Further, as illustrated in FIGS. 6A, 6B the lens system obtains satisfactory aberration properties and allows the most image-side resin layer to be thin, and controls the incidence light, of the peripheral light, into the surface of the solid-state image sensor. By using UV hardening resin, the cost can be maintained low, the production can be performed easily, a large quantity of lenses can be made at one time by irradiating UV light after a lens element has been formed on a glass plate. Also, the compatibility with the replica method is good.

The following Table 6 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X - X_0|/Y = 0.14.$$

Thus, the conditional relationship (3) is satisfied.

TABLE 6

| S | K | A | B | C | D |
|---|---|---|---|---|---|
| 1 | 2.466E−01 | −5.703E−02 | −4.533E−01 | 2.097E+00 | −3.030E+00 |
| 4 | 4.057E+00 | 2.851E−02 | 3.388E−01 | −2.189E−01 | −3.797E+00 |
| 5 | 5.380E+00 | −5.784E−01 | 6.519E−01 | −7.689E+00 | 1.051E+01 |
| 8 | −1.000E+09 | 2.770E−03 | −1.584E−01 | 7.445E−02 | 7.607E−03 |
| 9 | −3.317E+01 | −4.389E−02 | 2.770E−02 | −2.982E−03 | −5.503E−04 |
| 12 | −1.000E+09 | 1.738E−01 | −2.723E−01 | 1.425E−01 | −1.753E−02 |

| S | E | F | G | H | J |
|---|---|---|---|---|---|
| 1 | −1.088E+01 | 3.007E+01 | −1.053E+01 | −6.423E+00 | −4.760E+01 |
| 4 | −3.639E+00 | 6.299+01 | 1.362E+01 | −3.013E+01 | −3.262E+02 |
| 5 | 1.701E+01 | −6.558E+01 | −4.454E+01 | −1.181E+02 | −3.630E+02 |
| 8 | −1.338E−02 | −1.117E−03 | −3.113E−03 | −1.404E−03 | 2.425E−03 |
| 9 | −2.762E−03 | 9.409E−04 | −4.847E−04 | −8.225E−04 | 3.829E−04 |
| 12 | −5.025E−03 | 3.138E−04 | 1.976E−04 | 2.593E−05 | −1.008E−05 |

Fourth Embodiment

Figure 7:
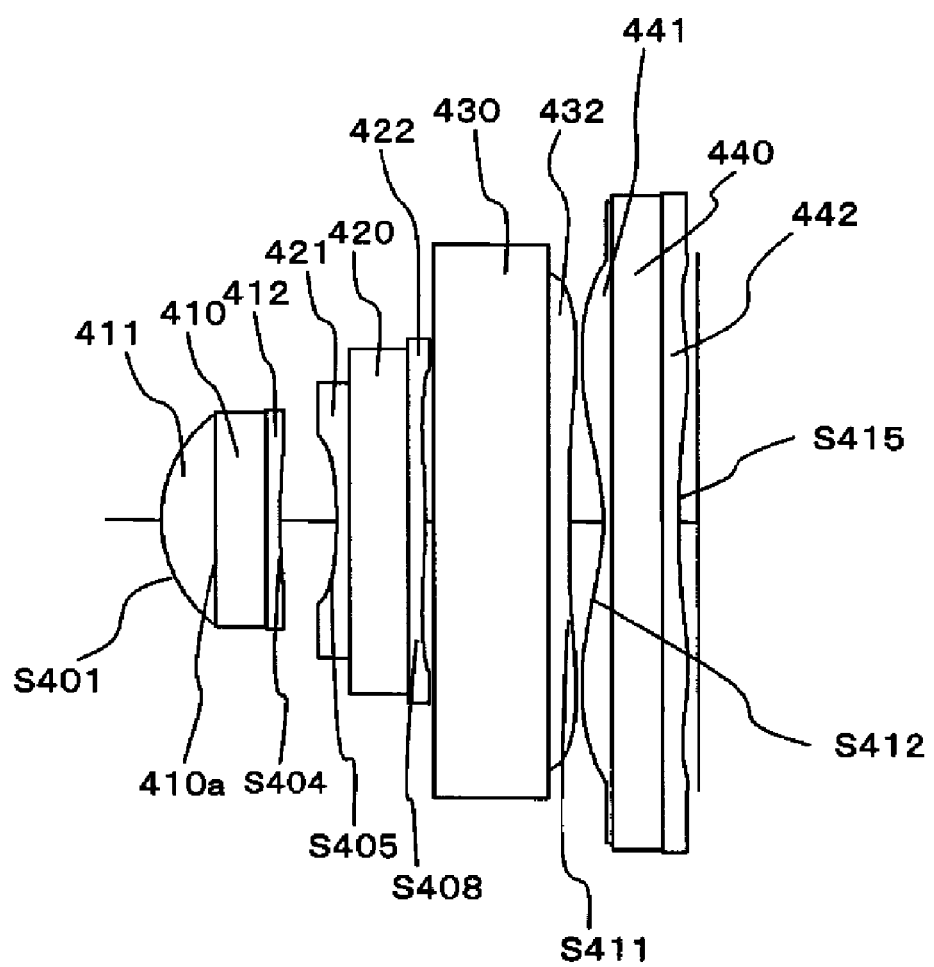
FIG. 7 is a diagram showing a sectional view of an imaging lens according to a fourth embodiment.

FIG. 7 illustrates a sectional view of the imaging lens according to a fourth embodiment of the present invention.

As illustrated in FIG. 7, the imaging lens according to this embodiment of the present invention is configured of a lens system including a 1f-th lens element 411, an aperture diaphragm 410a, a first lens flat plate 410, a 1b-th lens element 412, a 2f-th lens element 421, a second lens flat plate 420, a 2b-th lens element 422, a third lens flat plate 430, a 3b-th lens element 432, a 4f-th lens element 441, a 4-th lens flat plate 440, and a 4b-th lens element 442 in the order from the object side. Here, the imaging lens configured of fourth lenses is described in this embodiment. However, the imaging lens may be configured of more lenses. For example, in the case where "i" (i≧5) number of lenses are used, an i-th lens disposed at the most image side may be configured similar to the fourth lens in this embodiment. In this case, any kind of lens (for example, a bonded lens, a spherical lens or an aspherical lens) may be used in between the fourth lens and the i-th lens. Further, as long as the requested compactness can be secured, the number of lenses is not limited to four, and the number of lenses may be five or six. The object side surface of the 1f-th lens element 411 has a convex surface directed toward the object side and has a positive refractive power. The image side surface of the 1b-th lens element 412 has a concave surface directed toward the image side and has a negative refractive power. The object side surface of the 2f-th lens element 421 has a concave surface directed toward the object side and has a negative refractive power. The image side surface of the 2b-th lens element 422 has a convex surface directed toward the image side and has a positive refractive power. The image side surface of the 3b-th lens element 431 has a convex surface directed toward the image side and has a positive refractive power. The object side surface of the 4f-th lens element 441 has a concave surface directed toward the object side and has a negative refractive power. The image side of the 4b-th lens element 442 has a concave surface directed toward the image side and has a negative refractive power. An equation Ymax/Y=0.82 is held in the embodiment, and the conditional relationship (1) is satisfied. In this embodiment of the present invention, the 1f-th lens element 411, the aperture diaphragm 410*a*, the first lens flat plate 410, the 1b-th lens element 412, the 2f-th lens element 421, the second lens flat plate 420, the 2b-th lens element 422, the third lens flat plate 430, the 3b-th lens element 432, the 4f-th lens element 441, the 4-th plate lens 440 and the 4b-th lens element 442 are made of a UV hardening type resin. The Abbe's number v1 of the 1f-th lens element 411 is set to 54. The Abbe's number v2 of the 1b-th lens element 412 is set to 29. Lens surfaces S401, S404, S405, S408, S411, S412 and S415 have aspheric surface form.

In the embodiment having the above mentioned configuration, each parameter value of the imaging lens is as illustrated in Table 7 below. Here, "Sm" represents the m-th surface number sequentially from the object side. "Sm" also includes each surface of a lens element and a lens flat plate. Surfaces mutually bonded are counted as one as a whole.

TABLE 7

| Sm | Curvature Radius (mm) | Surface Distance on Axis (mm) | Refractive Index | Abbe's Number | FIG. 7 |
|---|---|---|---|---|---|
| 1* | 0.923 | 0.330 | 1.507 | 54 | S401 |
| 2(ape) | ∞ | 0.300 | 1.530 | 48.910 | |
| 3 | ∞ | 0.080 | 1.574 | 29 | |
| 4* | 5.000 | 0.336 | | | S404 |
| 5* | −3.144 | 0.075 | 1.574 | 29 | S405 |
| 6 | ∞ | 0.359 | 1.530 | 48.910 | |
| 7 | ∞ | 0.100 | 1.574 | 29 | |
| 8* | −4.805 | 0.050 | | | |
| 9 | ∞ | 0.678 | 1.530 | 48.910 | |
| 10 | ∞ | 0.132 | 1.574 | 29 | |
| 11* | −277.220 | 0.200 | | | S411 |

TABLE 7-continued

| Sm | Curvature Radius (mm) | Surface Distance on Axis (mm) | Refractive Index | Abbe's Number | FIG. 7 |
|---|---|---|---|---|---|
| 12* | −1.681 | 0.050 | 1.574 | 29 | S412 |
| 13 | ∞ | 0.300 | 1.530 | 48.910 | |
| 13 | ∞ | 0.100 | 1.574 | 29 | |
| 14 | 15.376 | 0.108 | | | S414 |

In this embodiment of the present invention, a difference in the Abbe's numbers of the 1f-th lens element 411 and the 1b-th lens element 412 is represented by $|v1-v2|=25$. Thus, the difference in the Abbe's number satisfies the conditional relationship (5). A ratio of fsl/f=1.01 where "fsl" represents a focal length of the object side surface of the 1f-th lens element 411 and "f" represents a focal length of the overall optical system. Thus, the ratio of fsl/f satisfies the conditional relationship (2).

Figure 8A:
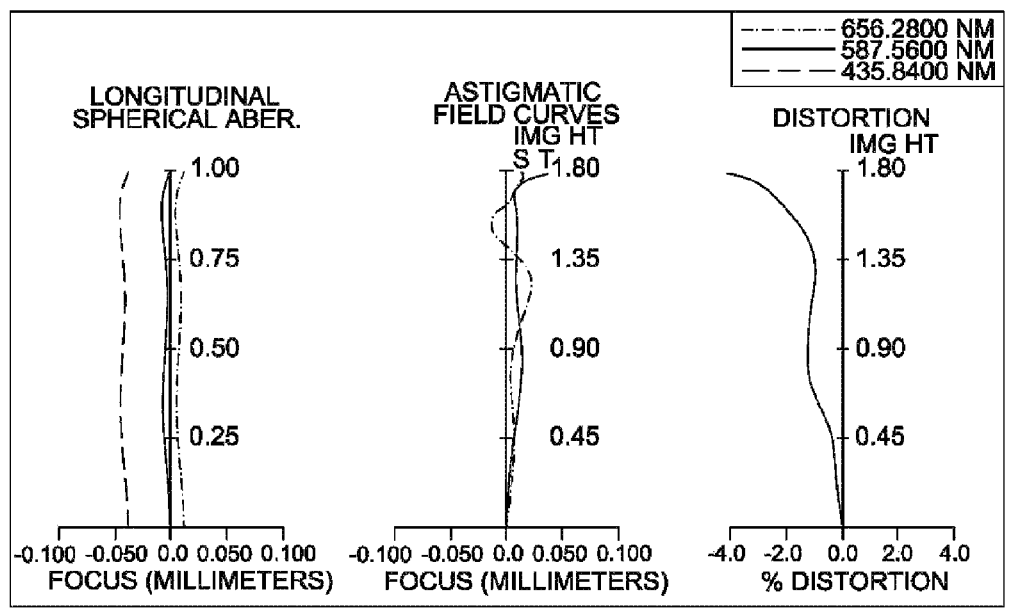
FIG. 8A is a graph showing aberrations of the imaging lens according to the fourth embodiment.
Figure 8B:
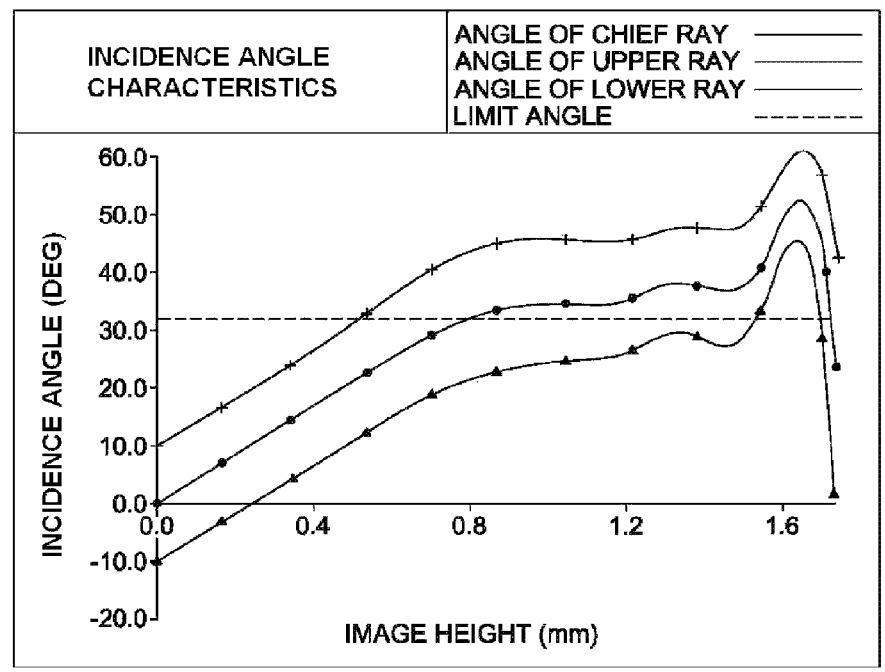
FIG. 8B is a graph showing characteristics of incidence angle, of the imaging lens according to the fourth embodiment, into a solid-state image sensor.

FIG. 8A is a graph showing aberrations of the imaging lens of FIG. 7, and FIG. 8B is a graph showing characteristics of an incidence angle, of the imaging lens of FIG. 7, into a solid-state image sensor. The lens system is simply configured. The lens system satisfies the conditional relationships (1), (2), and (5) so that the overall optical length is short. Further, as illustrated in FIGS. 8A, 8B the lens system obtains satisfactory aberration properties and allows the most image-side resin layer to be thin, and controls the incidence light, of the peripheral light, into the surface of the solid-state image sensor. By using the UV hardening type resin material, the cost can be maintained low, the production can be performed easily, and a large quantity of lenses can be generated at one time by irradiating UV light after a lens element has been formed on a glass plate. Also, the compatibility with the replica method is good.

The following Table 8 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_0|/Y=0.06. \quad \text{[Mathematical Expression 11]}$$

Thus, the conditional relationship (3) is satisfied.

TABLE 8

| S | K | A | B | C | D |
|---|---|---|---|---|---|
| 1 | 2.768E−01 | −3.937E−02 | −2.964E−01 | 1.478E+00 | −3.810E+00 |
| 4 | 2.043E+01 | 2.874E−02 | −4.788E−01 | 3.302E+00 | −1.410E+01 |
| 5 | −9.387E+01 | −5.688E−01 | 9.324E−01 | −5.773E+00 | 5.954E+00 |
| 8 | 2.080E+01 | 1.618E−01 | 5.781E−02 | −6.961E−02 | −3.632E−02 |
| 11 | −1.000E+03 | 1.294E−01 | −1.376E−01 | 4.805E−02 | 7.376E−03 |
| 12 | −1.025E+01 | 8.523E−02 | −1.790E−02 | 7.431E−04 | −3.752E−05 |
| 14 | −1.000E+03 | 2.224E−01 | −3.203E−01 | 1.521E−01 | −1.798E−02 |

| S | E | F | G | H | J |
|---|---|---|---|---|---|
| 1 | −4.172E+00 | 2.598E+01 | −2.503E+01 | 9.604E+00 | 2.944E+00 |
| 4 | 3.198E+00 | 5.492E+01 | 1.366E+01 | −3.019E+01 | −3.271E+02 |
| 5 | 1.131E+01 | −5.986E+01 | −2.947E+01 | −7.938E+01 | −2.395E+02 |
| 8 | 2.855E−02 | 1.611E−02 | −7.643E−03 | −1.873E−02 | 5.595E−02 |
| 11 | −8.223E−03 | −1.401E−03 | 1.201E−03 | 2.209E−04 | −1.167E−04 |
| 12 | 3.178E−04 | −5.945E−05 | 0.000E+00 | 0.000E+00 | 0.000E+00 |
| 14 | −5.086E−03 | 4.892E−04 | 2.648E−04 | 3.593E−05 | −1.856E−05 |

Fifth Embodiment

Figure 9:
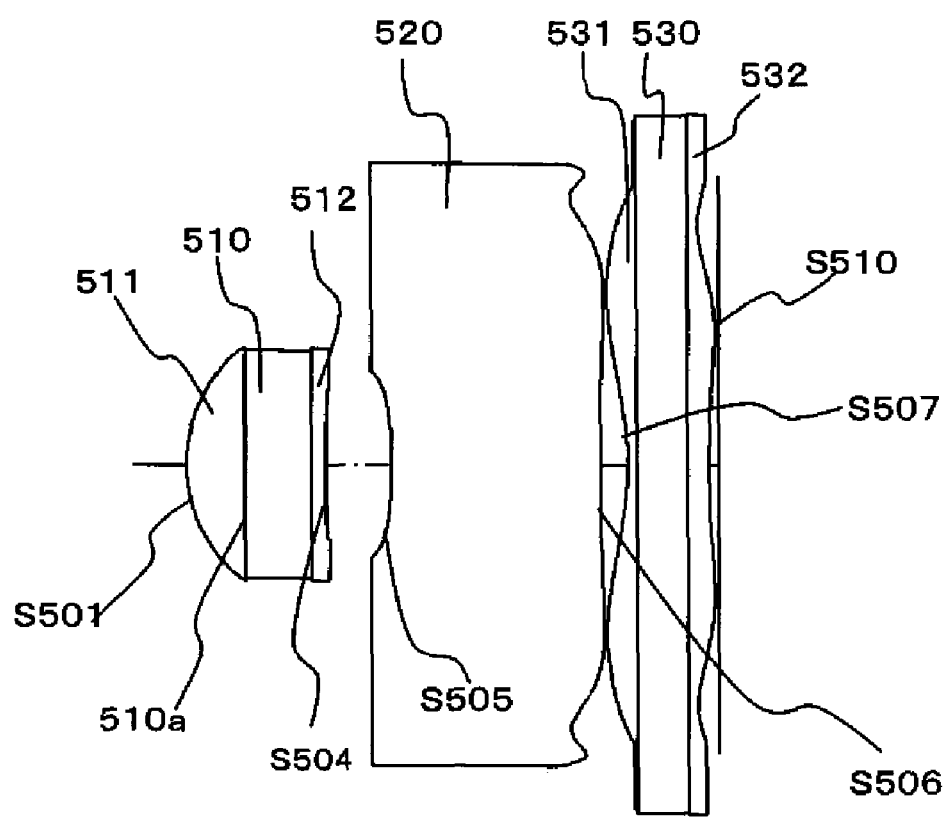
FIG. 9 is a diagram showing a sectional view of an imaging lens according to a fifth embodiment.

FIG. 9 illustrates a sectional view of the imaging lens according to a fifth embodiment of the present invention.

As illustrated in FIG. 9, the imaging lens according to this embodiment of the present invention is configured of a lens system including a 1f-th lens element 511, an aperture diaphragm 510a, a first lens flat plate 510, a 1b-th lens element 512, a second lens 520, a 3f-th lens element 531, a third lens flat plate 530 and a 3b-th lens element 532 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 511 has a convex surface directed toward the object side and has a positive refractive power. The image side surface of the 1b-th lens element 512 has a concave surface directed toward the image side and has a negative refractive power. The object side surface of the second lens 520 has a concave surface directed toward the object side. The image side surface of the second lens 520 has a convex surface directed toward the image side. The second lens 520 has a negative refractive power. An equation Ymax/Y=0.82 is held in the embodiment, and the conditional relationship (1) is satisfied. The object side surface of the 3f-th lens element 531 has a concave surface directed toward the object side near the optical axis. In the periphery, the 3f-th lens element 531 has a convex surface directed toward the object side and has a negative refractive power. The image side surface of the 3b-th lens element 532 has a concave surface directed toward the image side and has a negative refractive power. In this embodiment of the present invention, the 1f-th lens element 511, the aperture diaphragm 510a, the first lens flat plate 510, the 1b-th lens element 512, the second lens 520, the 3f-th lens element 531, the third lens flat plate 530 and the 3b-th lens element 532 are made of a UV hardening type resin. The Abbe's number v1 of the 1f-th lens element 511 is set to 54. The Abbe's number v2 of the 1b-th lens element 512 is set to 29. Lens surfaces S501, S504, S505, S506, S507 and S510 have aspheric surface form.

In the embodiment having the above mentioned configuration, each parameter value of the imaging lens is as illustrated in Table 9 below. Here, "Sm" represents the m-th surface number sequentially from the object side. "Sm" also includes each surface of a lens element and a lens flat plate. Surfaces mutually bonded are counted as one as a whole.

TABLE 9

| Sm | Curvature Radius (mm) | Surface Distance on Axis (mm) | Refractive Index | Abbe's Number | FIG. 9 |
|---|---|---|---|---|---|
| 1* | 0.919 | 0.350 | 1.507 | 54 | S501 |
| 2(ape) | ∞ | 0.394 | 1.590 | 59.698 | |
| 3 | ∞ | 0.080 | 1.574 | 29 | |
| 4* | 5.000 | 0.403 | | | S504 |
| 5* | −4.409 | 1.249 | 1.574 | 29 | S505 |
| 6* | −175.543 | 0.163 | | | S506 |
| 7* | −1.837 | 0.050 | 1.574 | 29 | S507 |
| 8 | ∞ | 0.301 | 1.590 | 59.698 | |
| 9 | ∞ | 0.130 | 1.574 | 29 | |
| 10* | 6.557 | 0.058 | | | S510 |

In this embodiment of the present invention, a difference in the Abbe's numbers of the 1f-th lens element 511 and the 1b-th lens element 512 is represented by $|v1-v2|=25$. Thus, the difference in the Abbe's number satisfies the conditional relationship (5). A ratio of fsl/f=1.04 where "fsl" represents a focal length of the object side surface of the 1f-th lens element 511 and "f" represents a focal length of the overall optical system. Thus, the ratio of fsl/f satisfies the conditional relationship (1).

Figure 10A:
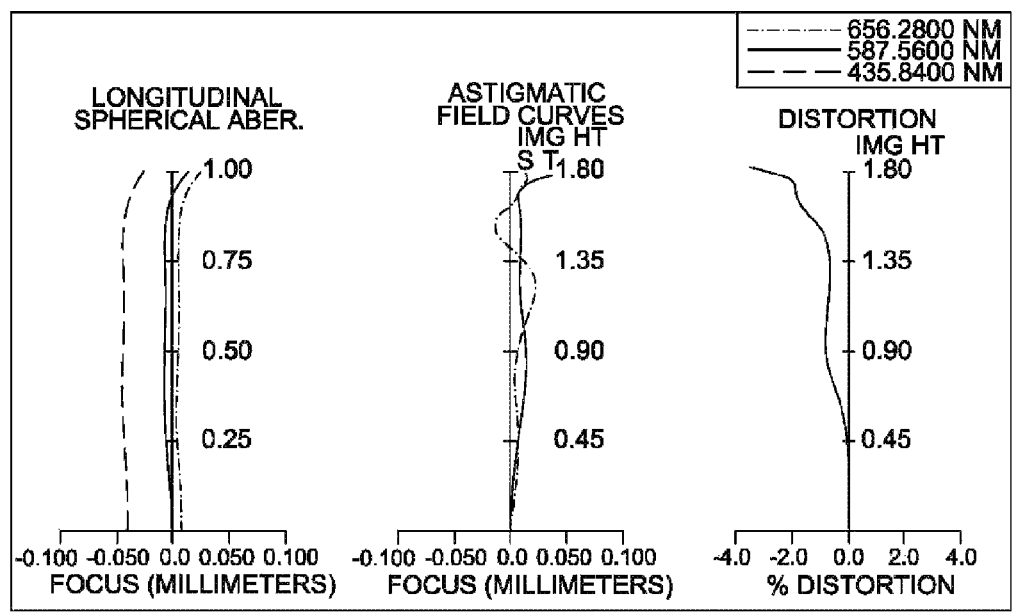
FIG. 10A is a graph showing aberrations of the imaging lens according to the fifth embodiment.
Figure 10B:
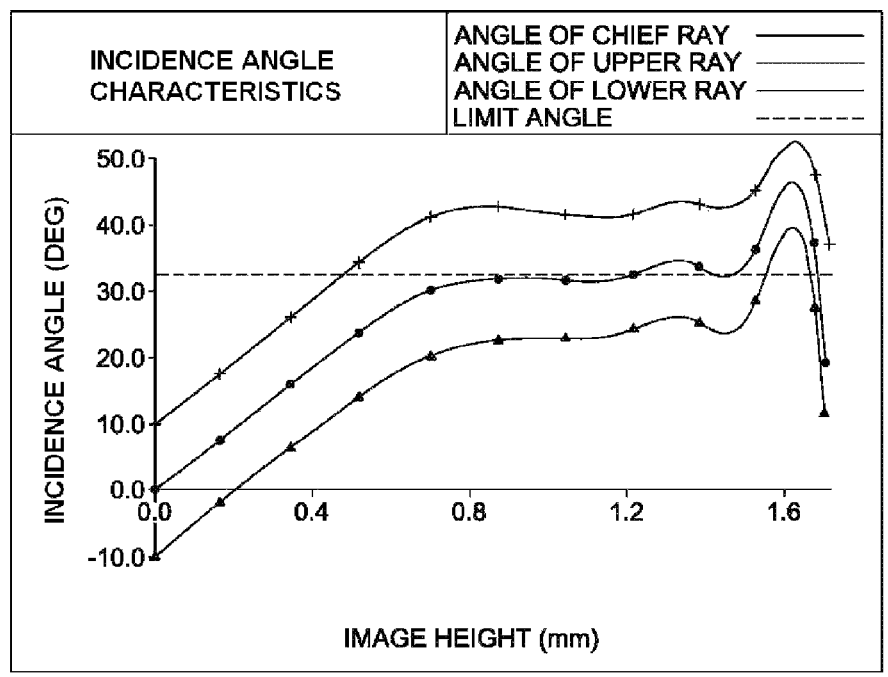
FIG. 10B is a graph showing characteristics of incidence angle, of the imaging lens according to the fifth embodiment, into a solid-state image sensor.

FIG. 10A is a graph showing aberrations of the imaging lens of FIG. 9, and FIG. 10B is a graph showing characteristics of an incidence angle, of the imaging lens of FIG. 9, into a solid-state image sensor. The lens system is simply configured. The lens system satisfies the conditional relationships (1), (2), and (5) so that the overall optical length is short. Further, as illustrated in FIGS. 10A, 10B the lens system obtains satisfactory aberration properties and allows the most image-side resin layer to be thin, and controls the incidence light, of the peripheral light, into the surface of the solid-state image sensor. By using the resin material, the cost can be maintained low and the production can be performed easily.

The following Table 10 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_0|/Y=0.07. \quad \text{[Mathematical Expression 12]}$$

Thus, the conditional relationship (3) is satisfied.

TABLE 10

| S | K | A | B | C | D |
|---|---|---|---|---|---|
| 1 | 2.607E−01 | −3.857E−02 | −4.444E−01 | 2.025E+00 | −3.398E+00 |
| 4 | 6.720E+00 | 8.359E−03 | −2.423E−01 | 3.094E+00 | −1.290E+01 |
| 5 | −4.078E+01 | −5.199E−01 | 4.186E−01 | −6.256E+00 | 9.140E+00 |
| 6 | −1.000E+05 | 8.582E−02 | −1.100E−01 | 5.117E−02 | 7.913E−04 |
| 7 | −2.901E+00 | 1.455E−01 | −2.460E−02 | −4.527E−03 | 7.748E−04 |
| 10 | −1.000E+03 | 1.779E−01 | −3.197E−01 | 1.559E−01 | −1.710E−02 |

TABLE 10-continued

| S | E | F | G | H | J |
|---|---|---|---|---|---|
| 1 | −1.039E+01 | 3.370E+01 | −2.501E+01 | 9.604E+00 | 2.944E+00 |
| 4 | 3.209E+00 | 5.492E+01 | 1.366E+01 | −3.019E+01 | −3.271E+02 |
| 5 | 1.409E+01 | −5.982E+01 | −2.928E+01 | −7.829E+01 | −2.395E+02 |
| 6 | −8.594E−03 | −1.245E−03 | 1.174E−03 | 2.408E−04 | −9.665E−05 |
| 7 | 6.755E−04 | −1.322E−04 | 0.000E+00 | 0.000E+00 | 0.000E+00 |
| 10 | −5.072E−03 | 4.573E−04 | 2.457E−04 | 2.663E−05 | −1.611E−05 |

Sixth Embodiment

Figure 11:
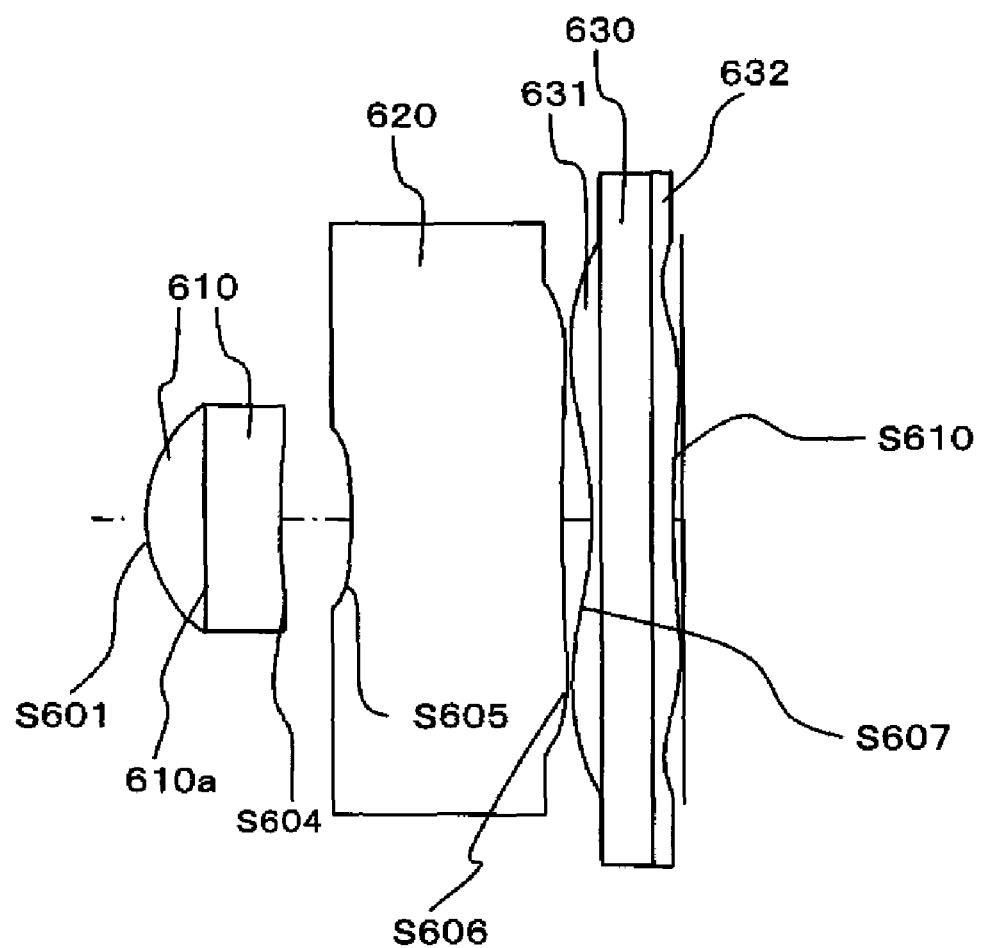
FIG. 11 is a diagram showing a sectional view of an imaging lens according to a sixth embodiment.

FIG. 11 illustrates a sectional view of the imaging lens according to a sixth embodiment of the present invention.

As illustrated in FIG. 11, the imaging lens according to this embodiment of the present invention is configured of a lens system including a first lens 610 made of a positive lens and a negative lens mutually bonded with an aperture diaphragm 610a inbetween, a second lens 620, a 3f-th lens element 631, a third lens flat plate 630 and a 3b-th lens element 632 in the order from the object side. Here, the imaging lens configured of three lenses is described in this embodiment of the present invention. However, the imaging lens may be configured of more lenses. For example, in the case where "i" (i>4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 610 has a positive lens on the object side and a negative lens on the image side. The first lens 610 has a positive refractive power. The image side surface of the second lens 620 has a concave surface directed toward the image side and has a positive refractive power. The object side surface of the 3f-th lens element 631 has a concave surface directed toward the object side near the optical axis and has a convex surface directed toward the object side in the periphery. The 3f-th element 631 has a negative refractive power. The image side surface of the 3b-th lens element 632 has a concave surface directed toward the image side and has a negative refractive power. An equation Ymax/Y=0.818 is held in the embodiment, and the conditional relationship (1) is satisfied. In this embodiment of the present invention, the first lens 610 having an aperture diaphragm on the boundary where the positive lens and the negative lens are bonded, and the second lens 620 is made of resin material. The 3f-th lens element 631, the third lens flat plate 630 and the 3b-th lens element 632 are made of UV hardening type resin material. The Abbe's number v1 of the positive lens in the first lens 610 is set to 54. The Abbe's number v2 of the negative lens in the first lens 610 is set to 29. Lens surfaces S601, S604, S605, S606, S607 and S610 have aspheric surface form.

In the embodiment having the above mentioned configuration, each parameter value of the imaging lens is as illustrated in Table 11 below. Here, "Sm" represents the m-th surface number sequentially from the object side. "Sm" also includes each surface of a lens element and a lens flat plate. Surfaces mutually bonded are counted as one as a whole.

TABLE 11

| Sm | Curvature Radius (mm) | Surface Distance on Axis (mm) | Refractive Index | Abbe's Number | FIG. 11 |
|---|---|---|---|---|---|
| 1* | 0.920 | 0.350 | 1.507 | 54 | S601 |
| 2(ape) | ∞ | 0.444 | 1.574 | 29 | |
| 3* | 5 | 0.421 | | | S604 |
| 4* | −4.365 | 1.249 | 1.574 | 29 | S605 |
| 5* | 251.951 | 0.174 | | | S606 |
| 6* | −1.925 | 0.051 | 1.574 | 29 | S607 |
| 7 | ∞ | 0.300 | 1.557 | 62.362 | |
| 8 | ∞ | 0.130 | 1.574 | 29 | |
| 9* | 11.769 | 0.057 | | | S610 |

In this embodiment of the present invention, a difference in Abbe's numbers of the Abbe's number v1 of the positive lens of the first lens 610 and the Abbe's number v2 of the negative lens of the first lens 610 is represented by |v1−v2|=25. Thus, the difference in Abbe's numbers satisfies the conditional relationship (4). A ratio of fsl/f=1.03 where "fsl" represents a focal length of the object side surface of the positive lens of the first lens 601 and "f" represents a focal length of the overall optical system. Thus, the ratio of fsl/f satisfies the conditional relationship (2).

Figure 12A:
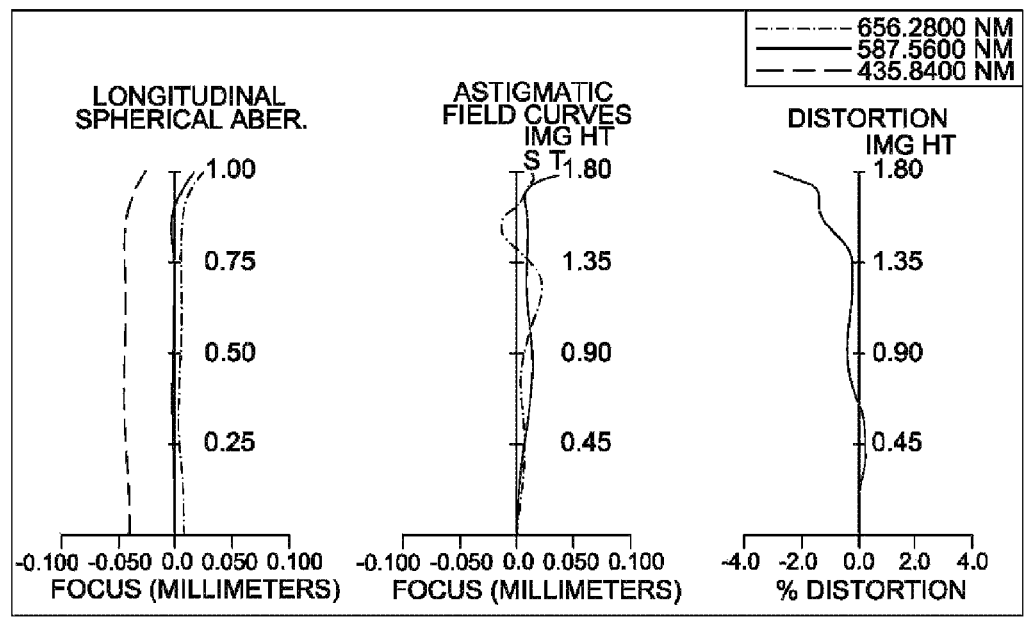
FIG. 12A is a graph showing aberrations of the imaging lens according to the sixth embodiment.
Figure 12B:
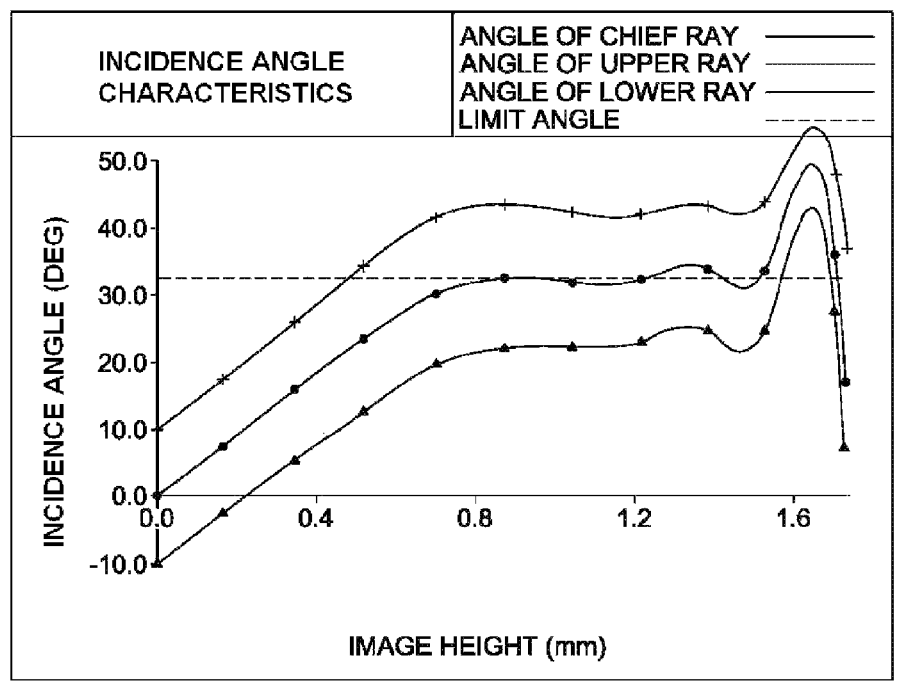
FIG. 12B is a graph showing characteristics of incidence angle, of the imaging lens according to the sixth embodiment, into a solid-state image sensor.

FIG. 12A is a graph showing aberrations of the imaging lens of FIG. 11, and FIG. 12B is a graph showing characteristics of an incidence angle, of the imaging lens of FIG. 11, into a solid-state image sensor. The lens system is simply configured. The lens system satisfies the conditional relationships (1), (2), and (4) so that the overall optical length is short. Further, as illustrated in FIGS. 12A, 12B the lens system obtains satisfactory aberration properties and allows the most image-side resin layer to be thin, and controls the incidence light, of the peripheral light, into the surface of the solid-state image sensor. By using the UV hardening type resin material, the cost can be maintained low, the production can be performed easily, and a large quantity of lenses can be generated at one time by irradiating UV light after a lens element has been formed on a glass plate. Also, the compatibility with the replica method is good.

The following Table 12 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.07$. [Mathematical Expression 13]

Thus, the conditional relationship (3) is satisfied.

TABLE 12

| S | K | A | B | C | D |
|---|---|---|---|---|---|
| 1 | 2.572E−01 | −4.340E−02 | −4.029E−01 | 1.935E+00 | −3.569E+00 |
| 4 | 7.402E+00 | 1.037E−02 | −3.104E−01 | 3.427E+00 | −1.356E+01 |
| 7 | −5.185E+01 | −5.288E−01 | 4.265E−01 | −6.096E+00 | 8.951E+00 |
| 8 | −1.000E+03 | 8.077E−02 | −1.070E−01 | 4.976E−02 | 1.211E−03 |
| 9 | −2.258E+00 | 1.449E−01 | −2.292E−02 | −3.551E−03 | 6.822E−04 |
| 12 | −1.000E+03 | 1.941E−01 | −3.244E−01 | 1.547E−01 | −1.716E−02 |

| S | E | F | G | H | J |
|---|---|---|---|---|---|
| 1 | −9.717E+00 | 3.380E+01 | −2.501E+01 | 9.604E+00 | 2.944E+00 |
| 4 | 3.209E+00 | 5.492E+01 | 1.366E+01 | −3.019E+01 | −3.271E+02 |
| 7 | 1.217E+01 | −5.319E+01 | −2.928E+01 | −7.829E+01 | −2.395E+02 |
| 8 | −8.430E−03 | −1.194E−03 | 1.184E−03 | 2.148E−04 | −9.591E−05 |
| 9 | 4.225E−04 | −7.779E−05 | 0.000E+00 | 0.000E+00 | 0.000E+00 |
| 12 | −5.016E−03 | 4.839E−04 | 2.543E−04 | 2.699E−05 | −1.700E−05 |

Seventh Embodiment

Figure 13:
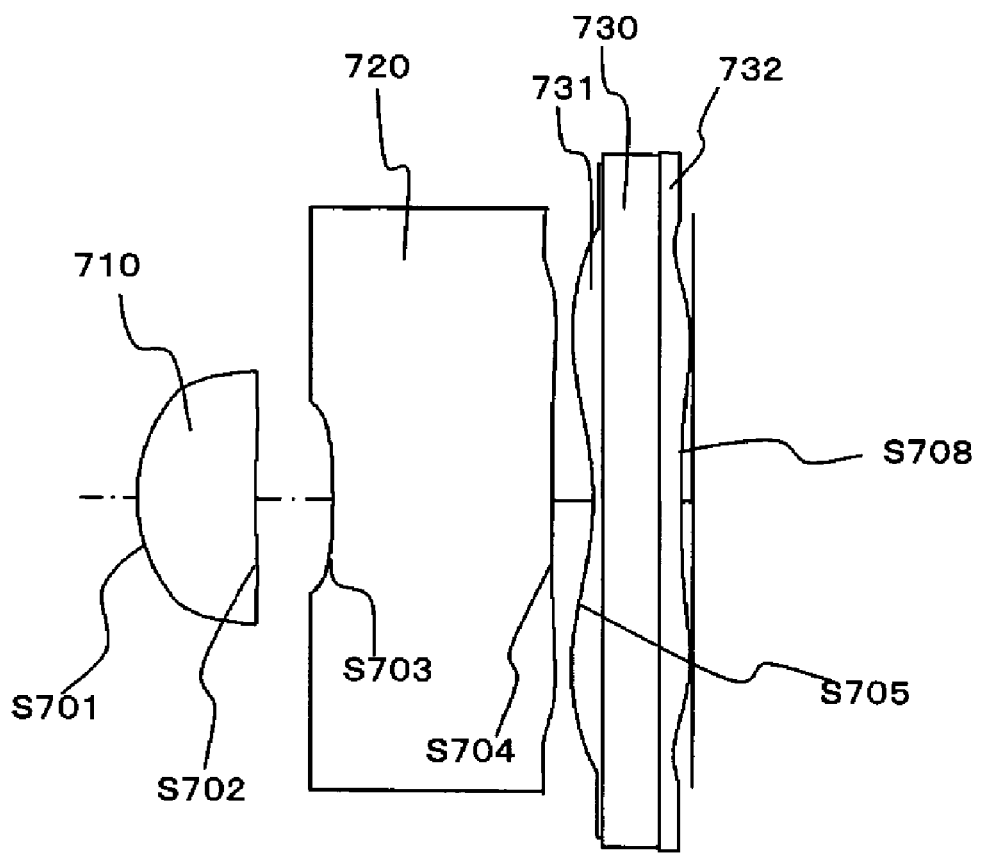
FIG. 13 is a diagram showing a sectional view of an imaging lens according to a seventh embodiment.

FIG. 13 illustrates a sectional view of the imaging lens according to a seventh embodiment of the present invention.

As illustrated in FIG. 13, the imaging lens according to this embodiment of the present invention is configured of a lens system including a first lens 710, a second lens 720, a 3f-th lens element 731, a third lens flat plate 730 and a 3b-th lens element 732 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 710 has an aperture diaphragm on the object side surface and has a positive refractive power. The object side surface of the second lens 720 has a concave surface directed toward the object side. The image side surface of the second lens 720 has a convex surface directed toward the image side. The second lens 720 has a negative refractive power. The object side surface of the 3f-th lens element 731 has a concave surface directed toward the object side near the optical axis and has a convex surface directed toward the object side in the periphery. The 3f-th lens 731 has a negative refractive power. The image side surface of the 3b-th lens element 732 has a concave surface directed toward the image side and has a negative refractive power. An equation Ymax/Y=0.78 is held in the embodiment, and the conditional relationship (1) is satisfied. In this embodiment of the present invention, the first lens 710, the second lens 720, the 3f-th lens element 731, the third lens flat plate 730 and the 3b-th lens element 732 are made of resin material. The third lens flat plate 730 and the 3b-th lens element 732 are made of a UV hardening type resin. The Abbe's number v1 of the first lens 710 is set to 54. The Abbe's number v2 of the second lens 720 is set to 29. Lens surfaces S701, S702, S703, S704, S705 and S708 have aspheric surface form.

In the embodiment having the above mentioned configuration, each parameter value of the imaging lens is as illustrated in Table 13 below. Here, "Sm" represents the m-th surface number sequentially from the object side. "Sm" also includes each surface of a lens element and a lens flat plate. Surfaces mutually bonded are counted as one as a whole.

TABLE 13

| Sm | Curvature Radius (mm) | Surface Distance on Axis (mm) | Refractive Index | Abbe's Number | FIG. 13 |
|---|---|---|---|---|---|
| 1* (ape) | 0.973 | 0.684 | 1.507 | 54 | S701 |
| 2* | 6.025 | 0.441 | | | S702 |
| 3* | −6.278 | 1.255 | 1.574 | 29 | S703 |
| 4* | −55.007 | 0.236 | | | S704 |
| 5* | −1.865 | 0.050 | 1.574 | 29 | S705 |
| 6 | ∞ | 0.325 | 1.487 | 70.440 | |
| 7 | ∞ | 0.130 | 1.574 | 29 | |
| 8* | 3.668 | 0.060 | | | S708 |

In this embodiment of the present invention, a ratio of fsl/f=1.07 where "fsl" represents a focal length of the object side surface of the first lens 710 and "f" represents a focal length of the overall optical system. Thus, the ratio of fsl/f satisfies the conditional relationship (2).

Figure 14A:
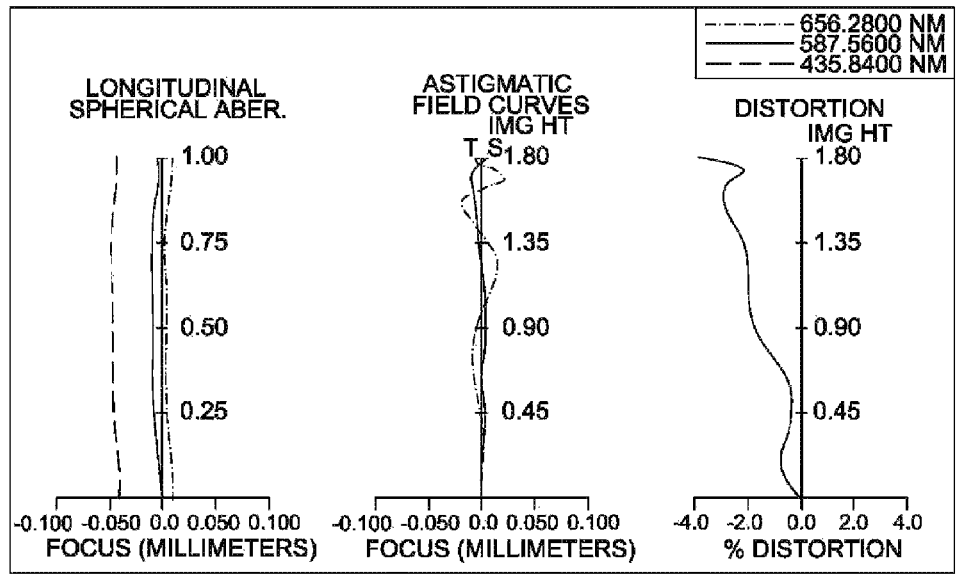
FIG. 14A is a graph showing aberrations of the imaging lens according to the seventh embodiment.
Figure 14B:
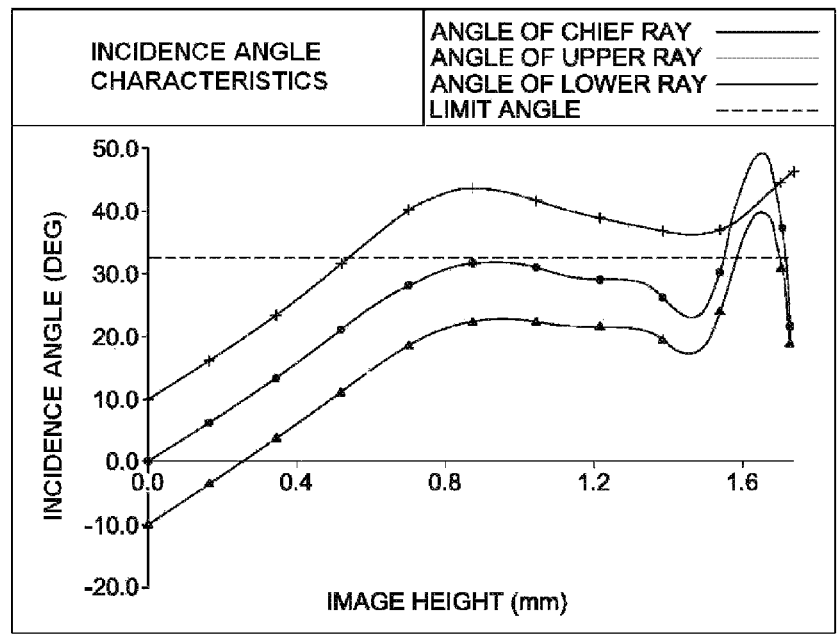
FIG. 14B is a graph showing characteristics of incidence angle, of the imaging lens according to the seventh embodiment, into a solid-state image sensor.

FIG. 14A is a graph showing aberrations of the imaging lens of FIG. 13, and FIG. 14B is a graph showing characteristics of an incidence angle, of the imaging lens of FIG. 13, into a solid-state image sensor. The lens system is simply configured. The lens system satisfies the conditional relationships (1) and (2) so that the overall optical length is short. Further, as illustrated in FIGS. 14A, 14B the lens system obtains satisfactory aberration properties and allows the most image-side resin layer to be thin, and controls the incidence light, of the peripheral light, into the surface of the solid-state image sensor. As illustrated in FIG. 14, the lens system is simply configured. Also, by satisfying the conditional relationship (1), the overall optical length becomes short, satisfactory aberration properties are obtained, and the thickness of the resin section of the image side surface becomes thin. By using the UV hardening type resin material, the cost can be maintained low, the production can be performed easily, and a large quantity of lenses can be generated at one time by irradiating UV light after a lens element has been formed on a glass plate. Also, the compatibility with the replica method is good.

The following Table 14 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y = 0.07.$  [Mathematical Expression 14]

Thus, the conditional relationship (3) is satisfied.

TABLE 14

| S | K | A | B | C | D |
|---|---|---|---|---|---|
| 1 | 2.686E−01 | −3.992E−02 | −4.442E−01 | 1.859E+00 | −2.973E+00 |
| 2 | −6.399E+01 | −2.288E−02 | −4.353E−01 | 2.971E+00 | −1.262E+01 |
| 3 | −3.584E+02 | −5.755E−01 | 7.009E−01 | −5.609E+00 | 3.091E+00 |
| 4 | −1.000E+03 | 9.811E−02 | −1.086E−01 | 4.361E−02 | 3.162E−03 |
| 5 | −1.864E+00 | 1.615E−01 | −2.703E−02 | −2.786E−03 | 9.852E−05 |
| 8 | −1.000E+09 | 2.583E−01 | −3.376E−01 | 1.484E−01 | −1.819E−02 |

| S | E | F | G | H | J |
|---|---|---|---|---|---|
| 1 | −1.104E+01 | 3.252E+01 | −2.351E+01 | 2.824E+01 | 1.833E+01 |
| 2 | −1.071E+00 | 5.235E+01 | 1.976E+01 | −4.102E+01 | −3.701E+02 |
| 3 | 1.450E+01 | 6.222E+00 | −1.137E+02 | −9.163E+01 | −2.801E+02 |
| 4 | −7.185E−03 | −1.280E−03 | 9.964E−04 | 1.789E−04 | −6.126E−05 |
| 5 | 5.477E−04 | −7.008E−05 | 0.000E+00 | 0.000E+00 | 0.000E+00 |
| 8 | −4.895E−03 | 6.521E−04 | 3.346E−04 | 4.016E−05 | −2.832E−05 |

Eighth Embodiment

Figure 15:
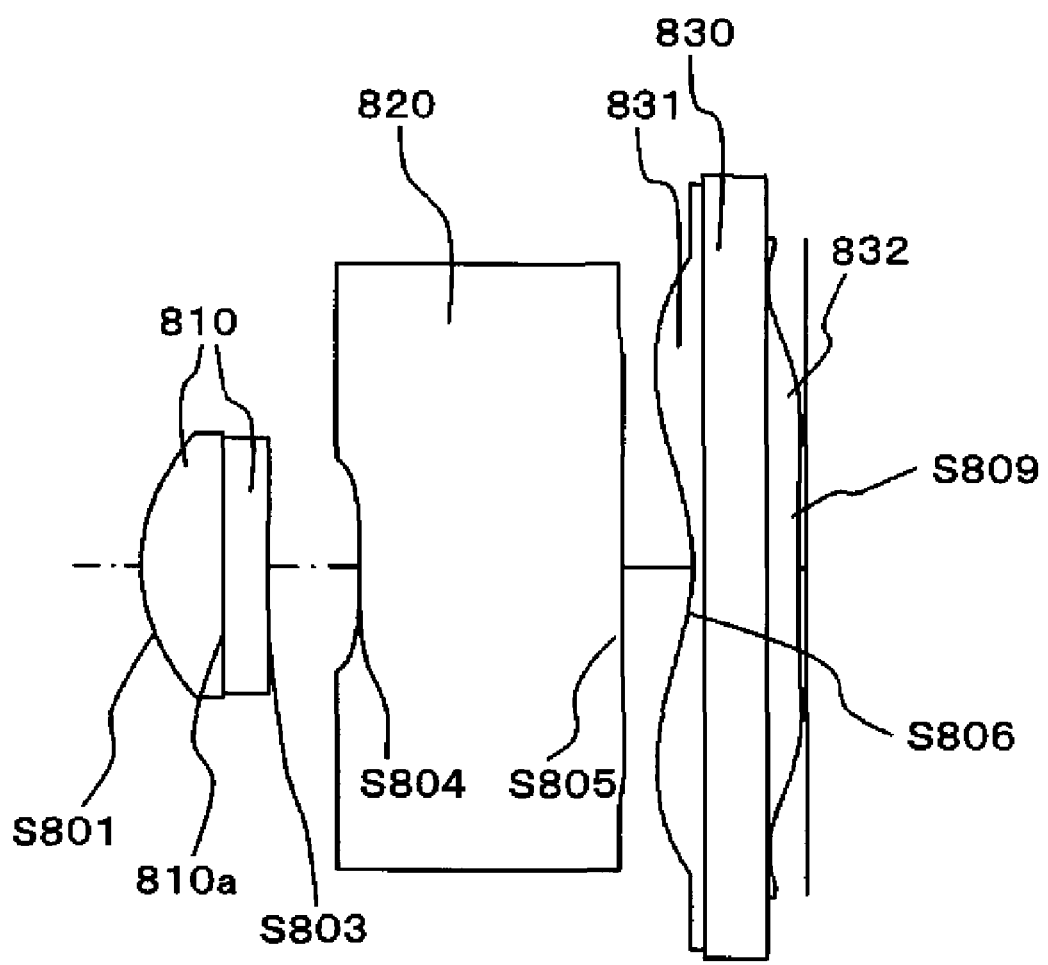
FIG. 15 is a diagram showing a sectional view of an imaging lens according to a eighth embodiment.

FIG. 15 illustrates a sectional view of the imaging lens according to an eighth embodiment of the present invention. As illustrated in FIG. 15, the imaging lens according to this embodiment of the present invention is configured of a lens system including a first lens 810 having an aperture diaphragm on the boundary where a positive lens and a negative lens are mutually bonded, a second lens 820, a 3f-th lens element 831, a third lens flat plate 830 and a 3b-th lens element 832 in the order from the object side. Here, the imaging lens configured of three lenses is described in this embodiment of the present invention. However, the imaging lens may be configured of more lenses. For example, in the case where "i" (i>4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 810 has a positive lens on the object side and a negative lens on the image side. The first lens 810 has a positive refractive power. The object side surface of the second 820 has a concave surface directed toward the object side and has a negative refractive power. The image side surface of the second lens 820 has a, concave surface, directed toward the image side and has a positive refractive power. The object side surface of the 3f-th lens element 831 has a concave surface directed toward the object side near the optical axis and has a convex surface directed toward the object side in the periphery. The 3f-th lens element 831 has a negative refractive power. The image side surface of the 3b-th lens element 832 has a concave surface directed toward the image side and has a negative refractive power. An equation Ymax/Y=0.67 is held in the embodiment, and the conditional relationship (1) is satisfied. In this embodiment of the present invention, the first lens 810 having an aperture diaphragm on the boundary where a positive lens and a negative lens are mutually bonded and the second lens 820 is made of glass. The 3f-th lens element 831, the third lens flat plate 830 and the 3b-th lens element 832 are made of resin material. The Abbe's number v1 of the positive lens in the first lens 810 is set to 61.1. The Abbe's number v2 of the negative lens in the first lens 910 is set to 25.4. Lens surfaces S801, S803, S804, S805, S806 and S809 have aspheric surface form.

In the embodiment having the above mentioned configuration, each parameter value of the imaging lens is as illustrated in Table 15 below. Here, "Sm" represents the m-th surface number sequentially from the object side. "Sm" also includes each surface of a lens element and a lens flat plate. Surfaces mutually bonded are counted as one as a whole.

TABLE 15

| Sm | Curvature Radius (mm) | Surface Distance on Axis (mm) | Refractive Index | Abbe's Number | FIG. 15 |
|---|---|---|---|---|---|
| 1* | 1.004 | 0.391 | 1.589 | 61.113 | S801 |
| 2(ape) | 219.874 | 0.216 | 1.805 | 25.432 | |
| 3* | 6.225 | 0.439 | | | S803 |
| 4* | −7.646 | 1.249 | 1.805 | 25.432 | S804 |
| 5* | 32.657 | 0.345 | | | S805 |
| 6* | −1.265 | 0.050 | 1.574 | 29 | S806 |
| 7 | ∞ | 0.300 | 1.492 | 69.839 | |
| 8 | ∞ | 0.150 | 1.574 | 29 | |
| 9* | −2.878 | 0.040 | | | S809 |

In this embodiment of the present invention, a difference in the Abbe's numbers of the positive lens and the negative lens of the first lens 810 is represented by |v1−v|=35.7. Thus, the difference in the Abbe's number satisfies the conditional relationship (4). A ratio of fsl/f=0.98 where "fsl" represents a focal length of the object side surface of the positive lens of the first lens 810 and "f" represents a focal length of the overall optical system. Thus, the ratio of fsl/f satisfies the conditional relationship (2).

Figure 16A:
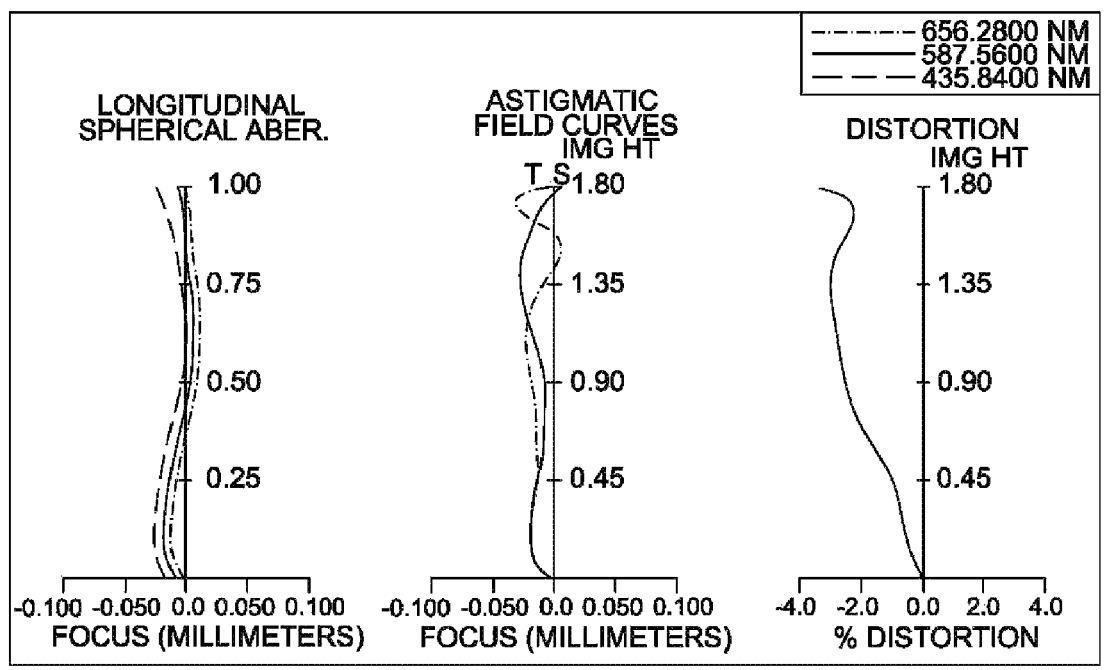
FIG. 16A is a graph showing aberrations of the imaging lens according to the eighth embodiment.
Figure 16B:
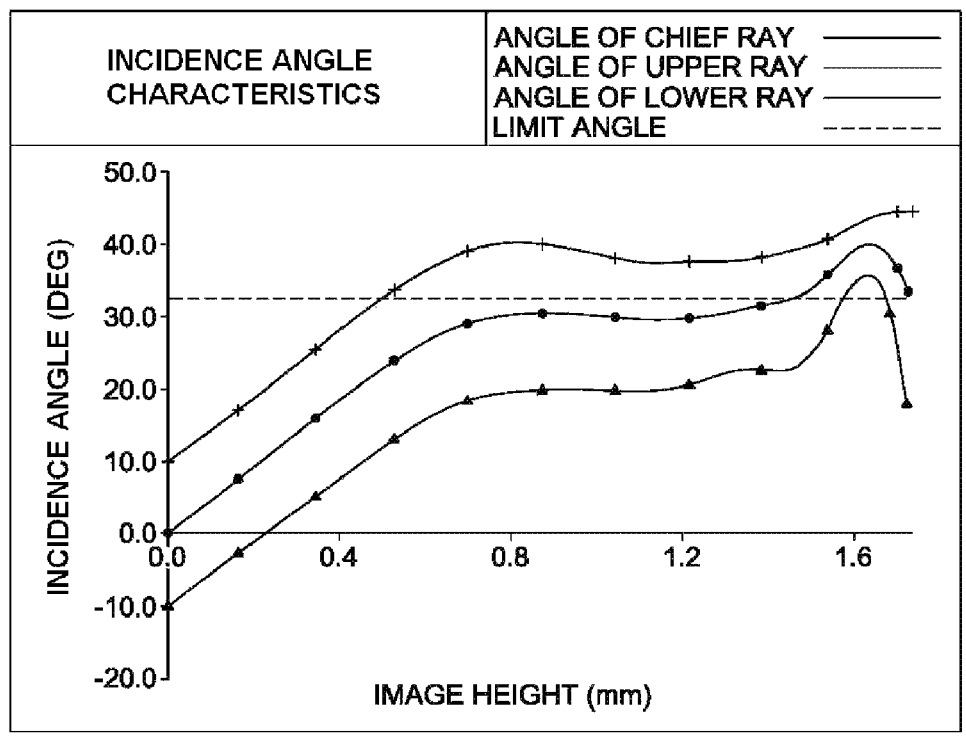
FIG. 16B is a graph showing characteristics of incidence angle, of the imaging lens according to the eighth embodiment, into a solid-state image sensor.

FIG. 16A is a graph showing aberrations of the imaging lens of FIG. 15, and FIG. 16B is a graph showing characteristics of an incidence angle, of the imaging lens of FIG. 15, into a solid-state image sensor. The lens system is simply configured. The lens system satisfies the conditional relationships (1), (2), and (4) so that the overall optical length is short. Further, as illustrated in FIGS. 16A, 16B the lens system obtains satisfactory aberration properties and allows the most image-side resin layer to be thin, and controls the incidence light, of the peripheral light, into the surface of the solid-state image sensor. By using the UV hardening type resin material for the 3f-th lens element 831 and the 3b-th lens element 832, the cost can be maintained low, the production can be performed easily, and a large quantity of lenses can be generated at one time by irradiating UV light after a lens element has been formed on a glass plate. Also, the compatibility with the replica method is good.

The following Table 16 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.09$. [Mathematical Expression 15]

Thus, the conditional relationship (3) is satisfied.

TABLE 16

| S | K | A | B | C | D |
|---|---|---|---|---|---|
| 1 | 2.043E−01 | −5.352E−02 | −4.011E−01 | 1.809E+00 | −4.002E+00 |
| 3 | −2.449E+01 | −4.535E−02 | −7.656E−01 | 3.056E+00 | −1.068E+01 |
| 4 | 1.728E+02 | −3.376E−01 | 2.058E−01 | −5.708E+00 | 1.143E+01 |
| 5 | −1.000E+11 | 7.374E−02 | −1.063E−01 | 5.091E−02 | 1.510E−03 |
| 6 | −5.379E+00 | 1.149E−01 | −1.699E−02 | −1.183E−03 | 3.096E−04 |
| 9 | −1.000E+07 | 1.855E−01 | −3.302E−01 | 1.558E−01 | −1.652E−02 |

| S | E | F | G | H | J |
|---|---|---|---|---|---|
| 1 | −1.037E+01 | 3.662E+01 | −2.351E+01 | 2.215E+00 | 3.841E+00 |
| 3 | 3.134E+00 | 2.626E+01 | 3.077E+01 | −4.625E+01 | −3.184E+02 |
| 4 | 8.734E+00 | −4.205E+01 | −2.017E+02 | −6.559E+01 | 5.531E+02 |
| 5 | −8.385E−03 | −1.177E−03 | 1.121E−03 | 2.369E−04 | −3.802E−05 |
| 6 | 3.447E−04 | −8.001E−05 | 0.000E+00 | 0.000E+00 | 0.000E+00 |
| 9 | −4.958E−03 | 4.795E−04 | 2.423E−04 | 2.600E−05 | −1.707E−05 |

Ninth Embodiment

Figure 17:
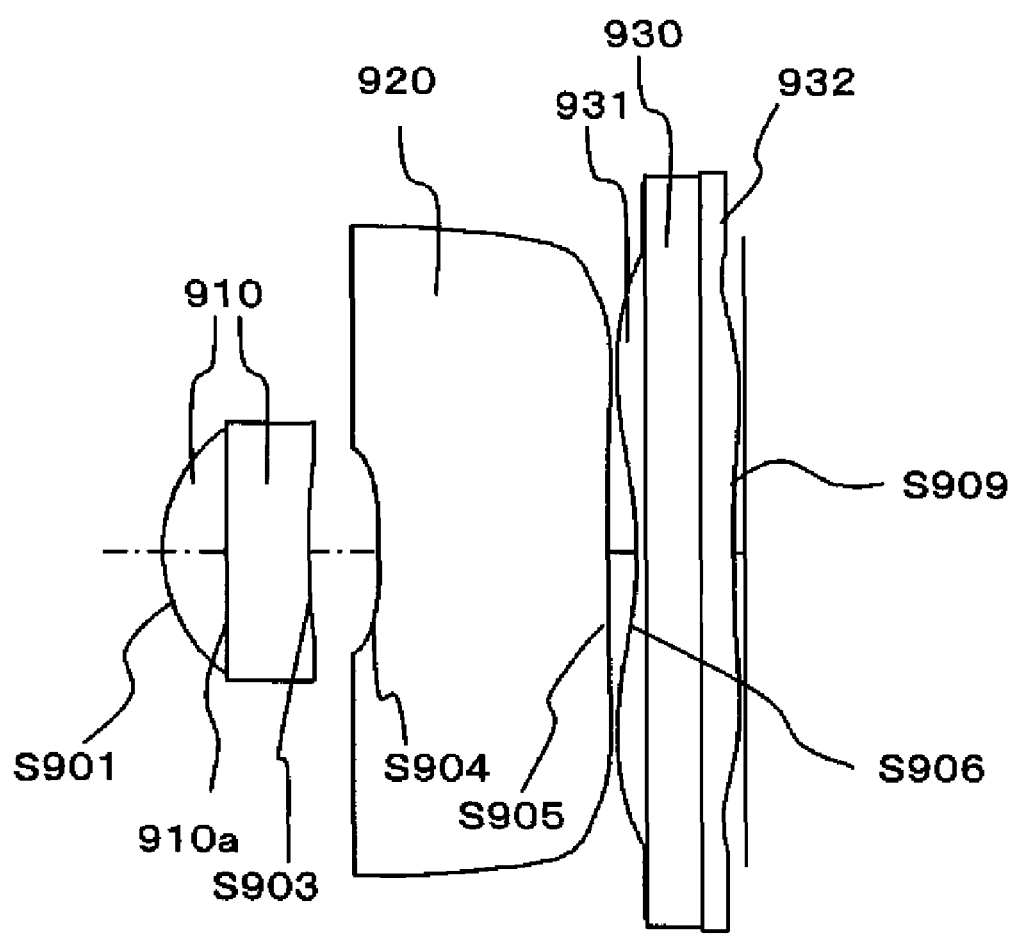
FIG. 17 is a diagram showing a sectional view of an imaging lens according to a ninth embodiment.

FIG. 17 illustrates a sectional view of the imaging lens according to a ninth embodiment of the present invention.

As illustrated in FIG. 17, the imaging lens according to this embodiment of the present invention is configured of a lens system including a first lens 910 having an aperture diaphragm 910a on the boundary where a positive lens and a negative lens are mutually bonded, a second lens 920, a 3f-th lens element 931, a third lens flat plate 930 and a 3b-th lens element 932 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 910 has a positive lens on the object side and has a negative lens on the image side. The first lens 910 has a positive refractive power. The object side surface of the second lens 920 has a concave surface directed toward the object side. The object side surface of the third f lens element 931 has a concave surface directed toward the object side near the optical axis and has a convex surface directed toward the object side in the periphery. The 3f-th lens element 931 has a negative refractive power. The image side of the 3b-th lens element 932 has a concave surface directed toward the image side and has a negative refractive power. An equation Ymax/Y=0.802 is held in the embodiment, and the conditional relationship (1) is satisfied. In this embodiment of the present invention, the first lens 910 having an aperture diaphragm on the boundary where a positive lens and a negative lens are mutually bonded and the second lens 920 is made of glass. The 3f-th lens element 931, the third lens flat plate 930 and the 3b-th lens element 932 are made of resin material. The Abbe's number ν1 of the positive lens in the first lens 910 is set to 70.4. The Abbe's number ν2 of the negative lens in the first lens 910 is set to 61.1. Lens surfaces S901, S903, S904, S905, S906 and S909 have aspheric surface form.

In the embodiment having the above mentioned configuration, each parameter value of the imaging lens is as illustrated in Table 17 below. Here, "Sm" represents the m-th surface number sequentially from the object side. "Sm" also includes each surface of a lens element and a lens flat plate. Surfaces mutually bonded are counted as one as a whole.

TABLE 17

| Sm | Curvature Radius (mm) | Surface Distance on Axis (mm) | Refractive Index | Abbe's Number | FIG. 17 |
|---|---|---|---|---|---|
| 1* | 0.868 | 0.350 | 1.487 | 70.45 | S901 |
| 2(ape) | ∞ | 0.444 | 1.589 | 61.113 | |
| 3* | 5.000 | 0.387 | | | S903 |
| 4* | −4.066 | 1.249 | 1.589 | 61.113 | S904 |
| 5* | −194.882 | 0.160 | | | S905 |
| 6* | −2.159 | 0.050 | | | S906 |
| 7 | ∞ | 0.300 | 1.514 | 66.926 | |
| 8 | ∞ | 0.180 | 1.574 | 29 | |
| 9* | 6.243 | 0.058 | | | S909 |

In this embodiment of the present invention, a difference in the Abbe's numbers of the positive lens and the negative lens of the first lens 910 is represented by |ν1−ν2|=9.3. Thus, the difference in the Abbe's number satisfies the conditional relationship (4). A ratio of fsl/f=1.02 where "fsl" represents a focal length of the object side surface of the positive lens of the first lens 910 and "f" represents a focal length of the overall optical system. Thus, the ratio of fsl/f satisfies the conditional relationship (2).

Figure 18A:
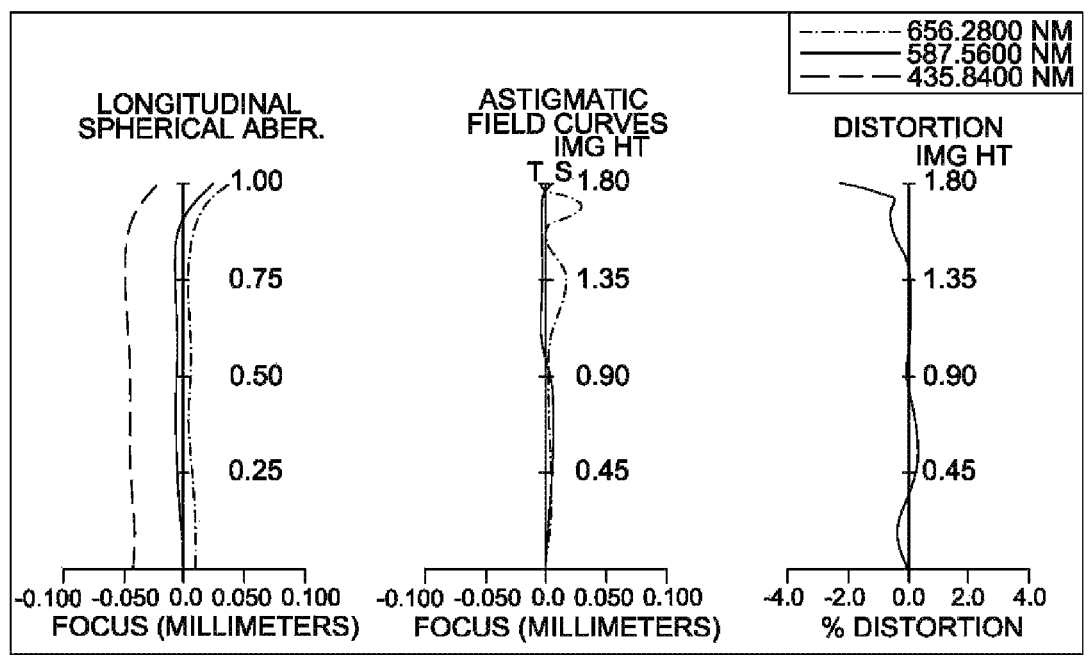
FIG. 18A is a graph showing aberrations of the imaging lens according to the ninth embodiment.
Figure 18B:
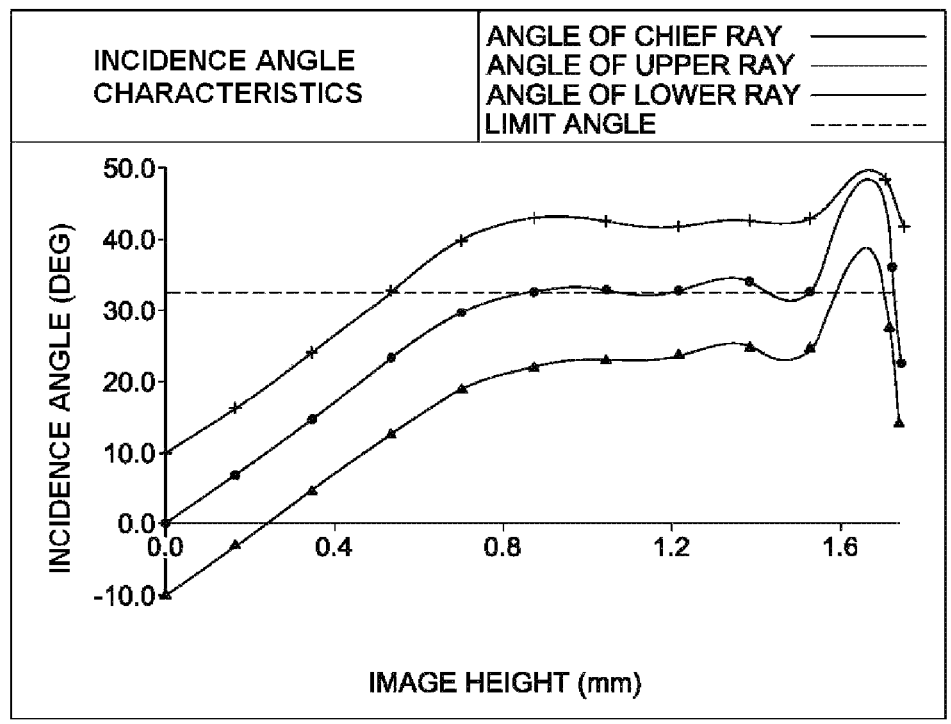
FIG. 18B is a graph showing characteristics of incidence angle, of the imaging lens according to the ninth embodiment, into a solid-state image sensor.

FIG. 18A is a graph showing aberrations of the imaging lens of FIG. 17, and FIG. 18B is a graph showing characteristics of an incidence angle, of the imaging lens of FIG. 17, into a solid-state image sensor. The lens system is simply configured. The lens system satisfies the conditional relationships (1), (2), and (4) so that the overall optical length is short. Further, as illustrated in FIGS. 18A, 18B the lens system obtains satisfactory aberration properties and allows the most image-side resin layer to be thin, and controls the incidence light, of the peripheral light, into the surface of the solid-state image sensor. By using the UV hardening type resin material for the 3f-th lens element 931 and the 3b-th lens element 932, the cost can be maintained low, the production can be performed easily, and a large quantity of lenses can be generated at one time by irradiating UV light after a lens element has been formed on a glass plate. Also, the compatibility with the replica method is good.

The following Table 18 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.10.$  [Mathematical Expression 16]

Thus, the conditional relationship (3) is satisfied.

TABLE 18

| S | K | A | B | C | D |
|---|---|---|---|---|---|
| 1 | 2.543E−01 | −4.666E−02 | −4.372E−01 | 1.882E+00 | −2.935E+00 |
| 3 | 5.892E+00 | 4.011E−02 | −2.151E−01 | 3.239E+00 | −1.171E+01 |
| 4 | −1.213E+02 | −6.520E−01 | 6.420E−01 | −5.189E+00 | 3.200E+00 |
| 5 | −1.000E+11 | 8.052E−02 | −1.043E−01 | 4.587E−02 | 2.467E−03 |
| 6 | −1.270E+00 | 1.413E−01 | −2.039E−02 | −2.146E−03 | 1.936E−04 |
| 9 | −1.000E+07 | 2.237E−01 | −3.293E−01 | 1.519E−01 | −1.753E−02 |

| S | E | F | G | H | J |
|---|---|---|---|---|---|
| 1 | −1.091E+01 | 3.148E+01 | −2.501E+01 | 9.604E+00 | 2.944E+00 |
| 3 | 3.209E+00 | 5.492E+01 | 1.366E+01 | −3.019E+01 | −3.271E+02 |
| 4 | 1.415E+01 | −8.260E+00 | −1.110E+02 | −7.829E+01 | −2.395E+02 |
| 5 | −7.270E−03 | −1.161E−03 | 1.061E−03 | 1.707E−04 | −8.488E−05 |
| 6 | 3.325E−04 | −4.600E−05 | 0.000E+00 | 0.000E+00 | 0.000E+00 |
| 9 | −4.949E−03 | 5.386E−04 | 2.683E−04 | 2.957E−05 | −1.897E−05 |

Tenth Embodiment

Figure 19:
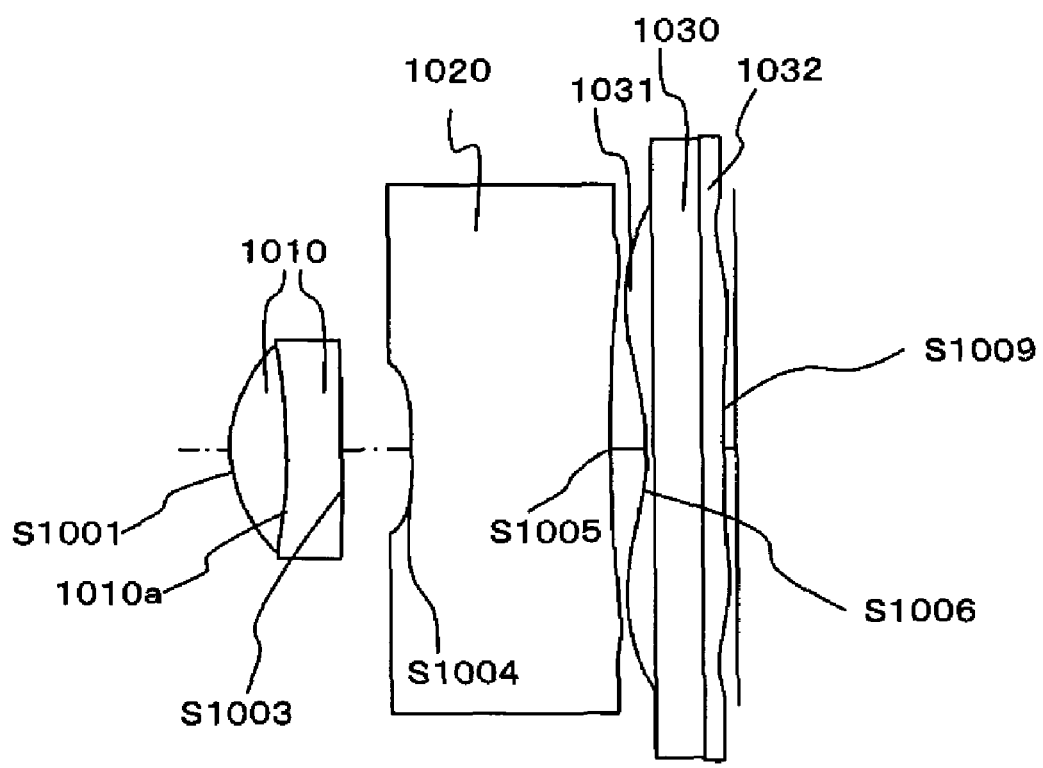
FIG. 19 is a diagram showing a sectional view of an imaging lens according to a tenth embodiment.

FIG. 19 illustrates a sectional view of the imaging lens according to a tenth embodiment of the present invention.

As illustrated in FIG. 19, the imaging lens according to this embodiment of the present invention is configured of a lens system including a first lens 1010 having an aperture diaphragm 1010a on the boundary where a positive lens and a negative lens are mutually bonded, a second lens 1020, a 3f-th lens element 1031, a third lens flat plate 1030 and a 3b-th lens element 1032 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens.

Further, as long as the requested compactness can be secured, the number of lenses is not limited to three, and the number of lenses may be four or five. The first lens 1010 has a positive lens on the object side and has a negative lens on the image side. The first lens 1010 has a positive refractive power. The object side surface of the second lens 1021 has a concave surface directed toward the object side. The object side surface of the 3f-th lens element 1031 has a concave surface directed toward the object side near the optical axis and has a convex surface directed toward the object side in the periphery. The 3f-th lens element 1031 has a negative refractive power. The image side surface of the 3b-th lens element 1032 has a concave surface directed toward the image side and has a negative refractive power. An equation Ymax/Y=0.7772 is held in the embodiment, and the conditional relationship (1) is satisfied. In this embodiment of the present invention, the positive lens in the bonded first lens 1010 is made of glass. The negative lens in the bonded first lens 1010 and the second lens 1020 are made of resin. The 3f-th lens element 1031 and the 3b-th lens element 1032 are made of UV hardening resin material. The Abbe's number v1 of the positive lens in the first lens 1010 is set to 70.4. The Abbe's number v2 of the negative lens in the first lens 1010 is set to 29. The image-side negative lens in the bonded first lens 1010 and the second lens are made of resin, but these lenses may be made of glass. Lens surfaces S1001, S1003, S1004, S1005, S1006 and S1009 have aspheric surface form.

In the embodiment having the above mentioned configuration, each parameter value of the imaging lens is as illustrated in Table 19 below. Here, "Sm" represents the m-th surface number sequentially from the object side. "Sm" also includes each surface of a lens element and a lens flat plate. Surfaces mutually bonded are counted as one as a whole.

TABLE 19

| Sm | Curvature Radius (mm) | Surface Distance on Axis (mm) | Refractive Index | Abbe's Number | FIG. 19 |
|---|---|---|---|---|---|
| 1* | 0.952295954 | 0.350 | 1.48749 | 70.45 | S1001 |
| 2 (ape) | −4.105889586 | 0.34808552 | 1.5737 | 29 | |
| 3* | 25.8190492 | 0.441 | | | S1003 |
| 4* | −4.865878968 | 1.249 | 1.5737 | 29 | S1004 |
| 5* | 321.3645969 | 0.223074305 | | | S1005 |
| 6* | −1.759377165 | 0.05 | 1.5737 | 29 | S1006 |
| 7 | ∞ | 0.3 | 1.48749 | 70.44 | |
| 8 | ∞ | 0.13 | 1.5737 | 29 | |
| 9* | 15.16181409 | 0.078877925 | | | S1009 |

In this embodiment of the present invention, a difference in the Abbe's numbers of the positive lens and the negative lens of the first lens 1010 is represented by $|v1-v2|=41.4$. Thus, the difference in the Abbe's number satisfies the conditional relationship (4). A ratio of $fsl/f=1.05$ where "fsl" represents a focal length of a positive object side surface of the first lens 1010 and "f" represents a focal length of the overall optical system. Thus, the ratio of fsl/f satisfies the conditional relationship (2).

Figure 20A:
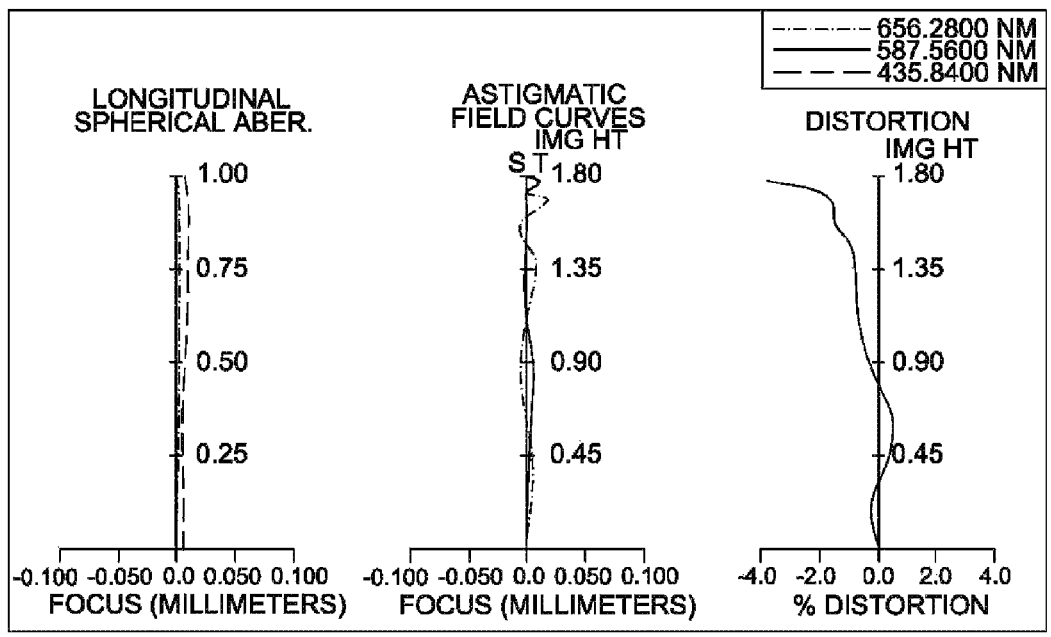
FIG. 20A is a graph showing aberrations of the imaging lens according to the tenth embodiment.
Figure 20B:
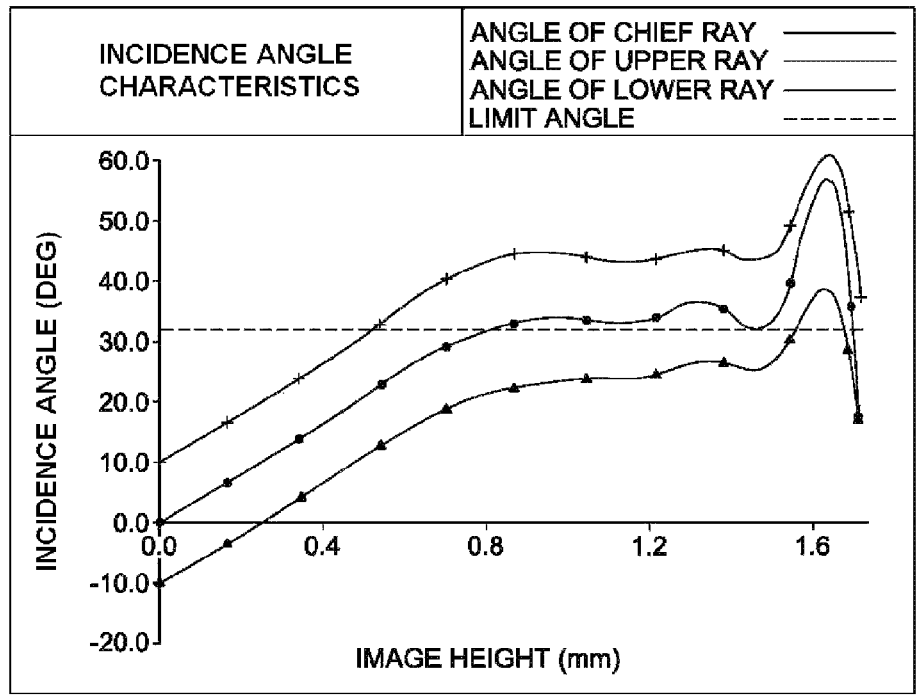
FIG. 20B is a graph showing characteristics of incidence angle, of the imaging lens according to the tenth embodiment, into a solid-state image sensor.

FIG. 20A is a graph showing aberrations of the imaging lens of FIG. 19, and FIG. 20B is a graph showing characteristics of an incidence angle, of the imaging lens of FIG. 19, into a solid-state image sensor. The lens system is simply configured. The lens system satisfies the conditional relationships (1), (2), and (4) so that the overall optical length is short. Further, as illustrated in FIGS. 20A, 20B the lens system obtains satisfactory aberration properties and allows the most image-side resin layer to be thin, and controls the incidence light, of the peripheral light, into the surface of the solid-state image sensor. By using the UV hardening type resin material for the 3f-th lens element 1031 and the 3b-th lens element 1032, the cost can be maintained low, the production can be performed easily, and a large quantity of lenses can be generated at one time by irradiating UV light after a lens element has been formed on a glass plate. Also, the compatibility with the replica method is good.

The following Table 20 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_0|/Y=0.07. \quad \text{[Mathematical Expression 17]}$$

Thus, the conditional relationship (3) is satisfied.

lens element 1131, a third lens flat plate 1130 and a 3b-th lens element 1132 in the order from the object side. Here, the imaging lens configured of three lenses is described in this embodiment of the present invention. However, the imaging lens may be configured of more lenses. For example, in the case where "i" ($i \geq 4$) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 1110 has a positive lens on the object side and has a negative lens on the image side. The first lens 1110 has a positive refractive power. The object side surface of the second lens 1120 has a concave surface directed toward the object side. The object side surface of the 3f-th lens 1131 has a concave surface directed toward the object side near the optical axis and has a convex surface directed toward the object side in the periphery. The 3f-th lens 1131 has a negative refractive power. The image side surface of the 3b-th lens element 1132 has a concave surface directed toward the image side and has a negative refractive power. In this embodiment of the present invention, the positive lens on the object side of the bonded first lens 1110 and the second lens 1120 are made of glass. The 3f-th lens element 1131 and the 3b-th lens element 1132 are made of UV hardening type resin material. The Abbe's number v1 of the positive lens of the first lens 1110 is set to 70.4. The Abbe's number v2 of the negative lens of the first lens 1110 is set to 25.4. In this embodiment of the present invention, a negative lens on the object side of the bonded first lens 1110

TABLE 20

| S | K | A | B | C | D |
|---|---|---|---|---|---|
| 1 | 2.142E−01 | −5.725E−02 | −3.994E−01 | 1.641E+00 | −3.582E+00 |
| 3 | −3.903E+03 | −5.336E−02 | −5.659E−01 | 2.938E+00 | −1.080E+01 |
| 4 | −1.008E+02 | −5.800E−01 | 5.138E−01 | −6.586E+00 | 6.694E+00 |
| 5 | −1.000E+04 | 1.142E−01 | −1.173E−01 | 4.579E−02 | 4.470E−03 |
| 6 | −2.640E+00 | 1.523E−01 | −1.986E−02 | −4.479E−03 | 3.572E−04 |
| 9 | −1.000E+07 | 2.270E−01 | −3.289E−01 | 1.522E−01 | −1.753E−02 |

| S | E | F | G | H | J |
|---|---|---|---|---|---|
| 1 | −8.302E+00 | 3.339E+01 | −3.042E+01 | 9.615E+00 | 2.951E+00 |
| 3 | −5.647E+00 | 5.491E+01 | 1.365E+01 | −3.019E+01 | −3.271E+02 |
| 4 | 1.860E+01 | −2.639E+01 | −1.395E+02 | −7.830E+01 | −2.395E+02 |
| 5 | −6.843E−03 | −1.616E−03 | 1.154E−03 | 1.103E−04 | −6.423E−05 |
| 6 | 3.567E−04 | −3.223E−05 | 0.000E+00 | 0.000E+00 | 0.000E+00 |
| 9 | −4.935E−03 | 5.359E−04 | 2.729E−04 | 2.907E−05 | −1.991E−05 |

Eleventh Embodiment

Figure 21:
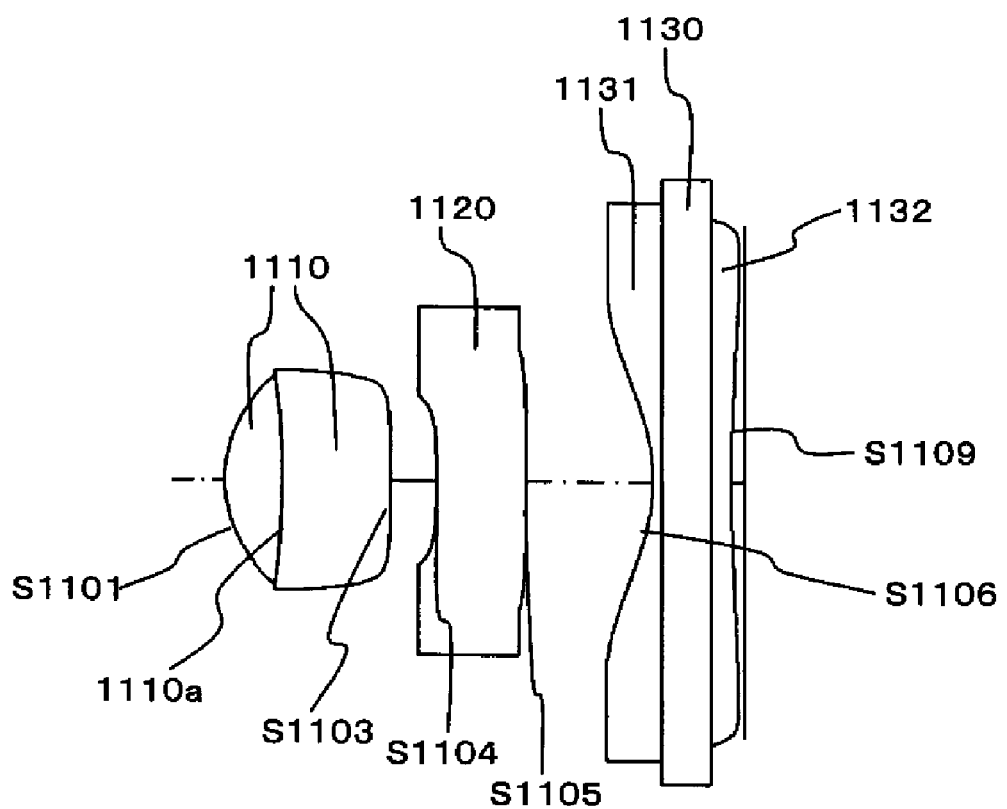
FIG. 21 is a diagram showing a sectional view of an imaging lens according to a eleventh embodiment.

FIG. 21 illustrates a sectional view of the imaging lens according to an eleventh embodiment of the present invention.

As illustrated in FIG. 21, the imaging lens according to this embodiment of the present invention is configured of a lens system including a first lens 1110 having an aperture diaphragm 1110a on the boundary where a positive lens and a negative lens are mutually bonded, a second lens 1120, a 3f-th and the second lens 1120 are made of resin material. However, they may be made of glass. Lens surfaces S1101, S1102, S1103, S1104, S1105, S1106 and S1109 have aspheric surface form.

In the embodiment having the above mentioned configuration, each parameter value of the imaging lens is as illustrated in Table 21 below. Here, "Sm" represents the m-th surface number sequentially from the object side. "Sm" also includes each surface of a lens element and a lens flat plate. Surfaces mutually bonded are counted as one as a whole.

TABLE 21

| Sm | Curvature Radius (mm) | Surface Distance on Axis (mm) | Refractive Index | Abbe's Number | FIG. 21 |
|---|---|---|---|---|---|
| 1* | 0.956564479 | 0.35 | 1.48749 | 70.45 | S1101 |
| 2 (ape) | −5.485715072 | 0.658758334 | 1.80518 | 25.4321 | |
| 3* | −49.16122067 | 0.283661301 | | | S1103 |
| 4* | −9.825402727 | 0.54149869 | 1.80518 | 25.4321 | S1104 |
| 5* | 20.86618697 | 0.77769638 | | | S1105 |
| 6* | −1.361484527 | 0.05 | 1.5737 | 29 | S1106 |
| 7 | ∞ | 0.3 | 1.48749 | 70.44 | |
| 8 | ∞ | 0.13 | 1.5737 | 29 | |
| 9* | −3.606013582 | 0.077601816 | | | S1109 |

In this embodiment of the present invention, a difference in the Abbe's numbers of the positive lens and the negative lens of the first lens 1110 is represented by $|v1-v2|=45$. Thus, the difference in the Abbe's number satisfies the conditional relationship (4). A ratio of fsl/f=1.02 where "fsl" represents a focal length of the object side surface of the positive lens of the first lens 1110 and "f" represents a focal length of the overall optical system. Thus, the ratio of fsl/f satisfies the conditional relationship (2).

Figure 22A:
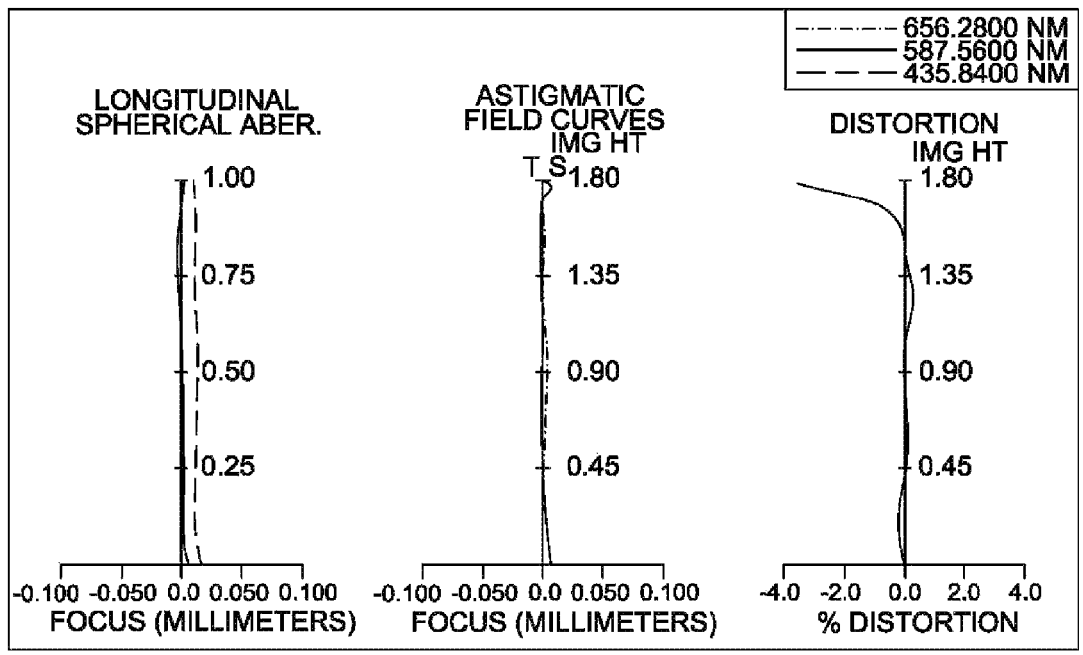
FIG. 22A is a graph showing aberrations of the imaging lens according to the eleventh embodiment.
Figure 22B:
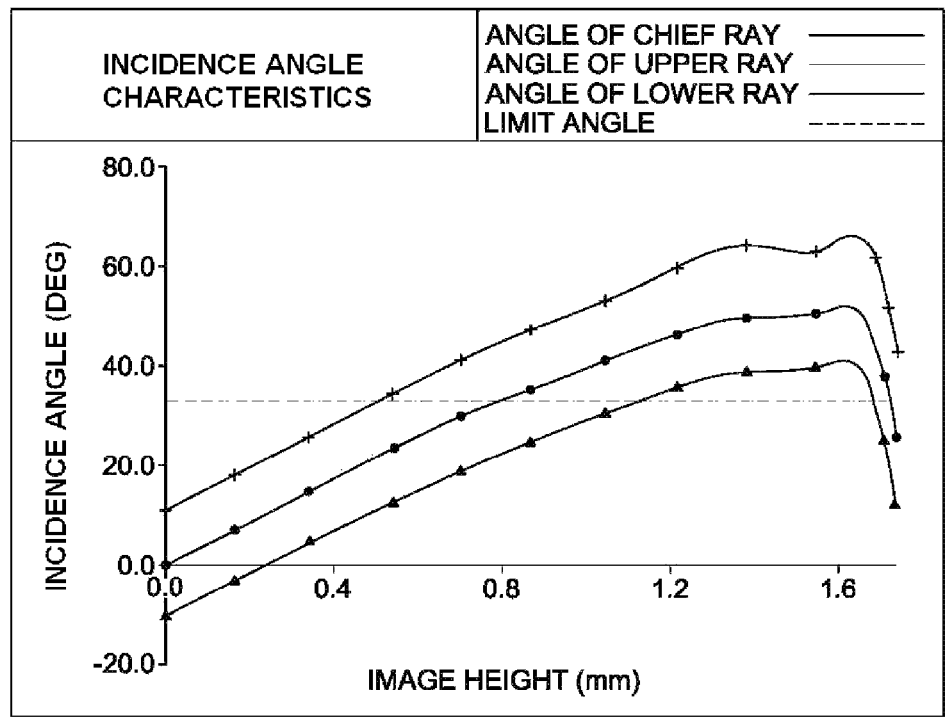
FIG. 22B is a graph showing characteristics of incidence angle, of the imaging lens according to the eleventh embodiment, into a solid-state image sensor.

FIG. 22A is a graph showing aberrations of the imaging lens of FIG. 21, and FIG. 22B is a graph showing characteristics of an incidence angle, of the imaging lens of FIG. 21, into a solid-state image sensor. The lens system is simply configured. The lens system satisfies the conditional relationships (1), (2), and (4) so that the overall optical length is short. Further, as illustrated in FIGS. 22A, 22B the lens system obtains satisfactory aberration properties and allows the most image-side resin layer to be thin, and controls the incidence light, of the peripheral light, into the surface of the solid-state image sensor. By using the UV hardening type resin material for the 3f-th lens element 1131 and the 3b-th lens element 1132, the cost can be maintained low, the production can be performed easily, and a large quantity of lenses can be generated at one time by irradiating UV light after a lens element has been formed on a glass plate. Also, the compatibility with the replica method is good. The following Table 22 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.07.$   [Mathematical Expression 18]

Thus, the conditional relationship (3) is satisfied.

Twelfth Embodiment

Figure 23:
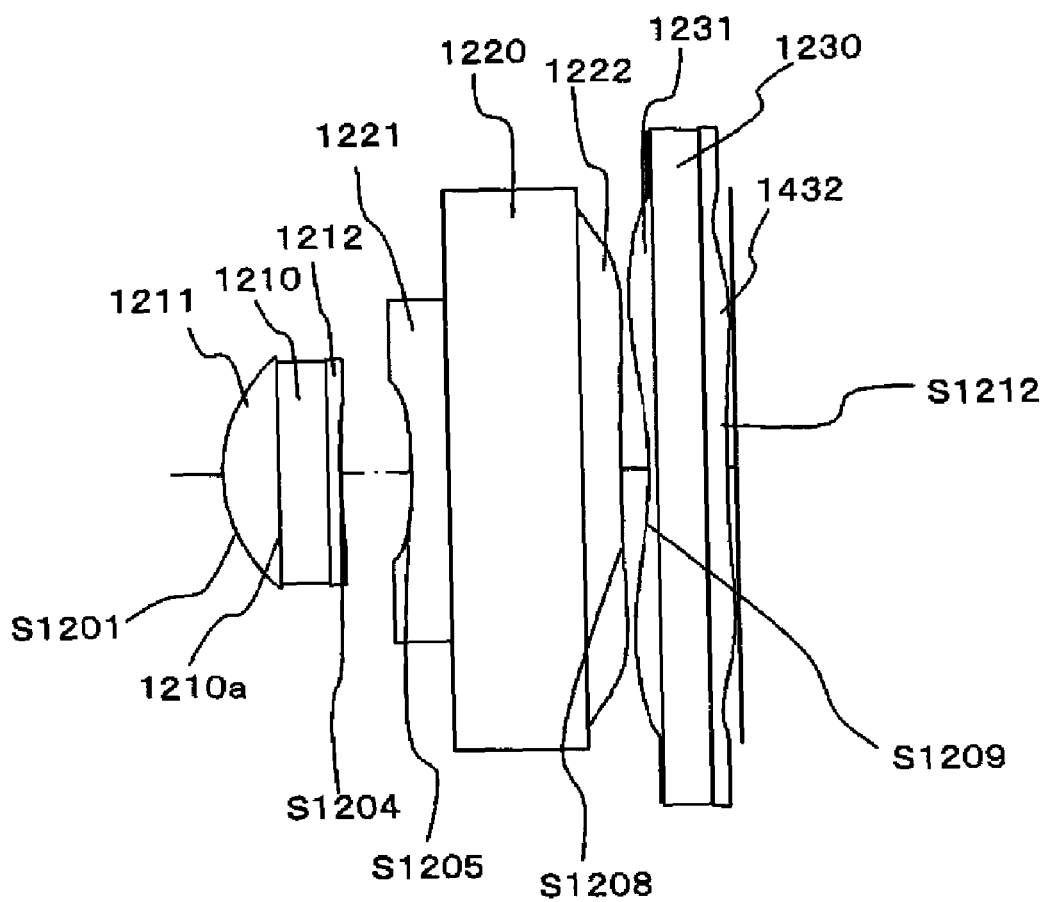
FIG. 23 is a diagram showing a sectional view of an imaging lens according to a twelfth embodiment.

FIG. 23 illustrates a sectional view of the imaging lens according to a twelfth embodiment of the present invention.

As illustrated in FIG. 23, the imaging lens according to this embodiment of the present invention is configured of a lens system including a 1f-th lens element 1211, an aperture diaphragm 1210*a*, a first lens flat plate 1210, a 1b-th lens element 1212, a 2f-th lens element 1221, a second lens flat plate 1220, a 2b-th lens element 1222, a 3f-th lens element 1231, a third lens flat plate 1230 and a 3b-th lens element 1232 in the order from the object side. Here, the imaging lens configured of three lenses is described in this embodiment of the present invention. However, the imaging lens may be configured of more lenses. For example, in the case where "i" ($i\geq 4$) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1211 has a convex surface directed toward the object side and has a positive refractive power. The image side surface of the 1b-th lens element 1212 has a concave surface directed toward the image side and has a negative refractive power. The object side surface of the 2f-th lens element 1221 has a concave surface directed toward the object side and has a negative refractive power. The image side surface of the 2b-th lens element 1222 has a concave surface directed toward the

TABLE 22

| S | K | A | B | C | D |
|---|---|---|---|---|---|
| 1 | 1.962E−01 | −5.936E−02 | −2.967E−01 | 1.136E+00 | −3.400E+00 |
| 3 | −3.669E+11 | −9.850E−02 | −7.823E−01 | 3.099E+00 | −7.382E+00 |
| 4 | −1.868E+03 | −5.257E−01 | 3.589E−01 | −4.386E+00 | 7.285E−01 |
| 5 | −9.282E+10 | 3.676E−02 | −1.773E−01 | −3.752E−03 | 8.420E−02 |
| 6 | −1.168E+00 | 1.459E−01 | −2.791E−02 | 2.716E−03 | 1.118E−03 |
| 9 | −1.000E+07 | 1.325E−01 | −2.063E−01 | 1.300E−01 | −2.509E−02 |

| S | E | F | G | H | J |
|---|---|---|---|---|---|
| 1 | −2.520E+00 | 3.175E+01 | −8.176E+01 | 8.758E+01 | −3.189E−01 |
| 3 | −7.639E+00 | 1.251E+01 | 9.901E+01 | −3.485E+01 | −3.521E+02 |
| 4 | 1.059E+01 | −1.141E+01 | −9.209E+01 | 3.784E+01 | −3.268E+02 |
| 5 | 9.014E−02 | −1.470E−02 | −1.278E−01 | −1.076E−01 | 1.781E−01 |
| 6 | 2.922E−04 | −2.610E−04 | 0.000E+00 | 0.000E+00 | 0.000E+00 |
| 9 | −5.353E−03 | 9.766E−04 | 4.486E−04 | 5.168E−05 | −3.817E−05 | image side and has a negative refractive power. The object side surface of the 3f-th lens element 1231 has a concave surface directed toward the object side near the optical axis and has a convex surface directed toward the object side in the periphery. The 3f-th lens element 1231 has a negative refractive power. An equation Ymax/Y=0.82 is held in the embodiment, and the conditional relationship (1) is satisfied. In this embodiment of the present invention, the 1f-th lens element 1211, the 1b-th lens element 1212, the 2f-th lens element 1221, the 2b-th lens element 1222, the 3f-th lens element 1231, the third lens flat plate 1230 and the 3b-th lens element 1232 are made of UV hardening type resin. The Abbe's number v1 of the 1f-th lens element 1211 is set to 54. The Abbe's number v2 of the 1b-th lens element 1212 is set to 33. Lens surfaces S1201, S1202, S1205, S1208, S1209 and S1212 have aspheric surface form. The glass material used for the lens flat plate may differ respectively.

In the embodiment having the above mentioned configuration, each parameter value of the imaging lens is as illustrated in Table 23 below. Here, "Sm" represents the m-th surface number sequentially from the object side. "Sm" also includes each surface of a lens element and a lens flat plate. Surfaces mutually bonded are counted as one as a whole.

1211 and "f" represents a focal length of the overall optical system. Thus, the ratio of fsl/f satisfies the conditional relationship (2).

Figure 24A:
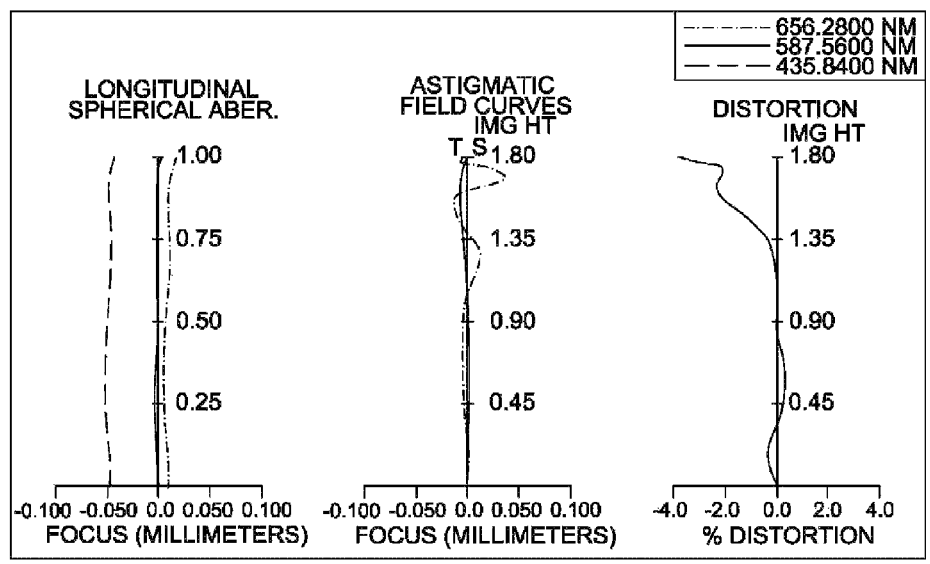
FIG. 24A is a graph showing aberrations of the imaging lens according to the twelfth embodiment.
Figure 24B:
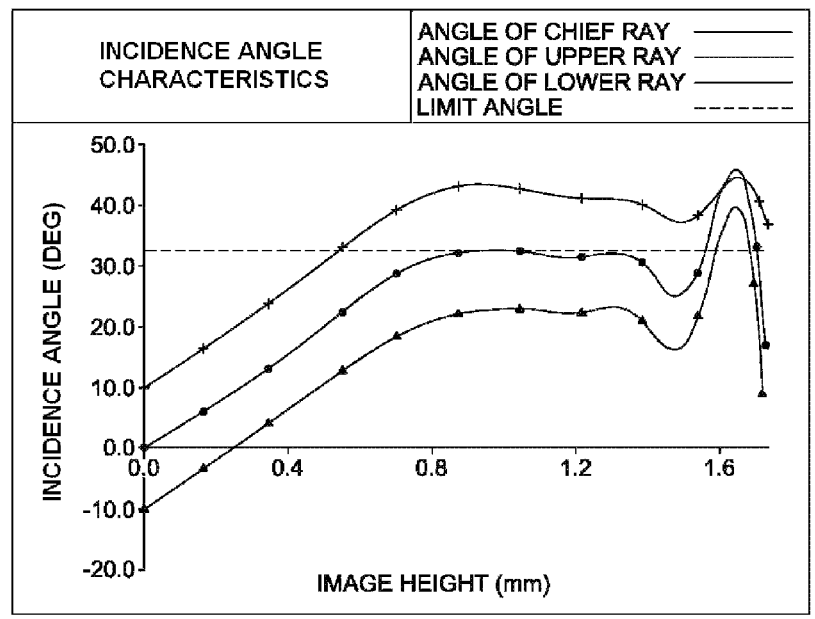
FIG. 24B is a graph showing characteristics of incidence angle, of the imaging lens according to the twelfth embodiment, into a solid-state image sensor.

FIG. 24A is a graph showing aberrations of the imaging lens of FIG. 23, and FIG. 24B is a graph showing characteristics of an incidence angle, of the imaging lens of FIG. 23, into a solid-state image sensor. The lens system is simply configured. The lens system satisfies the conditional relationships (1), (2), and (5) so that the overall optical length is short. Further, as illustrated in FIGS. 24A, 24B, the lens system obtains satisfactory aberration properties and allows the most image-side resin layer to be thin. By using the resin material, the cost can be maintained low and the production can be performed easily.

The following Table 24 illustrates the value of "$A_q$" in the above-mentioned mathematical expression of the aspheric sag amount "X" and specifies the aspheric surface form. In

TABLE 23

| Sm | Curvature Radius (mm) | Surface Distance on Axis (mm) | Refractive Index | Abbe's Number | FIG. 23 |
|---|---|---|---|---|---|
| 1* | 0.91943828 | 0.35 | 1.5071 | 54 | S1201 |
| 2 (ape) | ∞ | 0.3 | 1.544199 | 53.2967 | |
| 3 | ∞ | 0.08 | 1.5834 | 33 | |
| 4* | 5.098205521 | 0.433880209 | | | S1204 |
| 5* | −4.421225003 | 0.228277473 | 1.5834 | 33 | S1205 |
| 6 | ∞ | 0.837025075 | 1.544199 | 53.2967 | |
| 7 | ∞ | 0.235512629 | 1.5834 | 33 | |
| 8* | −4841.630659 | 0.175353855 | | | S1208 |
| 9* | −2.249430254 | 0.05 | 1.5737 | 29 | S1209 |
| 10 | ∞ | 0.3 | 1.544199 | 53.2967 | |
| 11 | ∞ | 0.13 | 1.5737 | 29 | |
| 12* | 8.115939852 | 0.059298284 | | | S1212 |

In this embodiment of the present invention, a difference in the Abbe's numbers of the 1f-th lens element 1211 and the 1b-th lens element 1212 is represented by |v1−v2|=21. Thus, the difference in the Abbe's number satisfies the conditional relationship (4). A ratio of fsl/f=1.01 where "fsl" represents a focal length of the object side surface of the 1f-th lens element this embodiment of the present invention, the most image-side lens surface of a lens has, at the height h that is in the direction perpendicular to the optical axis and of the principal ray of the maximum image height, an aspheric sag amount:

$|X−X_0|/Y=0.07$. [Mathematical Expression 19]

Thus, the conditional relationship (3) is satisfied.

TABLE 24

| S | K | A | B | C | D |
|---|---|---|---|---|---|
| 1 | 2.649E−01 | −3.276E−02 | −4.623E−01 | 1.943E+00 | −3.188E+00 |
| 4 | 1.168E+01 | 1.526E−02 | −3.562E−01 | 2.877E+00 | −9.897E+00 |
| 5 | −8.373E+01 | −5.455E−01 | 4.820E−01 | −5.916E+00 | 8.235E+00 |
| 8 | −1.000E+07 | 7.988E−02 | −1.004E−01 | 4.348E−02 | 6.842E−04 |
| 9 | −1.225E+00 | 1.379E−01 | −2.145E−02 | −4.077E−03 | 7.149E−04 |
| 12 | −1.000E+07 | 2.209E−01 | −3.185E−01 | 1.522E−01 | −1.965E−02 |

| S | E | F | G | H | J |
|---|---|---|---|---|---|
| 1 | −8.833E+00 | 3.210E+01 | −3.028E+01 | 5.518E+00 | 2.944E+00 |
| 4 | −4.463E+00 | 5.492E+01 | 1.366E+01 | −3.019E+01 | −3.271E+02 |
| 5 | 1.492E+01 | −5.982E+01 | −2.928E+01 | −7.829E+01 | −2.395E+02 |
| 8 | −8.038E−03 | −8.393E−04 | 1.066E−03 | 2.797E−04 | −1.176E−04 |
| 9 | 5.859E−04 | −1.071E−04 | 0.000E+00 | 0.000E+00 | 0.000E+00 |
| 12 | −5.821E−03 | 8.209E−04 | 3.986E−04 | 2.247E−05 | −2.661E−05 |

Thirteenth Embodiment

Figure 25:
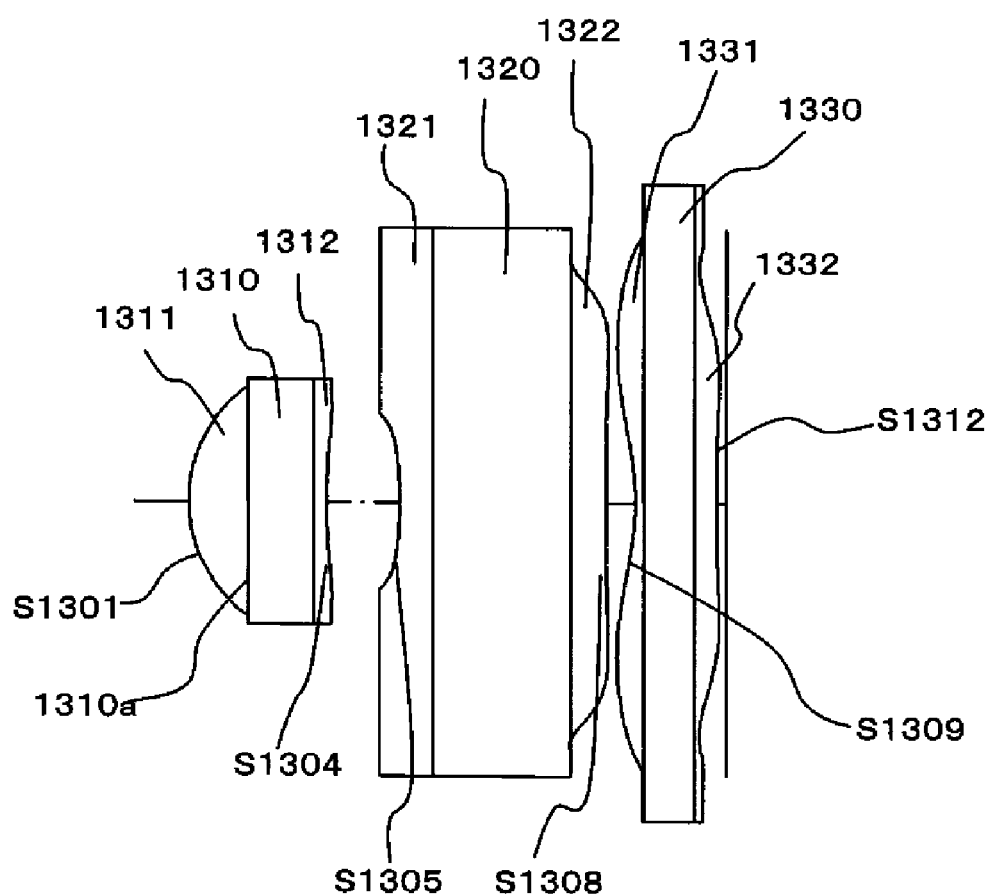
FIG. 25 is a diagram showing a sectional view of an imaging lens according to a thirteenth embodiment.

FIG. 25 illustrates a sectional view of the imaging lens according to a thirteenth embodiment of the present invention.

As illustrated in FIG. 25, the imaging lens according to this embodiment of the present invention is configured of a lens system including a 1f-th lens element 1311, an aperture diaphragm 1310a, a first lens flat plate 1310, a 1b-th lens element 1312, a 2f-th lens element 1321, a second lens flat plate 1320, a 2b-th lens element 1322, a 3f-th lens element 1331, a third lens flat plate 1330 and a 3b-th lens element 1332 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1311 has a convex surface directed toward the object side and has a positive refractive power. The image side surface of the 1b-th lens element 1312 has a concave surface directed toward the image side and has a negative refractive power. The object side surface of the 2f-th lens element 1321 has a concave surface directed toward the object side and has a negative refractive power. The image side surface of the 2b-th lens element 1322 has a concave surface directed toward the image side and has a negative refractive power. The object side surface of the 3f-th lens element 1331 has a concave surface directed toward the object side near the optical axis and has a convex surface directed toward the object side in the periphery. The 3f-th lens element 1331 has a negative power. An equation Ymax/Y=0.82 is held in the embodiment, and the conditional relationship (1) is satisfied. In this embodiment of the present invention, the 1f-th lens element 1311, the 1b-th lens element 1312, the 2f-th lens element 1321, the 2b-th lens element 1322, the 3f-th lens element 1331, the third lens flat plate 1330 and the 3b-th lens element 1332 are made of UV hardening type resin. The Abbe's number ν1 of the 1f-th lens element 1311 is set to 56.3. The Abbe's number ν2 of the 1b-th lens element 1312 is set to 30.2. Lens surfaces S1301, S1304, S1305, S1308, S1309 and S1312 have aspheric surface form. The glass material used for the lens flat plate may differ respectively.

In the embodiment having the above mentioned configuration, each parameter value of the imaging lens is as illustrated in Table 25 below. Here, "Sm" represents the m-th surface number sequentially from the object side. "Sm" also includes each surface of a lens element and a lens flat plate. Surfaces mutually bonded are counted as one as a whole.

TABLE 25

| Sm | Curvature Radius (mm) | Surface Distance on Axis (mm) | Refractive Index | Abbe's Number | FIG. 25 |
| --- | --- | --- | --- | --- | --- |
| 1* | 0.950136325 | 0.35 | 1.5251 | 56.341 | S1301 |
| 2 (ape) | ∞ | 0.388782488 | 1.601102 | 52.4711 | |
| 3 | ∞ | 0.08 | 1.5834 | 30.228 | |
| 4* | 5 | 0.428910966 | | | S1304 |
| 5* | −4.520770562 | 0.196960441 | 1.5834 | 30.228 | S1305 |
| 6 | ∞ | 0.816127106 | 1.601102 | 52.4711 | |
| 7 | ∞ | 0.204194509 | 1.5834 | 30.228 | |
| 8* | −58.30360867 | 0.175085968 | | | S1308 |
| 9* | −1.773265987 | 0.05 | 1.5834 | 30.228 | S1309 |
| 10 | ∞ | 0.3 | 1.601102 | 52.4711 | |
| 11 | ∞ | 0.13 | 1.5834 | 30.228 | |
| 12* | 7.175290689 | 0.058060125 | | | S1312 |

In this embodiment of the present invention, a difference in the Abbe's numbers of the 1f-th lens element 1311 and the 1b-th lens element 1312 is represented by |ν1−ν2|=26.1. Thus, the difference in the Abbe's number satisfies the conditional relationship (5). A ratio of fs1/f=1.05 where "fs1" represents a focal length of the object side surface of the 1f-th lens element 1311 and "f" represents a focal length of the overall optical system. Thus, the ratio of fs1/f satisfies the conditional relationship (2).

Figure 26A:
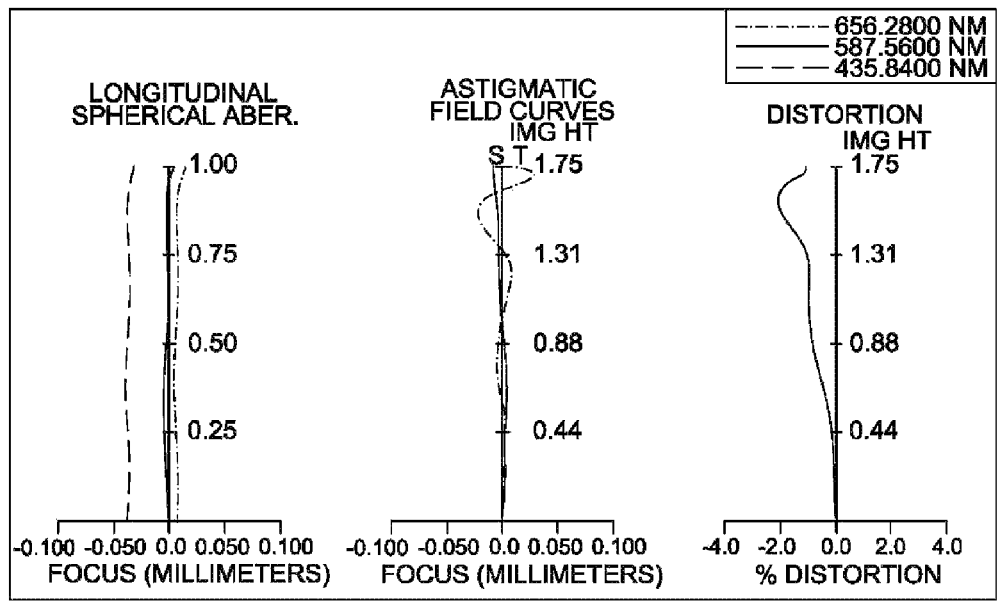
FIG. 26A is a graph showing aberrations of the imaging lens according to the thirteenth embodiment.
Figure 26B:
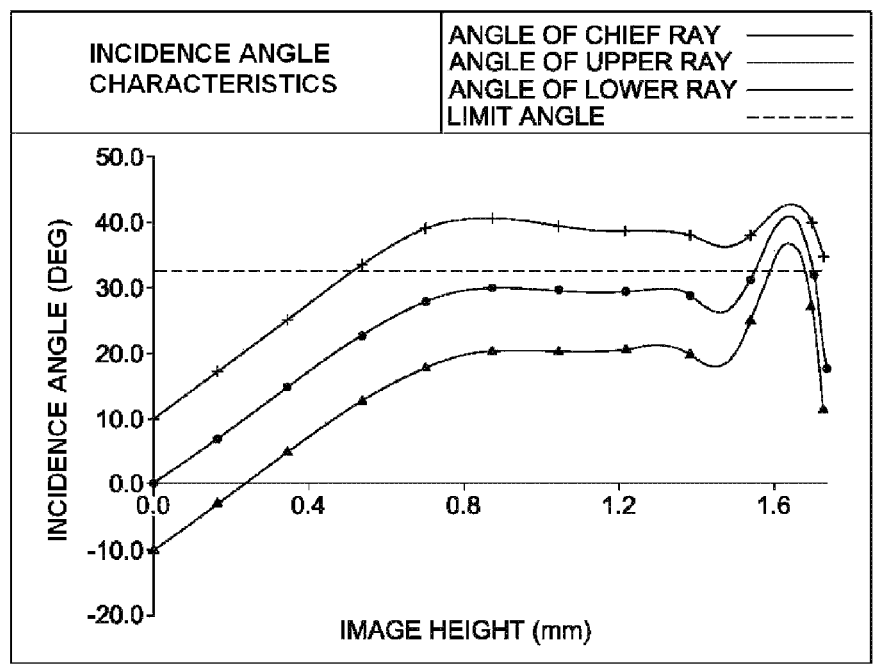
FIG. 26B is a graph showing characteristics of incidence angle, of the imaging lens according to the thirteenth embodiment, into a solid-state image sensor.

FIG. 26A is a graph showing aberrations of the imaging lens of FIG. 25, and FIG. 26B is a graph showing characteristics of an incidence angle, of the imaging lens of FIG. 25, into a solid-state image sensor. The lens system is simply configured. The lens system satisfies the conditional relationships (1) and (3) so that the overall optical length is short. Further, as illustrated in FIGS. 26A, 26B, the lens system obtains satisfactory aberration properties and allows the most image-side resin layer to be thin, and controls the incidence light, of the peripheral light, into the surface of the solid-state image sensor. By using the resin material, the cost can be maintained low and the production can be performed easily.

The following Table 26 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.07$.    [Mathematical Expression 20]

Thus, the conditional relationship (3) is satisfied.

TABLE 26

| S | K | A | B | C | D |
|---|---|---|---|---|---|
| 1 | 2.727E−01 | −3.214E−02 | −4.508E−01 | 1.958E+00 | −3.208E+00 |
| 4 | 5.162E+00 | 8.159E−03 | −3.715E−01 | 3.332E+00 | −1.255E+01 |
| 5 | −5.912E+01 | −5.306E−01 | 3.984E−01 | −6.034E+00 | 8.841E+00 |
| 8 | −1.000E+09 | 9.274E−02 | −1.122E−01 | 4.582E−02 | 1.185E−04 |
| 9 | −8.778E+00 | 1.192E−01 | −2.713E−02 | −3.607E−03 | 1.162E−03 |
| 12 | −1.000E+09 | 1.888E−01 | −3.226E−01 | 1.552E−01 | −1.717E−02 |

| S | E | F | G | H | J |
|---|---|---|---|---|---|
| 1 | −9.317E+00 | 3.472E+01 | −3.430E+01 | 9.604E+00 | 2.944E+00 |
| 4 | −5.437E−01 | 5.492E+01 | 1.366E+01 | −3.019E+01 | −3.271E+02 |
| 5 | 1.441E+01 | −5.982E+01 | −2.928E+01 | −7.829E+01 | −2.395E+02 |
| 8 | −8.306E−03 | −1.119E−03 | 1.209E−03 | 2.501E−04 | −9.719E−05 |
| 9 | 6.475E−04 | −1.449E−04 | 0.000E+00 | 0.000E+00 | 0.000E+00 |
| 12 | −5.060E−03 | 4.677E−04 | 2.489E−04 | 2.700E−05 | −1.611E−05 |

Fourteenth Embodiment

Figure 27:
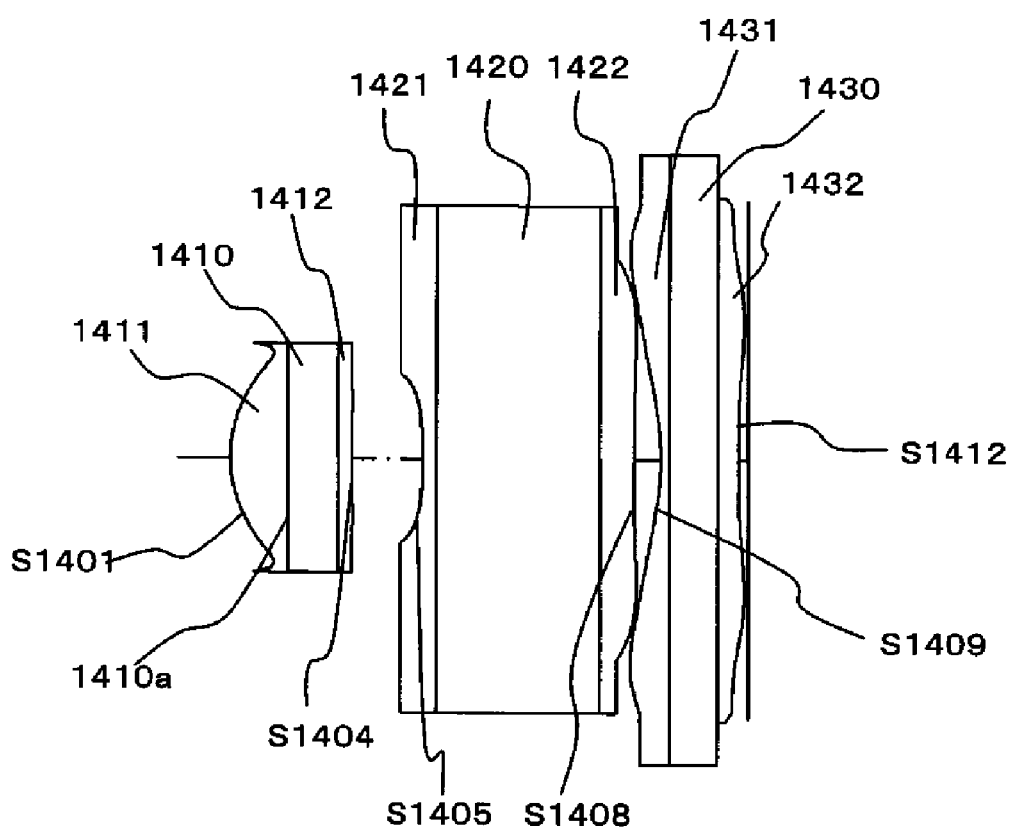
FIG. 27 is a diagram showing a sectional view of an imaging lens according to a fourteenth embodiment.

FIG. 27 illustrates a sectional view of the imaging lens according to a fourteenth embodiment of the present invention.

As illustrated in FIG. 27, the imaging lens according to this embodiment of the present invention is configured of a lens system including a 1f-th lens element 1411, an aperture diaphragm 1410a, a first lens flat plate 1410, a 1b-th lens element 1412, a 2f-th lens element 1421, a second lens flat plate 1420, a 2b-th lens element 1422, a 3f-th lens element 1431, a third lens flat plate 1430 and a 3b-th lens element 1432 in the order from the object side. Here, the imaging lens configured of three lenses is described in this embodiment of the present invention. However, the imaging lens may be configured of more lenses. For example, in the case where "i" (i≧4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1411 has a convex surface directed toward the object side and has a positive refractive power. The image side surface of the 1b-th lens element 1412 has a concave surface directed toward the image side and has a negative refractive power. The object side surface of the 2f-th lens element 1421 has a concave surface directed toward the object side and has a negative refractive power. The image side surface of the 2b-th lens element 1422 has a concave surface directed toward the image side and has a negative refractive power. The object side surface of the 3f-th lens element 1431 has a concave surface directed toward the object side near the optical axis and has a convex surface directed toward the object side in the periphery. The 3f-th lens element 1431 has a negative refractive power. An equation Ymax/Y=0.782 is held in the embodiment, and the conditional relationship (1) is satisfied. In this embodiment of the present invention, the 1f-th lens element 1411, the 1b-th lens element 1412, the 2f-th lens element 1421, the 2b-th lens element 1422, the 3f-th lens element 1431, the third lens flat plate 1430 and the 3b-th lens element 1432 are made of UV hardening type resin. The Abbe's number v1 of the 1f-th lens element 1411 is set to 70.4. The Abbe's number v2 of the 1b-th lens element 1412 is set to 61.1. Lens surfaces S1401, S1404, S1405, S1408, S1409 and S1412 have aspheric surface form. The glass material used for the lens flat plate may differ respectively.

In the embodiment having the above mentioned configuration, each parameter value of the imaging lens is as illustrated in Table 31 below. Here, "Sm" represents the m-th surface number sequentially from the object side. "Sm" also includes each surface of a lens element and a lens flat plate. Surfaces mutually bonded are counted as one as a whole.

TABLE 27

| Sm | Curvature Radius (mm) | Surface Distance on Axis (mm) | Refractive Index | Abbe's Number | FIG. 27 |
|---|---|---|---|---|---|
| 1* | 0.9554525843 | 0.35 | 1.48749 | 70.45 | S1401 |
| 2 (ape) | ∞ | 0.307632346 | 1.48749 | 70.44 | |
| 3 | ∞ | 0.085 | 1.58913 | 61.1131 | |
| 4* | 15.28290012 | 0.441 | | | S1404 |
| 5* | −3.910270565 | 0.080659231 | 1.58913 | 61.1131 | S1405 |
| 6 | ∞ | 1 | 1.48749 | 70.44 | |
| 7 | ∞ | 0.21086471 | 1.58913 | 61.1131 | |
| 8* | 71.53238676 | 0.164875216 | | | S1408 |
| 9* | −1.898137458 | 0.05 | 1.58913 | 61.1131 | S1409 |
| 10 | ∞ | 0.3 | 1.693858 | 53.8728 | |
| 11 | ∞ | 0.13 | 1.58913 | 61.1131 | |
| 12* | −9.9155011 | 0.059142514 | | | S1412 |

In this embodiment of the present invention, a difference in the Abbe's numbers of the 1f-th lens element 1411 and the 1b-th lens element 1412 is represented by $|v1-v2|=9.3$. Thus, the difference in the Abbe's number satisfies the conditional relationship (4'). A ratio of $fsl/f=1.05$ where "fsl" represents a focal length of the object side surface of the 1f-th lens element 1411 and "f" represents a focal length of the overall optical system. Thus, the ratio of fsl/f satisfies the conditional relationship (2).

Figure 28A:
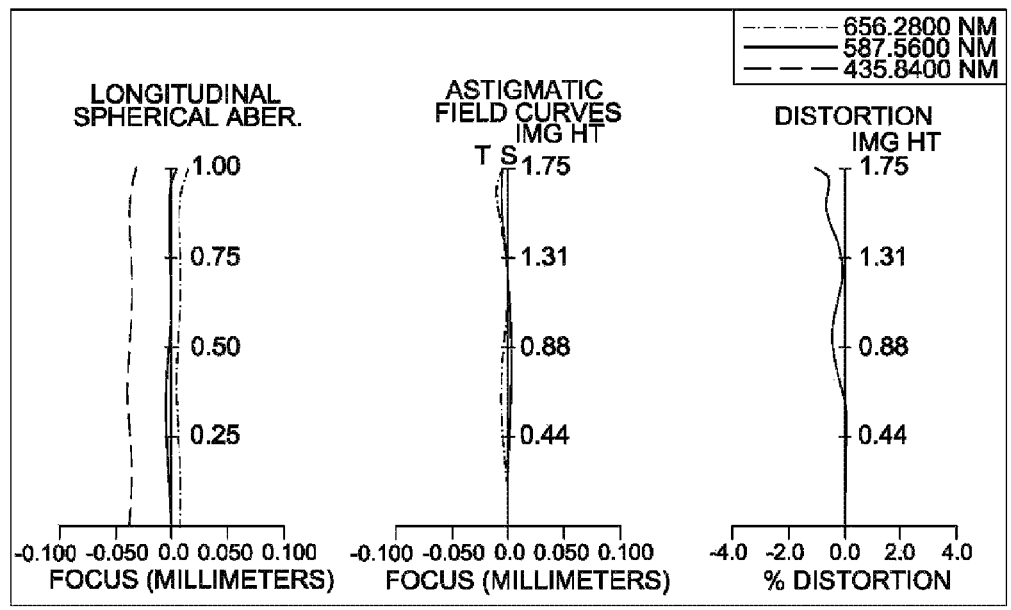
FIG. 28A is a graph showing aberrations of the imaging lens according to the fourteenth embodiment.
Figure 28B:
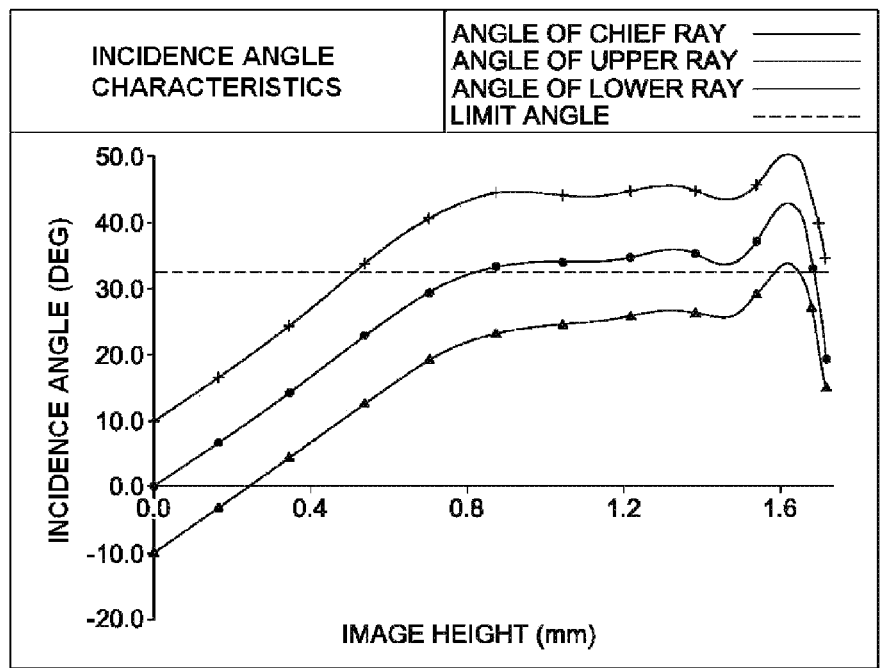
FIG. 28B is a graph showing characteristics of incidence angle, of the imaging lens according to the fourteenth embodiment, into a solid-state image sensor.

FIG. 28A is a graph showing aberrations of the imaging lens of FIG. 27, and FIG. 28B is a graph showing characteristics of an incidence angle, of the imaging lens of FIG. 27, into a solid-state image sensor. The lens system is simply configured. The lens system satisfies the conditional relationships (1) and (3') so that the overall optical length is short. Further, as illustrated in FIGS. 28A, 28B the lens system obtains satisfactory aberration properties and allows the most image-side resin layer to be thin, and controls the incidence light, of the peripheral light, into the surface of the solid-state image sensor. By using the resin material, the cost can be maintained low and the production can be performed easily.

The following Table 28 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_0|/Y=0.07$. [Mathematical Expression 21]

Thus, the conditional relationship (3) is satisfied.

lenses are used, an i-th lens disposed at the most image side may be configured similar to the fourth lens in this embodiment. In this case, any kind of lens (for example, a bonded lens, a spherical lens or an aspherical lens) may be used in between the third lens and the i-th lens. Further, as long as the requested compactness can be secured, the number of lenses is not limited to four, and the number of lenses may be five or six. The object side surface of the 1f-th lens element 1511 has a convex surface directed toward the object side and has a positive refractive power. The image side surface of the 1b-th lens element 1512 has a concave surface directed toward the image side and has a negative refractive power. The object side surface of the 2f-th lens element 1521 has a concave surface directed toward the object side and has a negative refractive power. The image side surface of the 2b-th lens element 1522 has a convex surface directed toward the image side and has a positive refractive power. The object-side surface of the 3f-th lens element has a convex shape toward the object side and has a positive refractive power. The image-side surface of the 3b-lens element 1532 has a concave shape toward the image side and has a negative refractive power. The object-side surface of the 4f-th lens element 1541 has a convex shape toward the object side in the vicinity of the optical axis and a positive refractive power, and has a convex shape toward the object side in the periphery. An equation Ymax/Y=0.716 is held in the embodiment, and the conditional relationship (1) is satisfied. In this embodiment of the present invention, the 1f-th lens element 1511, the 1b-th lens

TABLE 28

| S | K | A | B | C | D |
|---|---|---|---|---|---|
| 1 | 2.426E−01 | −4.873E−02 | −4.346E−01 | 1.915E+00 | −3.873E+00 |
| 4 | −5.964E+02 | −3.266E−02 | −2.600E−01 | 8.102E−01 | −1.361E+00 |
| 5 | 2.010E+01 | −4.344E−01 | 6.230E−01 | −7.056E+00 | 1.064E+01 |
| 8 | −1.000E+11 | 9.340E−02 | −1.184E−01 | 3.492E−02 | 4.190E−03 |
| 9 | −1.579E+01 | 4.223E−02 | −2.043E−02 | −2.452E−03 | 3.037E−03 |
| 12 | −1.000E+08 | 2.349E−01 | −3.394E−01 | 1.610E−01 | −1.859E−02 |

| S | E | F | G | H | J |
|---|---|---|---|---|---|
| 1 | −1.018E+01 | 4.091E+01 | −2.376E+01 | −7.537E+00 | −5.419E+01 |
| 4 | −2.056E+01 | 5.747E+01 | 1.366E+01 | −3.019E+01 | −3.271E+02 |
| 5 | 1.072E+01 | −5.060E+01 | −3.040E+01 | −8.285E+01 | −2.395E+02 |
| 8 | −7.508E−03 | −5.305E−04 | 1.281E−03 | 2.424E−04 | −1.494E−04 |
| 9 | 8.711E−04 | −3.629E−04 | 0.000E−00 | 0.000E+00 | 0.000E+00 |
| 12 | −6.069E−03 | 7.015E−04 | 2.949E−04 | 3.513E−05 | −2.125E−05 |

Fifteenth Embodiment

Figure 29:
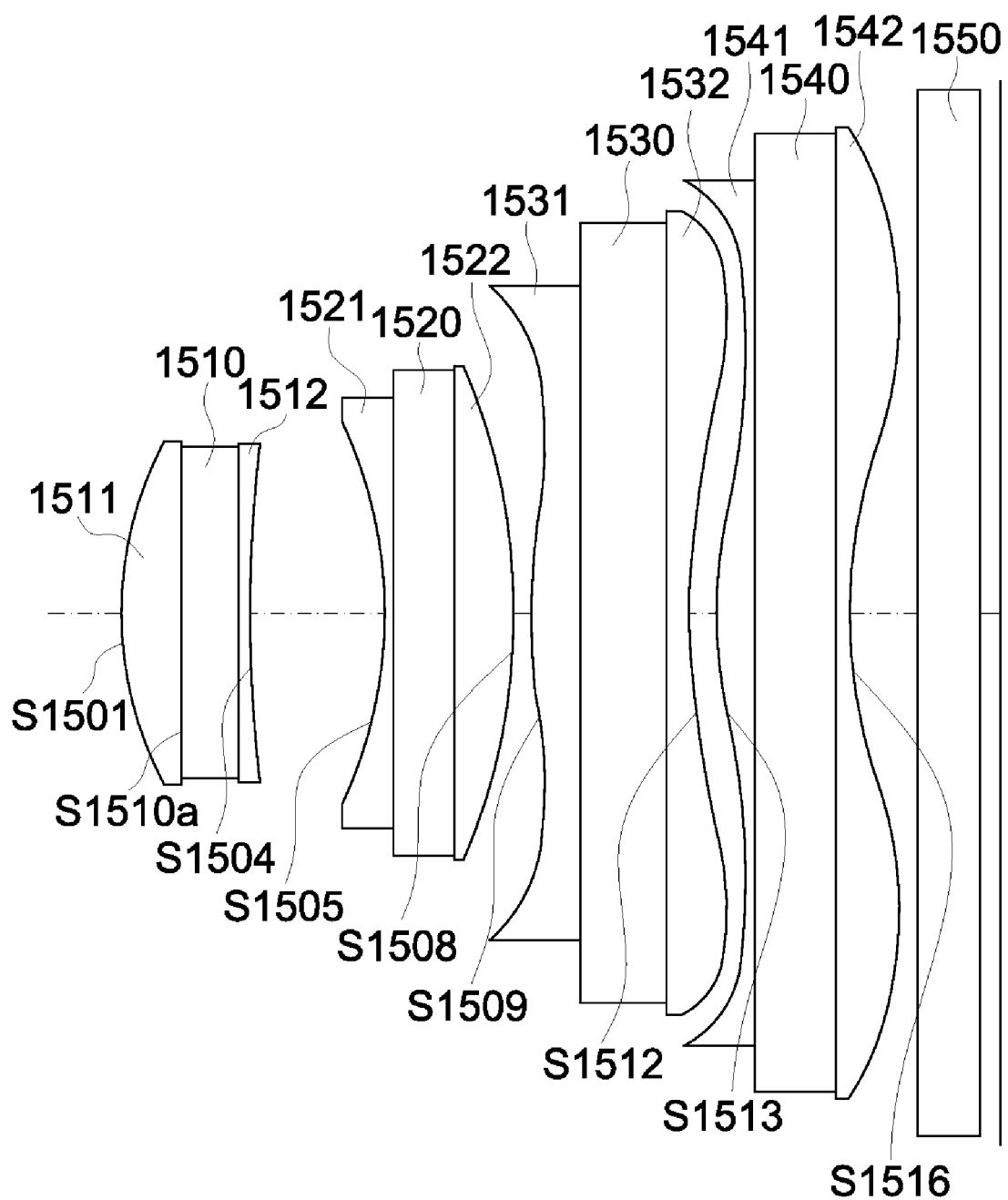
FIG. 29 is a diagram showing a sectional view of an imaging lens according to a fifteens embodiment.

FIG. 29 illustrates a sectional view of the imaging lens according to a fifteenth embodiment of the present invention.

As illustrated in FIG. 29, the imaging lens according to this embodiment of the present invention is configured of a lens system including a 1f-th lens element 1511, an aperture diaphragm 1510a, a first lens flat plate 1510, a 1b-th lens element 1512, a 2f-th lens element 1521, a second lens flat plate 1520, a 2b-th lens element 1522, a 3f-th lens element 1531, a third lens flat plate 1530, a 3b-th lens element 1532, a 4f-th lens element 1541, a fourth lens flat plate 1540, a 4b-th lens element 1542, and a fifth lens flat plate 1550 in the order from the object side. Here, the imaging lens configured of four lenses is described in this embodiment of the present invention. However, the imaging lens may be configured of more lenses. For example, in the case where "i" (i>5) number of element 1512, the 2f-th lens element 1521, the 2b-th lens element 5422, the 3f-th lens element 1531, the third lens flat plate 1530 and the 3b-th lens element 1532, the 4f-th lens element 1541, the 4th lens flat plate 1540, and the 4b-th lens element 1542 are made of UV hardening type resin. The Abbe's number v1 of the 1f-th lens element 1511 is set to 57. The Abbe's number v2 of the 1b-th lens element 1512 is set to 32. Lens surfaces S1501, S1504, S1505, S1508, S1509, S1512, S1513 and S1516 have aspheric surface form. The glass material used for the lens flat plate may differ respectively.

In the embodiment having the above mentioned configuration, each parameter value of the imaging lens is as illustrated in Table 29 below. Here, "Sm" represents the m-th surface number sequentially from the object side. "Sm" also includes each surface of a lens element and a lens flat plate. Surfaces mutually bonded are counted as one as a whole.

TABLE 29

| Sm | Curvature Radius (mm) | Surface Distance on Axis (mm) | Refractive Index | Abbe's Number | FIG. 29 |
|---|---|---|---|---|---|
| 1* | 1.462 | 0.300 | 1.520 | 57.00 | S1501 |
| 2 (ape) | ∞ | 0.300 | 1.474 | 56.40 | |
| 3 | ∞ | 0.050 | 1.550 | 32.00 | |
| 4* | 7.210 | 0.688 | | | S1504 |
| 5* | −2.345 | 0.054 | 1.550 | 32.00 | S1505 |
| 6 | ∞ | 0.300 | 1.474 | 56.40 | |
| 7 | ∞ | 0.300 | 1.520 | 57.00 | |
| 8* | −5.716 | 0.100 | | | S1508 |
| 9* | 2.353 | 0.246 | 1.520 | 57.00 | S1509 |
| 10 | ∞ | 0.438 | 1.474 | 56.40 | |
| 11 | ∞ | 0.106 | 1.520 | 57.00 | |
| 12* | 2.049 | 0.145 | | | S1512 |
| 13* | 1.496 | 0.201 | 1.520 | 57.00 | S1513 |
| 14 | ∞ | 0.422 | 1.474 | 56.40 | |
| 15 | ∞ | 0.063 | 1.520 | 57.00 | |
| 16* | 1.410 | 0.357 | | | S1516 |
| 17 | ∞ | 0.300 | 1.516 | 64.10 | |
| 18 | ∞ | 0.102 | | | |

In this embodiment of the present invention, a difference in the Abbe's numbers of the 1f-th lens element 1511 and the 1b-th lens element 1512 is represented by $|v1-v2|=25$. Thus, the difference in the Abbe's number satisfies the conditional relationship (4). A ratio of $fsl/f=1.17$ where "fsl" represents a focal length of the object side surface of the 1f-th lens element 1511 and "f" represents a focal length of the overall optical system. Thus, the ratio of $fsl/f$ satisfies the conditional relationship (2).

Figure 30A:
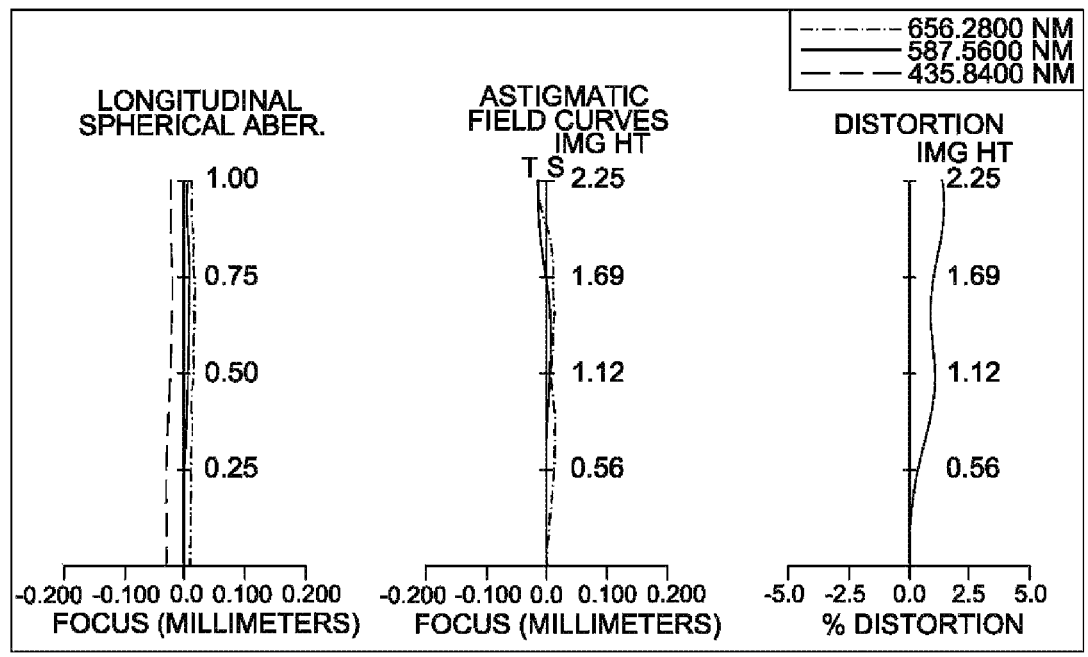
FIG. 30A is a graph showing aberrations of the imaging lens according to the fifteenth embodiment.
Figure 30B:
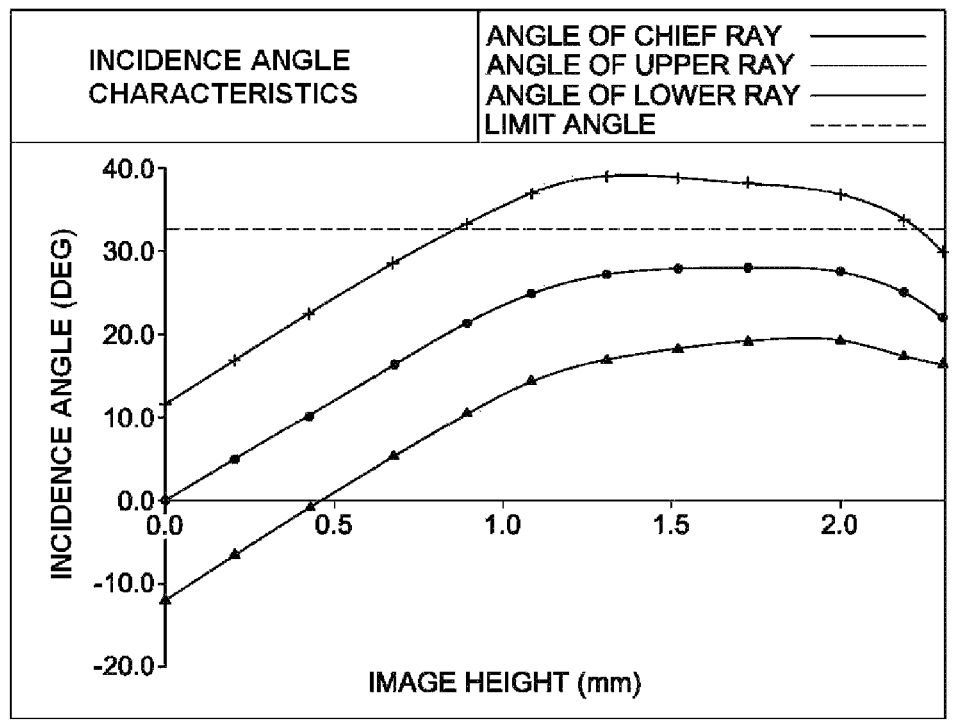
FIG. 30B is a graph showing characteristics of incidence angle, of the imaging lens according to the fifteenth embodiment, into a solid-state image sensor.

FIG. 30A is a graph showing aberrations of the imaging lens of FIG. 29, and FIG. 30B is a graph showing characteristics of an incidence angle, of the imaging lens of FIG. 29, into a solid-state image sensor. The lens system is simply configured. The lens system satisfies the conditional relationships (1), (2), and (4) so that the overall optical length is short. Further, as illustrated in FIGS. 30A, 30B the lens system obtains satisfactory aberration properties and allows the most image-side resin layer to be thin, and controls the incidence light, of the peripheral light, into the surface of the solid-state image sensor. By using the resin material, the cost can be maintained low and the production can be performed easily.

The following Table 30 illustrates the value of "$A_q$" in the above-mentioned mathematical expression of the aspheric sag amount "X" and specifies the aspheric surface form.

Sixteenth Embodiment

Figure 31:
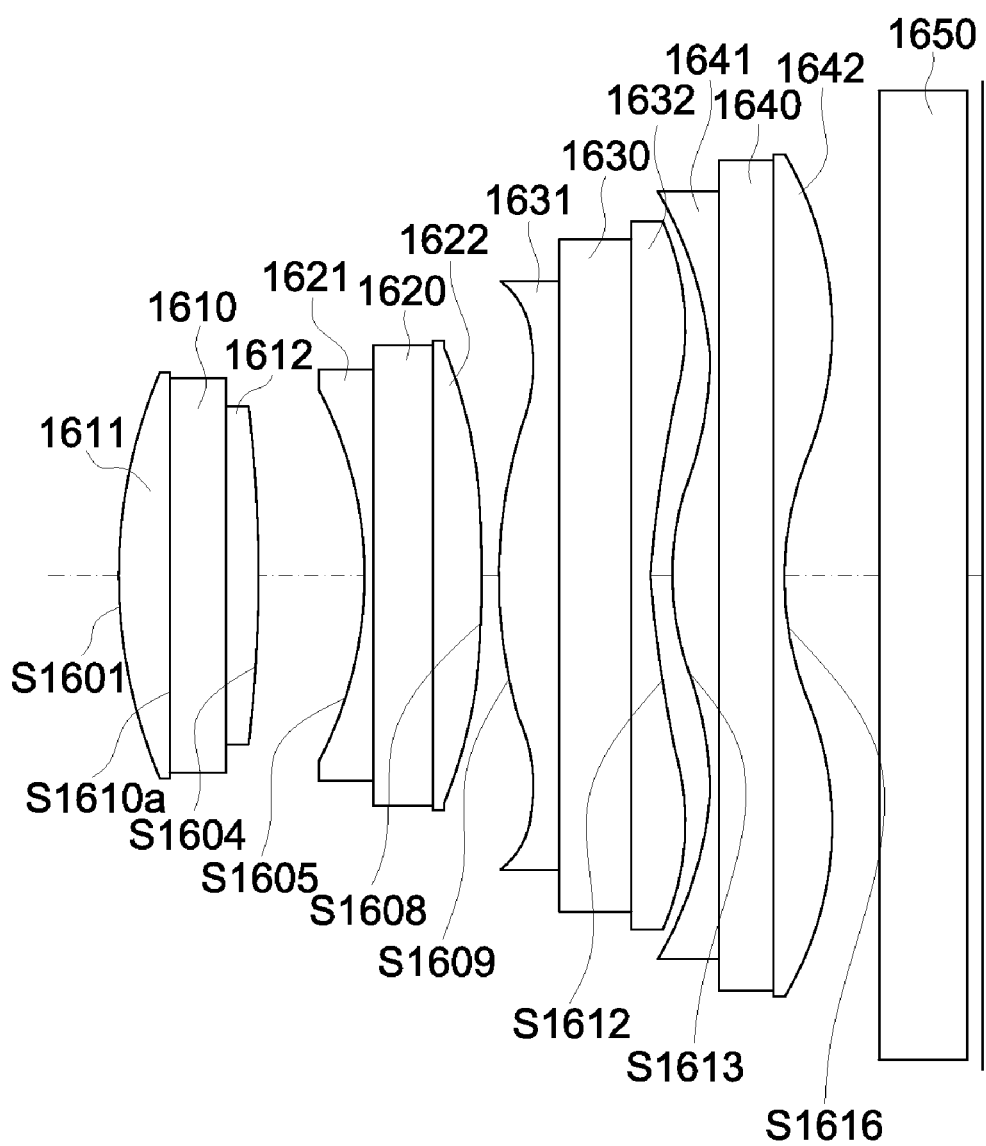
FIG. 31 is a diagram showing a sectional view of an imaging lens according to a sixteenth embodiment.

FIG. 31 illustrates a sectional view of the imaging lens according to a sixteenth embodiment of the present invention.

As illustrated in FIG. 31, the imaging lens according to this embodiment of the present invention is configured of a lens system including a 1f-th lens element 1611, an aperture diaphragm 1610a, a first lens flat plate 1610, a 1b-th lens element 1612, a 2f-th lens element 1621, a second lens flat plate 1620, a 2b-th lens element 1622, a 3f-th lens element 1631, a third lens flat plate 1630, a 3b-th lens element 1632, a 4f-th lens element 1641, a fourth lens flat plate 1640, a 4b-th lens element 1642, and a fifth lens flat plate 1650 in the order from the object side. Here, the imaging lens configured of four lenses is described in this embodiment of the present invention. However, the imaging lens may be configured of more lenses. For example, in the case where "i" (i>5) number of lenses are used, an i-th lens disposed at the most image side may be configured similar to the fourth lens in this embodiment. In this case, any kind of lens (for example, a bonded lens, a spherical lens or an aspherical lens) may be used in between the third lens and the i-th lens. Further, as long as the requested compactness can be secured, the number of lenses is not limited to four, and the number of lenses may be five or six. The object side surface of the 1f-th lens element 1611 has a convex surface directed toward the object side and has a positive refractive power. The image side surface of the 1b-th lens element 1612 has a convex surface directed toward the image side and has a positive refractive power. The object side surface of the 2f-th lens element 1621 has a concave surface directed toward the object side and has a negative refractive power. The image side surface of the 2b-th lens element 1622 has a convex surface directed toward the image side and has a positive refractive power. The object-side surface of the 3f-th lens element has a convex shape toward the object side and has a positive refractive power. The image-side surface of the 3b-lens element 1632 has a concave shape toward the image side and has a negative refractive power. The object-side surface of the 4f-th lens element 1641 has a convex shape toward the object side in the vicinity of the optical axis and a positive refractive power, and has a convex shape toward the object side in the periphery. An equation Ymax/Y=0.661 is held in the embodiment, and the conditional relationship (1) is satisfied. In this embodiment of the present invention, the 1f-th lens element 1611, the 1b-th lens element 1612, the 2f-th lens element 1621, the 2b-th lens element 1622, the 3f-th lens element 1631, the third lens flat plate 1630 and the 3b-th lens element 1632, the 4f-th lens element 1641, the 4th lens flat plate 1640, and the 4b-th lens element 1642 are made of UV

TABLE 30

| S | K | A | B | C | D |
|---|---|---|---|---|---|
| 1 | −1.803E−01 | 1.313E−02 | 6.098E−03 | 2.057E−02 | −1.140E−02 |
| 4 | 2.344E+01 | 5.727E−03 | 1.515E−02 | −3.069E−02 | 1.706E−02 |
| 5 | 5.104E+00 | −2.933E−02 | 1.468E−02 | −1.909E−03 | 2.780E−02 |
| 8 | −3.000E+01 | −3.151E−01 | 2.454E−01 | −9.596E−02 | 1.397E−02 |
| 9 | −1.151E+01 | −1.504E−01 | 5.553E−02 | −2.060E−02 | 3.532E−03 |
| 12 | −7.782E+00 | −1.197E−02 | −2.329E−02 | 7.840E−03 | 6.127E−04 |
| 13 | −6.271E+00 | −1.164E−01 | 2.175E−02 | 6.138E−03 | −1.743E−03 |
| 16 | −5.598E+00 | −3.724E−02 | −1.730E−02 | 8.493E−03 | −1.192E−03 |

| S | E | F | G | H | J |
|---|---|---|---|---|---|
| 1 | 0.000E+00 | 0.000E+00 | 0.000E+00 | 0.000E+00 | 0.000E+00 |
| 4 | 0.000E+00 | 0.000E+00 | 0.000E+00 | 0.000E+00 | 0.000E+00 |
| 5 | 0.000E+00 | 0.000E+00 | 0.000E+00 | 0.000E+00 | 0.000E+00 |
| 8 | 1.086E−03 | 0.000E+00 | 0.000E+00 | 0.000E+00 | 0.000E+00 |
| 9 | −9.758E−04 | 0.000E+00 | 0.000E+00 | 0.000E+00 | 0.000E+00 |
| 12 | −5.834E−04 | 0.000E+00 | 0.000E+00 | 0.000E+00 | 0.000E+00 |
| 13 | −8.857E−05 | 0.000E+00 | 0.000E+00 | 0.000E+00 | 0.000E+00 |
| 16 | 3.964E−05 | 0.000E+00 | 0.000E+00 | 0.000E+00 | 0.000E+00 | hardening type resin. The Abbe's number ν1 of the 1f-th lens element 1611 is set to 57. The Abbe's number ν2 of the 1b-th lens element 1612 is set to 57. Lens surfaces S1501, S1504, S1505, S1508, S1509, S1512, S1513 and S1516 have aspheric surface form. The glass material used for the lens flat plate may differ respectively.

In the embodiment having the above mentioned configuration, each parameter value of the imaging lens is as illustrated in Table 31 below. Here, "Sm" represents the m-th surface number sequentially from the object side. "Sm" also includes each surface of a lens element and a lens flat plate. Surfaces mutually bonded are counted as one as a whole.

TABLE 31

| Sm | Curvature Radius (mm) | Surface Distance on Axis (mm) | Refractive Index | Abbe's Number | FIG. 31 |
|---|---|---|---|---|---|
| 1* | 1.822 | 0.269 | 1.520 | 57.00 | S1601 |
| 2 (ape) | ∞ | 0.300 | 1.474 | 56.40 | |
| 3 | ∞ | 0.175 | 1.520 | 57.00 | |
| 4* | −12.800 | 0.569 | | | S1604 |
| 5* | −1.873 | 0.050 | 1.550 | 32.00 | S1605 |
| 6 | ∞ | 0.313 | 1.474 | 56.40 | |
| 7 | ∞ | 0.255 | 1.520 | 57.00 | |
| 8* | −199.900 | 0.111 | | | S1608 |
| 9* | 1.560 | 0.310 | 1.520 | 57.00 | S1609 |
| 10 | ∞ | 0.383 | 1.474 | 56.40 | |
| 11 | ∞ | 0.103 | 1.520 | 57.00 | |
| 12* | 1.799 | 0.114 | | | S1612 |
| 13* | 0.929 | 0.248 | 1.520 | 57.00 | S1613 |

TABLE 31-continued

| Sm | Curvature Radius (mm) | Surface Distance on Axis (mm) | Refractive Index | Abbe's Number | FIG. 31 |
|---|---|---|---|---|---|
| 14 | ∞ | 0.300 | 1.474 | 56.40 | |
| 15 | ∞ | 0.043 | 1.520 | 57.00 | |
| 16* | 1.003 | 0.516 | | | S1616 |
| 17 | ∞ | 0.465 | 1.516 | 64.10 | |
| 18 | ∞ | 0.073 | | | |

Figure 32A:
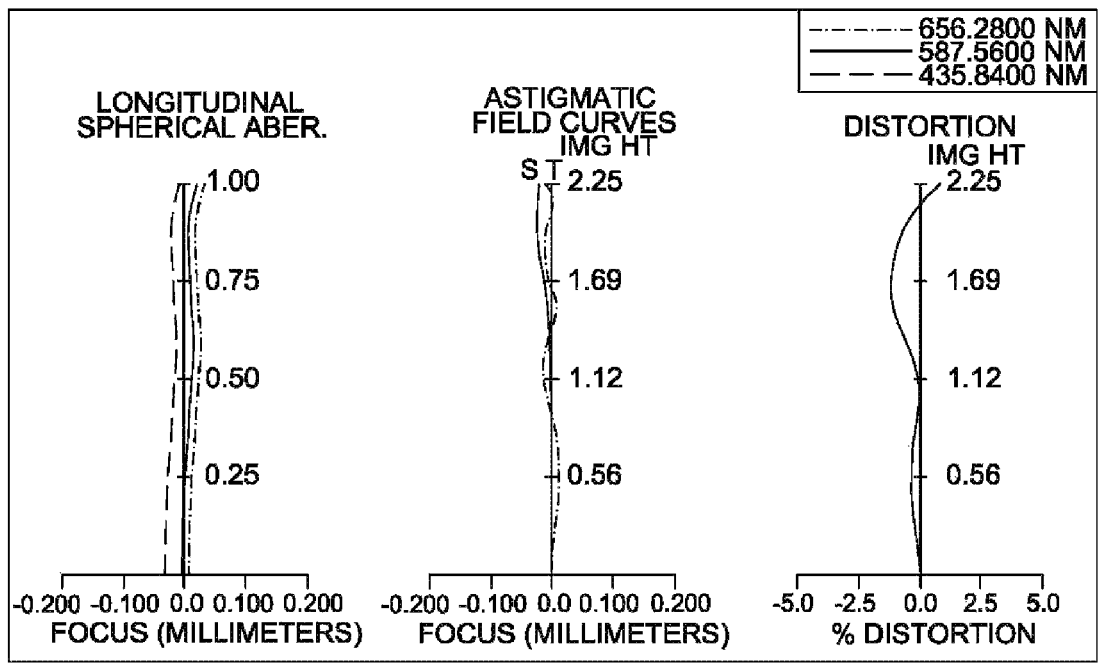
FIG. 32A is a graph showing aberrations of the imaging lens according to the sixteenth embodiment.
Figure 32B:
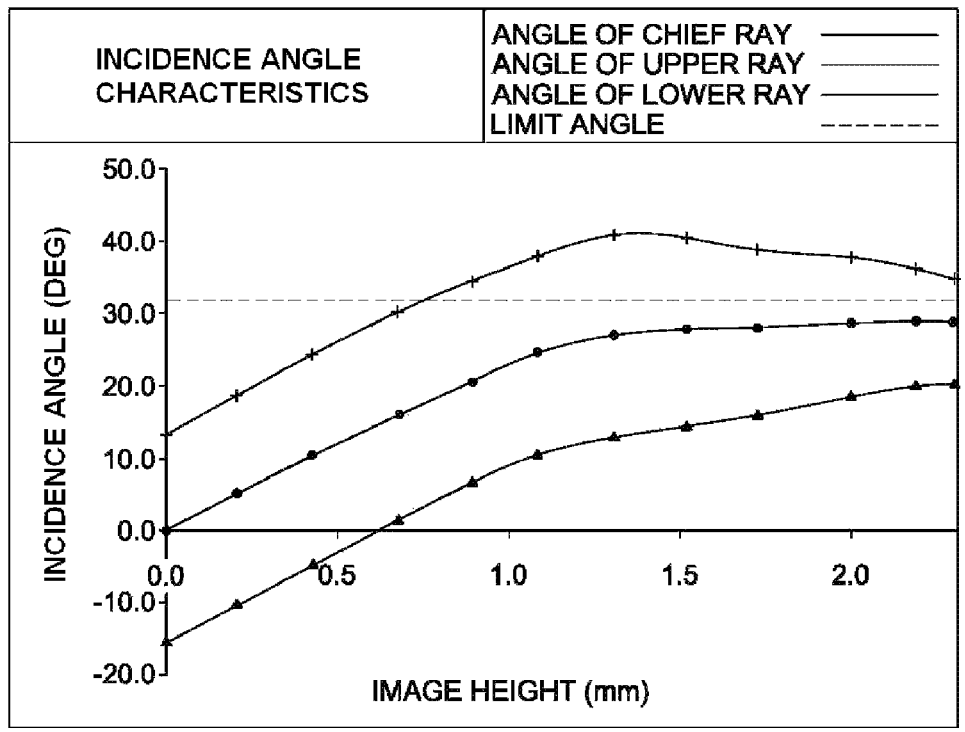
FIG. 32B is a graph showing characteristics of incidence angle, of the imaging lens according to the sixteenth embodiment, into a solid-state image sensor.

FIG. 32A is a graph showing aberrations of the imaging lens of FIG. 31, and FIG. 32B is a graph showing characteristics of an incidence angle, of the imaging lens of FIG. 31, into a solid-state image sensor. The lens system is simply configured. The lens system satisfies the conditional relationships (1) so that the overall optical length is short. Further, as illustrated in FIGS. 32A, 32B the lens system obtains satisfactory aberration properties and allows the most image-side resin layer to be thin, and controls the incidence light, of the peripheral light, into the surface of the solid-state image sensor. By using the resin material, the cost can be maintained low and the production can be performed easily.

The following Table 32 illustrates the value of "$A_q$" in the above-mentioned mathematical expression of the aspheric sag amount "X" and specifies the aspheric surface form.

TABLE 32

| S | K | A | B | C | D |
|---|---|---|---|---|---|
| 1 | −9.264E−01 | 1.061E−03 | −2.636E−02 | 2.095E−02 | −3.748E−02 |
| 4 | −1.660E+01 | −3.912E−02 | −5.922E−02 | 9.132E−03 | −5.668E−03 |
| 5 | 7.635E−01 | −2.827E−02 | −3.052E−04 | −4.359E−02 | 7.924E−02 |
| 8 | 2.803E+03 | −3.473E−01 | 2.589E−01 | −9.813E−02 | 8.362E−03 |
| 9 | −3.782E+00 | −1.293E−01 | 5.549E−02 | −2.909E−02 | 2.114E−03 |
| 12 | −1.705E+01 | 2.436E−02 | −3.363E−02 | 3.949E−03 | 4.608E−04 |
| 13 | −4.548E+00 | −1.527E−01 | 1.540E−02 | 6.863E−03 | −8.005E−04 |
| 16 | −4.763E+00 | −5.055E−02 | −2.448E−02 | 1.109E−02 | −1.236E−03 |

| S | E | F | G | H | J |
|---|---|---|---|---|---|
| 1 | 0.000E+00 | 0.000E+00 | 0.000E+00 | 0.000E+00 | 0.000E+00 |
| 4 | 0.000E+00 | 0.000E+00 | 0.000E+00 | 0.000E+00 | 0.000E+00 |
| 5 | 0.000E+00 | 0.000E+00 | 0.000E+00 | 0.000E+00 | 0.000E+00 |
| 8 | 1.341E−02 | 0.000E+00 | 0.000E+00 | 0.000E+00 | 0.000E+00 |
| 9 | 1.601E−04 | 0.000E+00 | 0.000E+00 | 0.000E+00 | 0.000E+00 |
| 12 | −5.917E−05 | 0.000E+00 | 0.000E+00 | 0.000E+00 | 0.000E+00 |
| 13 | −1.485E−04 | 0.000E+00 | 0.000E+00 | 0.000E+00 | 0.000E+00 |
| 16 | 2.826E−06 | 0.000E+00 | 0.000E+00 | 0.000E+00 | 0.000E+00 |

The corresponding relationship numbers with respect to "fs1", "f", fs1/f, sag amount, image height, sag amount/image height, ν1−ν2 and Abbe's number in each of the above described embodiments are summarized in the following Table 33.

TABLE 33

| Embodiment | fs1 | f | fs1/f | Sag Amount | Image Height | Sag Amount/Image Height | $|\nu_1 - \nu_2|$ | Equation Number corresponding to Abbe's Number | Ymax/Y |
|---|---|---|---|---|---|---|---|---|---|
| 1 | 2.85 | 2.75 | 1.03636 | 0.13 | 1.75 | 0.07429 | 25 | Equation (5) | 0.804 |
| 2 | 2.86 | 2.75 | 1.04000 | 0.17 | 1.75 | 0.09714 | 25 | Equation (5) | 0.817 |
| 3 | 3.18 | 2.8 | 1.13734 | 0.24 | 1.75 | 0.13886 | 25 | Equation (5) | 0.646 |

TABLE 33-continued

| Embodiment | fs1 | f | fs1/f | Sag Amount | Image Height | Sag Amount/Image Height | $|v_1 - v_2|$ | Equation Number corresponding to Abbe's Number | Ymax/Y |
|---|---|---|---|---|---|---|---|---|---|
| 4 | 2.78 | 2.75 | 1.01091 | 0.1 | 1.75 | 0.05714 | 25 | Equation (5) | 0.821 |
| 5 | 2.87 | 2.75 | 1.04364 | 0.13 | 1.75 | 0.07429 | 25 | Equation (5) | 0.818 |
| 6 | 2.85 | 2.76 | 1.03261 | 0.13 | 1.75 | 0.07429 | 25 | Equation (4) | 0.818 |
| 7 | 2.85 | 2.75 | 1.03636 | 0.13 | 1.75 | 0.07429 | — | | 0.781 |
| 8 | 2.7 | 2.76 | 0.97933 | 0.15 | 1.75 | 0.08571 | 35.7 | Equation (4) | 0.670 |
| 9 | 2.8 | 2.75 | 1.01818 | 0.18 | 1.75 | 0.10286 | 9.3 | Equation (4) | 0.802 |
| 10 | 2.9 | 2.76 | 1.05072 | 0.13 | 1.75 | 0.07429 | 41.4 | Equation (4) | 0.777 |
| 11 | 2.91 | 2.84 | 1.02465 | 0.13 | 1.75 | 0.07429 | 45 | Equation (4) | 0.413 |
| 12 | 2.79 | 2.75 | 1.01455 | 0.13 | 1.75 | 0.07429 | 21 | Equation (5) | 0.816 |
| 13 | 2.9 | 2.75 | 1.05349 | 0.13 | 1.75 | 0.07429 | 26.1 | Equation (5) | 0.783 |
| 14 | 2.92 | 2.77 | 1.05375 | 0.13 | 1.75 | 0.07429 | 9.3 | Equation (4') | 0.782 |
| 15 | 4.17 | 3.57 | 1.16942 | 0.58 | 2.24 | 0.25668 | 25 | Equation (5) | 0.716 |
| 16 | 5.50 | 3.38 | 1.62559 | 0.61 | 2.24 | 0.27299 | 0 | Equation (5) | 0.661 |

Each of the above described embodiments illustrates a detailed description of the preferred embodiments. However, the invention is not limited thereto.

EFFECT OF THE INVENTION

As described above, the imaging lens according to the present invention includes a lens element having a positive or negative refractive power on at least one of the object-side surface and the image-side surface of the i-th lens, which is disposed on the most image side. In addition, the conditional relationship (1) is satisfied, and the image-side surface of the (i−1)th lens, which is disposed on the object side of the i-th lens, has a greater curvature in the vicinity at a point where the most off-axial ray passes through than in the vicinity of the optical axis. By selecting an appropriate surface shape of this curve surface, the incidence light angle of the off-axial ray into the solid-state image sensor is controlled even if the aspheric surface sag amount of the image-side surface of the ib-th lens element is small. It should be noted that it is more preferable to set the lower limit and upper limit of the conditional relationship (1) to 0.4 and 0.85, respectively.

Lens elements are more preferably formed on both of the object-side surface and the image-side surface of the i-th lens flat plate, and the incidence angle of the peripheral light into the solid-state image sensor is thus controlled more precisely. For example, the incidence angle can be varied between at the vicinity of the 60% image height and the vicinity of the 90% image height or higher.

The light beams entering the image-side surface of the (i−1)th lens are separated each other according to image height, and it is easy to correct aberration for each image height. For this reason, the curvature of field at the periphery of image is successfully corrected by forming the image-side surface of the (i−1)th lens such that the surface has a convex shape toward the image side at a point where the principle ray of the maximum image height passes through.

It becomes possible to satisfactorily correct astigmatism by making the object side surface of the second lens concave toward the object side.

By providing a lens flat plate in the i-th lens, the i-th lens can act as a cover glass for a solid-state image sensing device. Thus, a special cover glass becomes unnecessary. Thus, the miniaturization of the imaging lens can be attained. When the lens on the most image side serves as a cover and a lens, the lens can be located closer to the image plane than in the case where the cover glass is arranged separately. Thus, the angle of incidence to the solid-state image sensing device can be controlled effectively.

An infrared cut filter can be easily formed by forming a film of infrared cut filter on the surface of the lens flat plate. That is, in the present invention, it is not necessary to provide a function of an infrared cut filter to the sensor cover glass, and a film of an infrared cut filter can be formed on the plate surface included in a lens. Therefore, the lens can be simply configured.

The conditional relationship (2) in the present invention specifies the focal length of the first lens object side surface. If the ratio of the focal length of the first lens to that of the lens system becomes equal to or shorter than the lower limit of the conditional relationship (2), correction of the spherical aberration and the coma aberration will become difficult. On the other hand, if the focal length becomes equal to or longer than the upper limit of the conditional relationship (2), the overall optical length will become longer. Therefore, by using the conditional relationship (2), it becomes possible to obtain an optical system having a short overall optical length and good aberration performance. In the conditional relationship (2), it is more desirable to set the lower limit and the upper limit to 0.8 and 1.2, respectively.

In the case where an optical system with short overall optical length with which a conditional relationship (2) is satisfied exceeds the upper limit of the conditional relationship (3), the aspheric surface sag amount becomes large and the thickness of the resin section needs to be thick. As the imaging lens in the present invention satisfies the conditional relationship (3), the metal mold die, which transfers the aspheric surface shape, can be made. In the conditional relationship (2), it is more desirable to set the upper limit to 0.14.

The conditional relationship (4) of the present invention defines the difference between Abbe's numbers of the lens element having a positive refractive power and of the lens element having a negative refractive power in the imaging lens, which is a bonded lens of the lens element having a positive refractive power and the lens element having a negative refractive power in the first lens. By satisfying this conditional relationship, it is possible to attain a satisfactory aberration property. This is because, if the difference of Abbe's numbers of the lens element having a positive refractive power and the lens element having a negative refractive power is at the lower limit of the conditional relationship (4) or smaller, it becomes difficult to correct chromatic aberration. Alternatively, if the difference is at the upper limit of the conditional relationship (4) or greater, it becomes difficult to select appropriate glass materials in terms of cost and productivity. In the conditional relationship (4), it is more desirable to set the lower limit and the upper limit to 10 and 50, respectively.

In the case where the first lens contains a lens flat plate, the conditional relationship (4') in the present invention specifies the difference of Abbe's numbers of the if-th lens element and the ib-th lens. A satisfactory aberration performance can be attained by satisfying this formula. In the conditional relationship (4), it is more desirable to set the lower limit and the upper limit to 15 and 45, respectively.

Light beam emitted from the first lens enters the plane of incidence and the emission plane of the second lens at a substantially perpendicular angle when the second lens is a meniscus lens in which the convex surface is directed toward the image side. Thereby, the occurrence of the curvature of field can be controlled.

The second lens includes a second lens flat plate and has a 2f-th lens element having a negative refractive power formed on the object side surface of the second lens flat plate, and a 2b-th lens element having the positive refractive power formed on the image side surface of the second lens flat plate. Thereby, the light flux, which has emitted the first lens, enters the incidence plane and the emission plane of the second lens with a substantially perpendicular angle. As a result, the occurrence of a curvature of field can be controlled.

Further, the principal point position of the whole imaging lens system can be arranged farther on the object side by arranging the object side surface of the lens element formed on the object side surface of the i-th lens flat plate into an aspherical surface having a concave shape directed toward the object side near the optical axis. Thereby, the overall optical length can be shortened. In addition, by making the object side surface of the lens element aspheric, it becomes possible to adopt the shape having an inflection point. Thus, the passage point of the principal ray of the maximum image height can be located in convex shape portion on the object side.

In the present invention, it is more preferable that the lens flat plate be a flat plate. Since the forming of a plate is so easy that the cost can be held low. In addition, it is not necessary to position the lens element on the plate.

In addition, in the present invention, it is desirable to use a resin material to the lens element as much as possible. By using a resin material for a lens element, the cost can be held low and the production can be performed more easily.

In the present invention, in the case where the resin material is used for the 1f-th lens element and the 1b-th lens element, the upper limit of the conditional relationship (5) in the present invention restricts the type of selectable glass material. The type of selectable glass materials is further limited to the range of the conditional relationship (5). More preferably, in the case where the difference of Abbe's numbers of the 1f-th lens element having a positive refractive power and the 1b-th lens element having a negative refractive power is equal to 10 or greater in the conditional relationship (5), the chromatic aberration can be satisfactorily corrected. This is because it will become difficult to combine resin materials having a low cost and a high mass production capability when the upper limit of the conditional relationship (5) is exceeded. Therefore, in the conditional relationship (5), the lower limit and the upper limit are preferably set to 10 and 35, respectively.

In the case of UV hardening type resin, it is possible to produce a lot of lenses at once by applying UV lights onto the glass plate after forming the lens element. The compatibility with a replica method is good. That is, since UV hardening type resin is used in the present invention, the lens itself can be hardened when the replica method is used. Since the transparency of the lens is high, irradiated UV lights reaches the entire resin and the resin is hardened smoothly. Therefore, it can be said that it has a good compatibility with the replica method.

UV hardening type resin is excellent in heat resistance, and the lens module using this resin can go through the reflow process. Therefore, a process can be simplified greatly and it is most suitable for mass production and a less expensive lens module.

The conditional relationship (3) in the present invention also plays a big roll in the replica method, which uses UV hardening type resin. That is, when the aspheric surface sag amount is equal to or more than the conditional relationship in the present invention, the thickness of UV hardening type resin section becomes thick, and the penetration of ultraviolet rays will decrease and it will become difficult to harden the resin section.

By forming a film of a cover layer having a light blocking effect, an aperture diaphragm can be formed on the surface of any one of lens flat plates. That is, in the present invention, the conventional aperture diaphragm provided separately in between the first lens and the second lens can be replaced by a cover layer, having a light blocking property, formed on the surface of the lens flat plate, and thereby easily providing the function of the aperture diaphragm without using other members. In the present invention, since edge (thickness) of a filter becomes very small, an occurrence of ghost by the edge (filter section) is controlled.

When the aperture diaphragm is preferably provided between the first lens flat plate and the 1f-th lens elements or on the most object-side surface, the light ray can be gently bent. Therefore, an optical system which is more tele-centric (state where the principal ray is parallel to the optical axis) with respect to the image pick-up surface can be realized.

With respect to a method for manufacturing a plurality of units in which the solid-state image sensing device and the imaging lens section performing an image formation of the photographic object, an imaging lens in which all of the lenses have a lens flat plate is easily produced by a manufacturing method, in which the lens flat plates are laminated which a lattice shaped spacer member inbetween, and the above mentioned integrated lens flat plates and the above mentioned spacer member portion are cut.

In the imaging lens in which all the lenses have a lens flat plate, the infrared cut filter can be provided on the surface of any one of the lens flat plate by forming a film of infrared cut filter layer.

By making all surfaces of the lens element that contacts the air to be aspheric, the optical system having more satisfactory aberration performance can be obtained. That is, the correction of the aberration is easier in the case in which the aspherical surface lens is used compared to the case where a spherical surface lens is used. Further, it is easier to correct the aberration with a plurality of surfaces rather than correcting the aberration with one surface. Therefore, in the present invention in which a lot of surfaces are formed aspheric, it becomes possible to satisfactorily correct the aberration.

The invention claimed is:

1. An imaging lens, comprising, in order from an object side:
    a first lens having a positive refractive power;
    a second lens having a concave shape toward the object side; and
    (i−2) number of lens, where i is equal to or greater than 3, wherein an i-th lens, which is counted from the object side, includes:
        an i-th lens flat plate; and a lens element which is provided on at least one of an object-side surface and an image-side surface of the i-th lens flat plate, has a refractive index different than the i-th lens flat plate, and has a positive refracting power or a negative refracting power, wherein the following conditional relationship is satisfied:

$$0.9 > Y_{max}/Y > 0.61 \quad (1)$$

where:

$Y_{max}$ is a distance from an optical axis to a point, which is on an image-side surface of an (i−1)th lens, which is counted from the object side, and at which a principal ray of the most outer light beam passes through; and Y is a maximum image height depending on the imaging lens and a size of an imaging device.

2. The imaging lens of claim 1, wherein an (i−1)th lens, which is counted from the object side, includes:

a lens flat plate; and a lens element on an image side surface of the (i−1)th lens has a convex shape toward the image side at the point where the principle ray of the maximum image height passes through.

3. The imaging lens of claim 1, wherein the following conditional relationship is satisfied:

$$0.6 \leq \frac{f_{s1}}{f} \leq 1.3 \quad (2)$$

where:

$f_{s1}$ is a focal length of an object-side surface of the first lens; and f is a focal length of the imaging lens.

4. The imaging lens of claim 1, wherein the i-th lens includes:

an ib-th lens element formed on an image-side surface of the i-th lens flat plate, wherein the following relationship is satisfied:

$$\frac{|X - X_0|}{Y} < 0.16 \quad (3)$$

where:

X is an aspherical deviation given by the following Equation (a);

$X_0$ is an aspherical deviation of a rotational quadric surface given by the following Equation (b); and Y is a maximum image height in the imaging lens, $$X = \frac{h^2/R_{ib}}{1 + \sqrt{1 - (1 + K_{ib})h^2/R_{ib}^2}} + \sum A_m h^m \quad \text{Equation (a)}$$

$$X_0 = \frac{h^2/R_{ib}}{1 + \sqrt{1 - (1 + K_{ib})h^2/R_{ib}^2}} \quad \text{Equation (b)}$$

where:

$A_{im}$ is an m-order aspherical coefficient of an image-side surface of the ib-th lens element;

$R_{ib}$ is a radius of curvature of the image-side surface of the ib-th lens element;

$K_{ib}$ is a conical coefficient of the image-side surface of the ib-th lens element; and h is a distance between the optical axis and a point, on the image-side surface of the ib-th lens element, and at which the principal ray of the maximum image height passes through.

5. The imaging lens of claim 1, wherein the first lens is a cemented lens configured of a first lens piece having a positive refracting power and a second lens piece having a negative refracting power, and the following relationship is satisfied:

$$5 < |v_2 - v_1| < 70 \quad (4)$$

where:

$v_1$ is an Abbe's number of the first lens piece; and $v_2$ is an Abbe's number of the second lens piece.

6. The imaging lens of claim 1, wherein the first lens includes:

a first lens flat plane;

a 1f-th lens element formed on an object-side surface of the first lens flat plate and having a positive refracting power; and a 1b-th lens element formed on an image-side surface of the first lens flat plate and having a negative refracting power, wherein the following relationship is satisfied:

$$5 < |v_2 - v_1| < 70 \quad (4')$$

where:

$v_1$ is an Abbe's number of the lens element, of the first lens, having a positive refracting power; and $v_2$ is an Abbe's number of the lens element, of the first lens, having a negative refracting power.

7. The imaging lens of claim 1, wherein the second lens is a meniscus lens which has a convex surface toward the image side.

8. The imaging lens of claim 1, wherein the second lens includes:

a second lens flat plane;

a 2f-th lens element which is formed on an object-side surface of the second lens flat plane and has a negative refracting power; and a 2b-th lens element which is formed on an image-side surface of the second lens flat plane and has a positive refracting power.

9. The imaging lens of claim 1, wherein an object-side surface of the if-th lens element is aspheric surface having a concave shape toward the object side in the vicinity of the optical axis.

10. The imaging lens of claim 1, wherein at least one of the lenses and lens elements is made of resin material.

11. The imaging lens of claim 1, wherein each of the first lens to the (i−1)th lens has a lens flat plate and a lens element, and each lens element and each lens flat plate have a different refractive index in each of the first lens to the (i−1)th lens.

12. The imaging lens of claim 1, wherein the lens element included in the i-th lens is made of UV hardening resin material, and the following relationship is satisfied:

$$5 < |v_1 - v_2| < 40 \quad \text{Equation (5)}$$

where:

$v_1$ is an Abbe's number of an object-side surface of the first lens; and $v_2$ is an Abbe's number of an object-side of the first lens.

13. The imaging lens of claim 1, wherein i=3.

14. The imaging lens of claim 1, wherein the i-th lens flat plate includes an optical functional thin film on the surface thereof.

15. The imaging lens of claim 1, wherein an optical surface, of each of the lenses, contacting with air is aspherical.

16. An imaging device, comprising:
the imaging lens of claim 1; and
a solid-state image sensor.

17. A mobile terminal, comprising:
the imaging device of claim 16.

* * * * *